(12) United States Patent
Yamashita

(10) Patent No.: US 6,678,333 B1
(45) Date of Patent: Jan. 13, 2004

(54) METHOD OF AND APPARATUS FOR TRANSMITTING DIGITAL DATA

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 09/690,653

(22) Filed: Oct. 17, 2000

(30) Foreign Application Priority Data

Oct. 18, 1999 (JP) .......................................... 11-295572

(51) Int. Cl.[7] .......................... H04N 7/12; H04N 11/02; H04N 11/04
(52) U.S. Cl. ............................. 375/240.28; 375/240.26; 375/240.27; 341/50; 341/58; 348/464; 348/476; 348/500; 348/521; 348/525
(58) Field of Search ....................... 375/240.26, 240.27, 375/240.28; 348/464, 476, 500, 521, 525; 341/50, 58

(56) References Cited

U.S. PATENT DOCUMENTS

| | | | | |
|---|---|---|---|---|
| 5,387,911 A | * | 2/1995 | Gleichert | 341/95 |
| 5,625,418 A | * | 4/1997 | Binder | 348/495 |
| 5,923,384 A | * | 7/1999 | Enomoto | 348/705 |
| 6,054,944 A | * | 4/2000 | Yamashita | 341/95 |
| 6,295,010 B1 | * | 9/2001 | Thiesfeld | 341/58 |
| 6,323,787 B1 | * | 11/2001 | Yamashita | 341/58 |
| 6,512,794 B1 | * | 1/2003 | Fujiwara | 375/240.26 |
| 6,515,647 B1 | * | 2/2003 | Sakamoto | 345/99 |

* cited by examiner

*Primary Examiner*—Andy Rao
*Assistant Examiner*—Charles E Parsons
(74) *Attorney, Agent, or Firm*—Frommer Lawrence & Haug LLP; William S. Frommer; Gordon Kessler

(57) ABSTRACT

A method of transmitting digital data, which comprises the steps of obtaining first and second 8-bit word sequence data respectively based on luminance signal information data and chrominance signal information data which constitute a digital video signal, causing each of the first and second 8-bit word sequence data to be subjected to 8 bits to 10 bits conversion to produce first and second 10-bit word sequence data, obtaining third and fourth 8-bit word sequence data based on the first and second 10-bit word sequence data, respectively, inserting an additional word data group including 8-bit word synchronous data allotted a predetermined specific code into each of the third and fourth 8-bit word sequence data at predetermined word intervals to produce first and second composite 8-bit word sequence data, converting the first and second composite 8-bit word sequence data into first and second serial data, respectively, and transmitting the first and second serial data through first and second transmission lines.

10 Claims, 23 Drawing Sheets

FIG. 3A Y DATA SEQUENCE
FIG. 3B Pb/Pr DATA SEQUENCE

A1 : 11110110
A2 : 00101000

A1 : 11110110
A2 : 00101000

AN : ANCILLARY

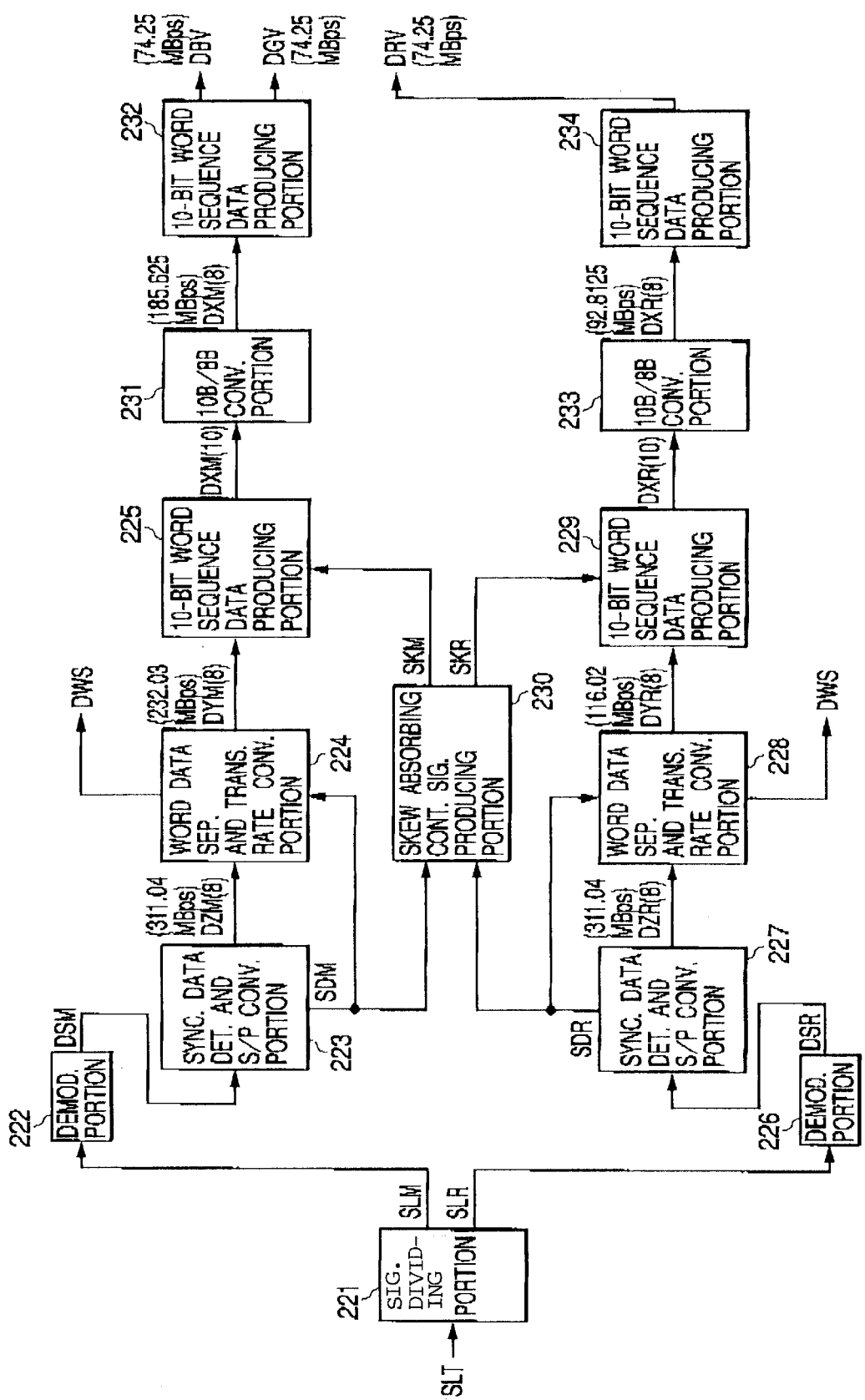

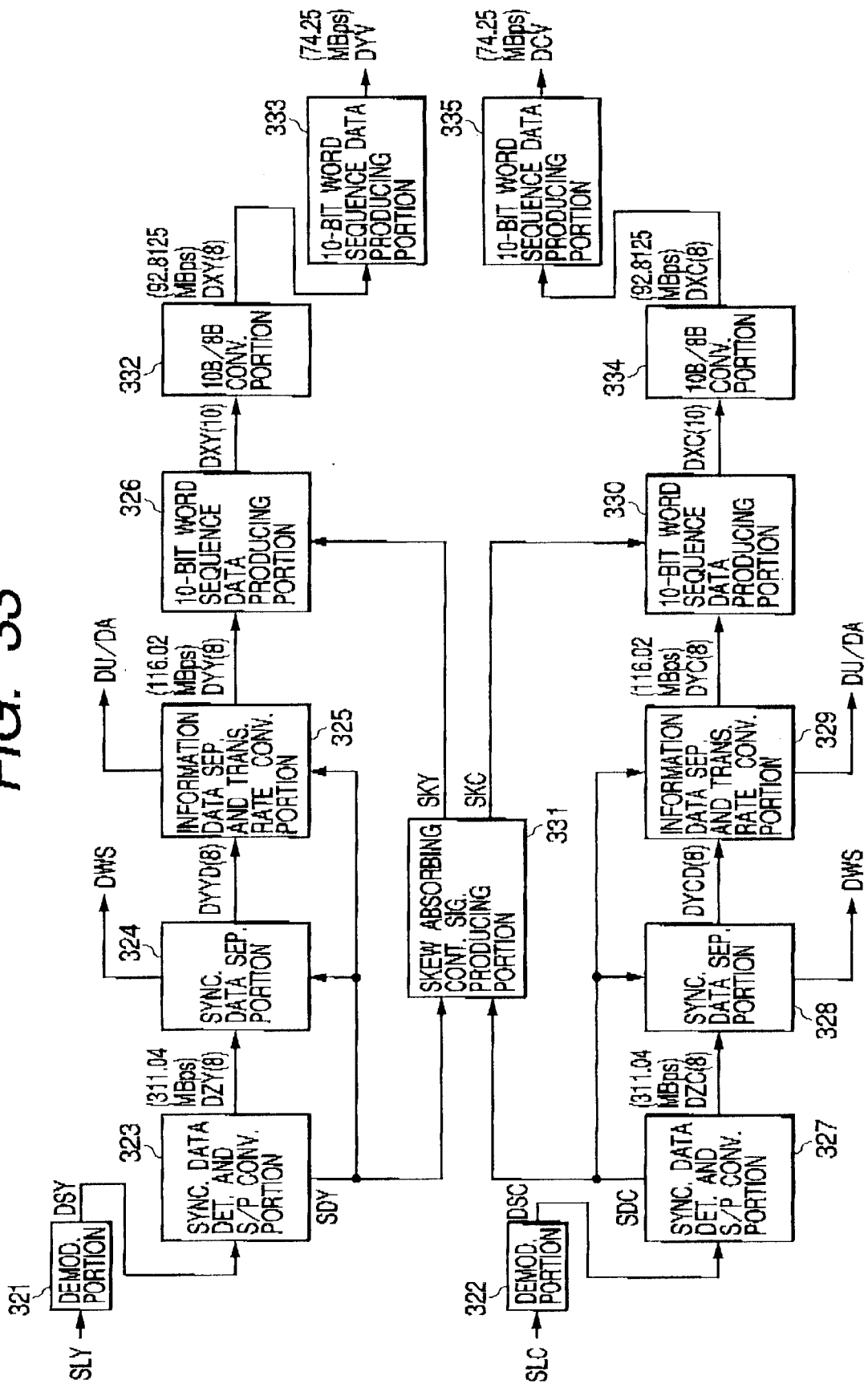

METHOD OF AND APPARATUS FOR TRANSMITTING DIGITAL DATA

BACKGROUND OF THE INVENTION

1. Field of the Invention

The present invention generally relates to method of and apparatus for transmitting digital data, and more particularly, is directed to improvements in a digital data transmitting method by which 8-bit word sequence data including word synchronous data are produced for representing various image information such as information of digital luminance and chrominance signals constituting a digital video signal and converted into serial digital data to be transmitted through a data transmission line and in a digital data transmitting apparatus used for putting the above-mentioned method into practice.

2. Description of the Prior Art

In the field of data transmission in which digital data containing information data representing various signal information are transmitted, an electric transmission system and an optical transmission system have been proposed to be put into practice. In the case of the electric transmission system, the digital data are converted into one or more electric signals to be transmitted through one or more transmission lines each made of a coaxial cable or a pair of twisted lines. In the case of the optical transmission system, the digital data are converted into one or more optical signals to be transmitted through one or more transmission lines each made of an optical fiber cables. The formats of the digital data are classified broadly into two categories, one of which is an STM (Synchronous Transfer Mode) format in which a constant frame period is set and the other of which is an ATM (Asynchronous Transfer Mode) format in which a constant frame period is not set.

The current digital networks, in which the digital data transmission systems as mentioned above have been adopted, have developed on the basis of telephone line networks. Data multiplexing for actualizing highly efficient data transmission and broad-band signal transmission at high speed based on data to be transmitted are inevitably required to the information transmission through the digital networks with the developments thereof. Accordingly, the technology called SDH (Synchronous Digital Hierarchy) been established by the ITU-T (former CCIR) the technology called SDH (Synchronous Digital Hierarchy) as one of systems for multiplexing data to be converted into high speed and broad-band signals and transmitting the high speed and broad-band signals thus obtained.

The SDH has proposed a new STM format with synchronous multiplexing structure including a basic unit called STM-1, which is fit for high speed and broad-band signal transmission services in future. The STM-1 is a transmission signal with a period composed of 9 rows, each of which is composed of a data section of 270 bytes (1 byte=8 bits), that is, 270 bytes×9=2,430 bytes, as shown in FIG. 1. This unit periodic segment of 2,430 bytes is called a frame. The first 9 bytes in 270 bytes contained in each of the 9 rows constituting each frame form a portion of a section overhead (SOH) and AU pointer. The rest 261 bytes in 270 bytes contained in each of the 9 rows form an information data area.

The portion of the section overhead and AU pointer is composed of 9 byte×9=81 bytes including A1, A2, B1, B2, C1, D1~D12, E1, E2, F1, K1, K2, H1, H2, H3, Z1 and Z2 each representing 1 byte. These bytes have their respective contents as shown in FIG. 1. Each of A1 and A2 (frame pattern) is an 8-bit word synchronous data and three successive A1s at the beginning portion of the first row and three successive A2s following the three successive A1s in the first row form a synchronous pattern in each frame. The A1 which is the 8-bit word synchronous data is allotted a specific code of 11110110 and the A2 which is also the 8-bit word synchronous data is allotted another specific code of 00101000.

The period of the STM-1 is determined to be, for example, 125 $\mu$s. Consequently, the transmission capacity of the STM-1 is calculated to be 270 bytes×9×$\frac{1}{125}$×10$^{-6}$ seconds× 8=155.520 Mbit/s (155.520 Mbps).

There has been further proposed a high speed data transmission in which of transmission signals each functioning as the STM-1 are multiplexed. The transmission signal thus obtained by multiplexing is called STM-N. The STM-N is formed, for example, by multiplexing transmission signals STM-1 #1, STM-1 #2, . . . , STM-1 #n, each functioning as the STM-1, in the manner of byte-intreleaving at a data multiplexing portion MP, as shown in FIG. 2.

The high speed data transmission service called SONET (Synchronous Optical Network) in the United States of America has been generally known as a communication service to which the SDH as aforementioned is practically applied.

In the field of video signals, digitalization of video signals has been aimed for actualizing diversification in information transmission, improvements in quality of reproduced images based on video signals and so on. For example, there has been proposed the High Definition Television (HDTV) system which uses a digital video signal representing video signal information. The digital video signal under the HDTV system (hereinafter, referred to an HD digital video signal) is formed, for example, in accordance with such data formats as shown in FIGS. 3A and 3B.

The data formats shown in FIGS. 3A and 3B include a luminance signal data sequence (Y data sequence) as shown in FIG. 3A, which represents a luminance signal component of a video signal, and a color difference signal data sequence ($P_B/P_R$ data sequence) as shown in FIG. 3B, which represents color difference signal components of the video signal. Each of data words constituting the Y data sequence or the $P_B/P_R$ data sequence is composed of 10 bits. Namely, each of the Y data sequence and the $P_B/P_R$ data sequence is formed into 10-bit word sequence data. A part of the Y data sequence which includes a portion corresponding to a horizontal blanking period and parts of portions corresponding to a couple of video data periods appearing before and after the horizontal blanking period in a horizontal period of the Y data sequence is shown in FIG. 3A. Similarly, a part of the $P_B/P_R$ data sequence which includes a portion corresponding to a horizontal blanking period and parts of portions corresponding to a couple of video data periods appearing before and after the horizontal blanking period in a horizontal period of the $P_B/P_R$ data sequence is shown in FIG. 3B.

In the Y data sequence, time reference code data SAV (Start of Active Video) which are composed of four 10-bit words (3FF(Y), 000(Y), 000(Y), XYZ(Y): 3FF and 000 are hexadecimal numbers and (Y) indicates a word contained in the Y data sequence) are provided just before a portion corresponding to the video data period and another time reference code data EAV (End of Active Video) which are composed of four 10-bit words (3FF(Y), 000(Y), 000(Y), XYZ(Y)) are provided just after the portion corresponding to the video data period. Similarly, in the $P_B/P_R$ data sequence, time reference code data SAV which are composed of four 10-bit words (3FF(C), 000(C), 000(C), XYZ (C): 3FF and 000 are hexadecimal numbers and (C) indicates a word contained in the $P_B/P_R$ data sequence) are provided just before a portion corresponding to the video data period and another time reference code data EAV which are composed of four 10-bit words (3FF(C), 000(C), 000(C), XYZ(C)) are provided just after the portion corresponding to the video data period. The time reference code data EAV and SAV contained in the Y data sequence are provided in a portion corresponding to the horizontal blanking period of the Y data sequence and the time reference code data EAV and SAV contained in the $P_B/P_R$ data sequence are provided in a portion corresponding to the horizontal blanking period of the $P_B/P_R$ data sequence.

When the Y data sequence and the $P_B/P_R$ data sequence are transmitted, the Y data sequence and the $P_B/P_R$ data sequence are subjected to word multiplexing treatment under a condition in which the portion corresponding to the horizontal blanking period of the Y data sequence in which the time reference code data EAV and SAV are contained is synchronized with the portion corresponding to the horizontal blanking period of the $P_B/P_R$ data sequence in which the time reference code data EAV and SAV are contained, so as to produce word multiplex data sequence formed into 10-bit word sequence data, as shown in FIG. 4, and the digital video signal in the form of 10-bit word sequence data formed in accordance with the data format of the word multiplex data sequence shown in FIG. 4 is converted into serial data to be transmitted.

In the word multiplex data sequence, multiplex time reference code data (multiplex SAV) which are composed of eight 10-bit words (3FF(C), 3FF(Y), 000(C), 000(Y), 000 (C), 000(Y), XYZ(C), XYZ(Y)) are provided just before a portion corresponding to the video data period and another multiplex time reference code data (multiplex EAV) which are composed of eight 10-bit words (3FF(C), 3FF(Y), 000 (C), 000(Y), 000(C), 000(Y), XYZ(C), XYZ(Y)) are provided just after the portion corresponding to the video data period.

Under such a situation, in order to make it possible to utilize effectively existing integrated circuit devices previously developed for the SDH on the occasion of construction of data transmitting and receiving circuits for digital video signals, it is strongly desired that the digital video signal formed in accordance with the data format of the word multiplex data sequence based on the Y data sequence and the $P_B/P_R$ data sequence as described above is subjected to such data transmission that 8-bit word sequence data to which word synchronous data each allotted a predetermined specific code, such as A1 and A2 as aforementioned, are added, are produced based on the original digital video signal which is to be transmitted in a transmission side, and the 8-bit word sequence data thus produced are transmitted through a data transmission line.

Although, for the present, the digital video signal formed in accordance with the data format of the word multiplex data sequence based on the Y data sequence and the $P_B/P_R$ data sequence is transmitted in the form of serial data at the bit transmission rate of 1.485 Gbps, it is presumable that in the near future a digital video signal formed in accordance with such a data format as the word multiplex data sequence is transmitted in the form of serial data at the bit transmission rate which is, for example, twice the previous bit transmission rate, namely, 1.485 Gbps×2=2.97 Gbps.

Considering that it is presumable that in the near future the digital video signal is transmitted in the form of serial data at the bit transmission rate which is selected to be extremely high under a condition in which it is strongly desired that the digital video signal formed in accordance with the data format of the word multiplex data sequence is transmitted in such a manner that the 8-bit word sequence data to which the word synchronous data each allotted the predetermined specific code are added, are produced based on the digital video signal which is to be transmitted in the transmission side, and the 8-bit word sequence data thus produced are transmitted through the data transmission line, if it is possible to transmit not only digital data formed into a single channel for representing a digital video signal but also multiplex digital data formed with digital data divided into a plurality of channels for representing a digital video signal, the data transmitting and receiving circuits used for the transmission of the digital video signal can be constructed with effective utilization of the existing integrated circuit devices previously developed and the digital video signal is utilized more effectively and the field of utilization of the digital video signal is desirably extended. The effective utilization of the digital video signal or the extension of the field of utilization of the digital video signal brings about further progress of technology in the field of electronic apparatus for professional use and home use.

However, any practical embodiment of digital data transmission system which can transmit multiplex digital data formed with digital data divided into a plurality of channels for representing a digital video signal in such a manner that 8-bit word sequence data to which word synchronous data each allotted a predetermined specific code are added, are produced based on the digital video signal which are to be transmitted, and the 8-bit word sequence data thus produced are transmitted through a data transmission line, has not been previously found.

Further, any literature or thesis disclosing the digital data transmission system which can transmit the multiplex digital data formed with the digital data divided into a plurality of channels for representing the digital video signal in the manner mentioned above, has not been previously found also.

OBJECTS AND SUMMARY OF THE INVENTION

Accordingly, it is an object of the present invention to provide a method of transmitting digital data, by which 8-bit word sequence data including word synchronous data are produced for representing various image information and converted into serial digital data to be transmitted through a data transmission line, and which avoids the aforementioned disadvantages encountered with the prior art.

It is another object of the present invention to provide a method of transmitting digital data, by which 8-bit word sequence data including word synchronous data are produced for representing various image information and converted into serial digital data to be transmitted through a data transmission line, and which can transmit multiplex digital data formed with digital data divided into a plurality of channels for representing a digital video signal in such a manner that 8-bit word sequence data to which word synchronous data each allotted a predetermined specific code, such as A1 and A2 as aforementioned, are added, are produced based on the digital video signal which are to be transmitted, and the 8-bit word sequence data thus produced are transmitted through the data transmission line.

It is a further object of the present invention to provide a method of transmitting digital data, by which 8-bit word sequence data including word synchronous data are produced for representing various image information and converted into serial digital data to be transmitted through a data transmission line, and which can transmit multiplex digital data formed with digital data divided into a plurality of channels for representing a digital video signal in such a manner that 8-bit word sequence data to which word synchronous data each allotted a predetermined specific code, such as A1 and A2 as aforementioned, are added, are produced based on the digital video signal which are to be transmitted, and the 8-bit word sequence data thus produced are transmitted through the data transmission line with transmission means which can be constructed with effective utilization of existing integrated circuit devices previously developed.

It is a further object of the present invention to provide an apparatus for transmitting digital data, by which 8-bit word sequence data including word synchronous data are produced for representing various image information and converted into serial digital data to be transmitted through a data transmission line, and which avoids the aforementioned disadvantages encountered with the prior art.

It is a further object of the present invention to provide an apparatus for transmitting digital data, by which 8-bit word sequence data including word synchronous data are produced for representing various image information and converted into serial digital data to be transmitted through a data transmission line, and which can transmit multiplex digital data formed with digital data divided into a plurality of channels for representing a digital video signal in such a manner that 8-bit word sequence data to which word synchronous data each allotted a predetermined specific code, such as A1 and A2 as aforementioned, are added, are produced based on the digital video signal which are to be transmitted, and the 8-bit word sequence data thus produced are transmitted through the data transmission line.

It is a still further object of the present invention to provide an apparatus for transmitting digital data, by which 8-bit word sequence data including word synchronous data are produced for representing various image information and converted into serial digital data to be transmitted through a data transmission line, and which can transmit multiplex digital data formed with digital data divided into a plurality of channels for representing a digital video signal in such a manner that 8-bit word sequence data to which word synchronous data each allotted a predetermined specific code, such as A1 and A2 as aforementioned, are added, are produced based on the digital video signal which are to be transmitted, and the 8-bit word sequence data thus produced are transmitted through the data transmission line with transmission means which can be constructed with effective utilization of existing integrated circuit devices previously developed.

According to a first aspect of the present invention, there is provided a method of transmitting digital data, which comprises the steps of obtaining first and second 8-bit word sequence data based on first and second digital image information data, respectively, causing each of the first and second 8-bit word sequence data to be subjected to 8 bits to 10 bits conversion (8B/10B conversion) to produce first and second 10-bit word sequence data, obtaining third and fourth 8-bit word sequence data based on the first and second 10-bit word sequence data, respectively, inserting an additional word data group including 8-bit word synchronous data allotted a predetermined specific code into each of the third and fourth 8-bit word sequence data at predetermined word intervals to produce first and second composite 8-bit word sequence data, converting the first and second composite 8-bit word sequence data into first and second serial data, respectively, and transmitting the first and second serial data through first and second transmission lines.

In one embodiment of the first aspect of the present invention, the first and second digital image information data are respectively digital data representing luminance signal information (luminance signal information data) and digital data representing chrominance signal information (chrominance signal information data) which constitute a digital video signal. In another embodiment of the first aspect of the present invention, the first digital image information data are two of data representing first, second and third primary color signal information which constitute a digital video signal and the second digital image information data are the rest of the data representing first, second and third primary color signal information.

According to a second aspect of the present invention, there is provided a method of transmitting digital data, which comprises the steps of causing luminance signal information data and chrominance signal information data which constitute a digital video signal to be subjected to bit-dividing to produce first and second divided bit word sequence data, causing each of the first and second divided bit word sequence data or each of the first divided bit word sequence data and compound bit word sequence data obtained by adding predetermined bit word data to the second divided bit word sequence data to be subjected to 8B/10B conversion to produce first and second 10-bit word sequence data, obtaining first and second 8-bit word sequence data based on the first and second 10-bit word sequence data, respectively, inserting an additional word data group including 8-bit word synchronous data allotted a predetermined specific code into each of the first and second 8-bit word sequence data at predetermined word intervals to produce first and second composite 8-bit word sequence data, converting the first and second composite 8-bit word sequence data into first and second serial data, respectively, and transmitting the first and second serial data through first and second transmission lines.

According to a third aspect of the present invention, there is provided a method of transmitting digital data, which comprises the steps of causing luminance signal information data and chrominance signal information data which constitute a digital video signal to be subjected to bit-dividing to produce first, second and third divided bit word sequence data, causing each of the first divided bit word sequence data, the second divided bit word sequence data and compound bit word sequence data obtained by adding predetermined bit word data to the third divided bit word sequence data to be subjected to 8B/10B conversion to produce first, second and third 10-bit word sequence data, obtaining first, second and third 8-bit word sequence data based on the first, second and third 10-bit word sequence data, respectively, inserting an additional word data group including 8-bit word synchronous data allotted a predetermined specific code into each of the first, second and third 8-bit word sequence data at predetermined word intervals to produce first, second and third composite 8-bit word sequence data, converting the first, second and third composite 8-bit word sequence data into first, second and third serial data, respectively, and transmitting the first, second and third serial data through first, second and third transmission lines.

According to a fourth aspect of the present invention, there is provided an apparatus for transmitting digital data, which comprises first 8-bit word sequence data producing means for obtaining first 8-bit word sequence data based on first digital image information data, second 8-bit word sequence data producing means for obtaining second 8-bit word sequence data based on second digital image information data, first 8B/10B converting means for causing the first 8-bit word sequence data to be subjected to 8B/10B conversion to produce first 10-bit word sequence data, second 8B/10B converting means for causing the second 8-bit word sequence data to be subjected to 8B/10B conversion to produce second 10-bit word sequence data, first composite data producing means for obtaining third 8-bit word sequence data based on the first 10-bit word sequence data and inserting an additional word data group including 8-bit word synchronous data allotted a predetermined specific code into the third 8-bit word sequence data at predetermined word intervals to produce first composite 8-bit word sequence data, second composite data producing means for obtaining fourth 8-bit word sequence data based on the second 10-bit word sequence data and inserting an additional word data group including 8-bit word synchronous data allotted a predetermined specific code into the fourth 8-bit word sequence data at predetermined word intervals to produce second composite 8-bit word sequence data, and data transmitting means for converting the first and second composite 8-bit word sequence data into first and second serial data, respectively, and transmitting the first and second serial data through first and second transmission lines.

The apparatus according to the fourth aspect of the present invention is used for putting the method according to the first aspect of the present invention into practice.

According to a fifth aspect of the present invention, there is provided an apparatus for transmitting digital data, which comprises bit dividing means for causing luminance signal information data and chrominance signal information data which constitute a digital video signal to be subjected to bit-dividing to produce first and second divided bit word sequence data, first 8B/10B converting means for causing the first divided bit word sequence data to be subjected to 8B/10B conversion to produce first 10-bit word sequence data, second 8B/10B converting means for causing the second divided bit word sequence data or compound bit word sequence data obtained by adding predetermined bit word data to the second divided bit word sequence data to be subjected to 8B/10B conversion to produce second 10-bit word sequence data, first composite data producing means for obtaining first 8-bit word sequence data based on the first 10-bit word sequence data and inserting an additional word data group including 8-bit word synchronous data allotted a predetermined specific code into the first 8-bit word sequence data at predetermined word intervals to produce first composite 8-bit word sequence data, second composite data producing means for obtaining second 8-bit word sequence data based on the second 10-bit word sequence data and inserting an additional word data group including 8-bit word synchronous data allotted a predetermined specific code into the second 8-bit word sequence data at predetermined word intervals to produce second composite 8-bit word sequence data, and data transmitting means for converting the first and second composite 8-bit word sequence data into first and second serial data, respectively, and transmitting the first and second serial data through first and second transmission lines.

The apparatus according to the fifth aspect of the present invention is used for putting the method according to the second aspect of the present invention into practice.

According to a sixth aspect of the present invention, there is provided an apparatus for transmitting digital data, which comprises bit dividing means for causing luminance signal information data and chrominance signal information data which constitute a digital video signal to be subjected to bit-dividing to produce first, second and third divided bit word sequence data, first 8B/10B converting means for causing the first divided bit word sequence data to be subjected to 8B/10B conversion to produce first 10-bit word sequence data, second 8B/10B converting means for causing the second divided bit word sequence data to be subjected to 8B/10B conversion to produce second 10-bit word sequence data, third 8B/10B converting means for causing the third divided bit word sequence data or compound bit word sequence data obtained by adding predetermined bit word data to the third divided bit word sequence data to be subjected to 8B/10B conversion to produce third 10-bit word sequence data, first composite data producing means for obtaining first 8-bit word sequence data based on the first 10-bit word sequence data and inserting an additional word data group including 8-bit word synchronous data allotted a predetermined specific code into the first 8-bit word sequence data at predetermined word intervals to produce first composite 8-bit word sequence data, second composite data producing means for obtaining second 8-bit word sequence data based on the second 10-bit word sequence data and inserting an additional word data group including 8-bit word synchronous data allotted a predetermined specific code into the second 8-bit word sequence data at predetermined word intervals to produce second composite 8-bit word sequence data, third composite data producing means for obtaining second 8-bit word sequence data based on the third 10-bit word sequence data and inserting an additional word data group including 8-bit word synchronous data allotted a predetermined specific code into the third 8-bit word sequence data at predetermined word intervals to produce third composite 8-bit word sequence data, and data transmitting means for converting the first, second and third composite 8-bit word sequence data into first, second and third serial data, respectively, and transmitting the first, second and third serial data through first, second and third transmission lines.

The apparatus according to the sixth aspect of the present invention is used for putting the method according to the third aspect of the present invention into practice.

With the method of or apparatus for transmitting digital data thus constituted in accordance with one of the first to sixth aspects of the present invention, multiplex digital data formed with digital data divided into a plurality of channels for representing the digital video signal can be transmitted in such a manner that 8-bit word sequence data to which word synchronous data each allotted a predetermined specific code are added, are produced based on the digital video signal which are to be transmitted and the 8-bit word sequence data thus produced are transmitted through the data transmission line.

The above and other objects, features and advantages of the present invention will become apparent from the following detailed description which is to be read in conjunction with the accompanying drawings.

BRIEF DESCRIPTION OF THE DRAWINGS

FIG. 28 is a schematic block diagram showing a data receiving apparatus for receiving a signal transmitted from the apparatus shown in FIG. 12;

FIG. 33 is a schematic block diagram showing a data receiving apparatus for receiving a signal transmitted from the apparatus shown in FIG. 19.

DESCRIPTION OF THE PREFERRED EMBODIMENTS

Figure 5:
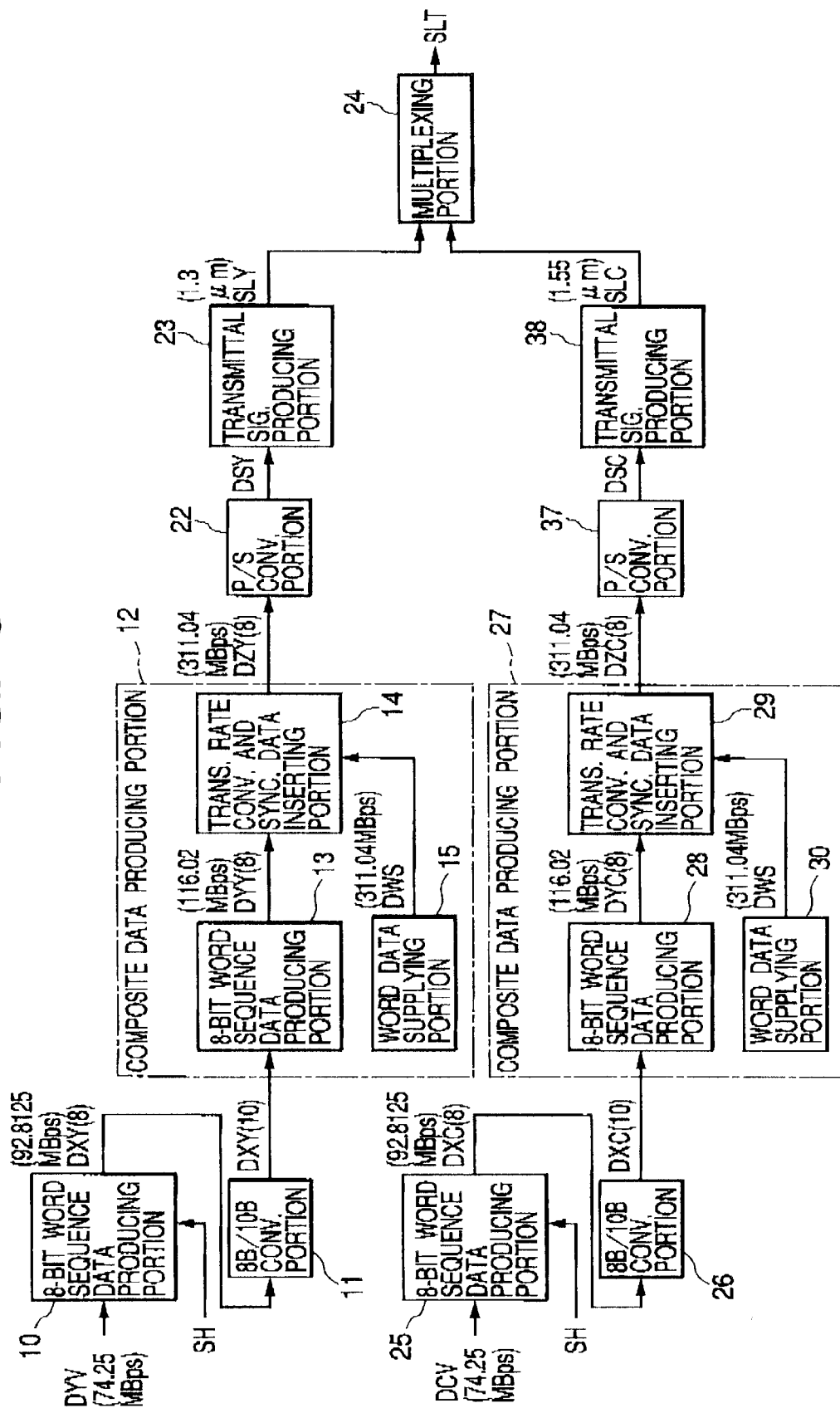
FIG. 5 is a schematic block diagram showing a first embodiment of apparatus for transmitting digital data according to the present invention, in which a first embodiment of method of transmitting digital data according to the present invention is carried out.

FIG. 5 shows a first embodiment of apparatus for transmitting digital data according to the present invention, in which a first embodiment of method of transmitting digital data according to the present invention is carried out.

Figure 1:
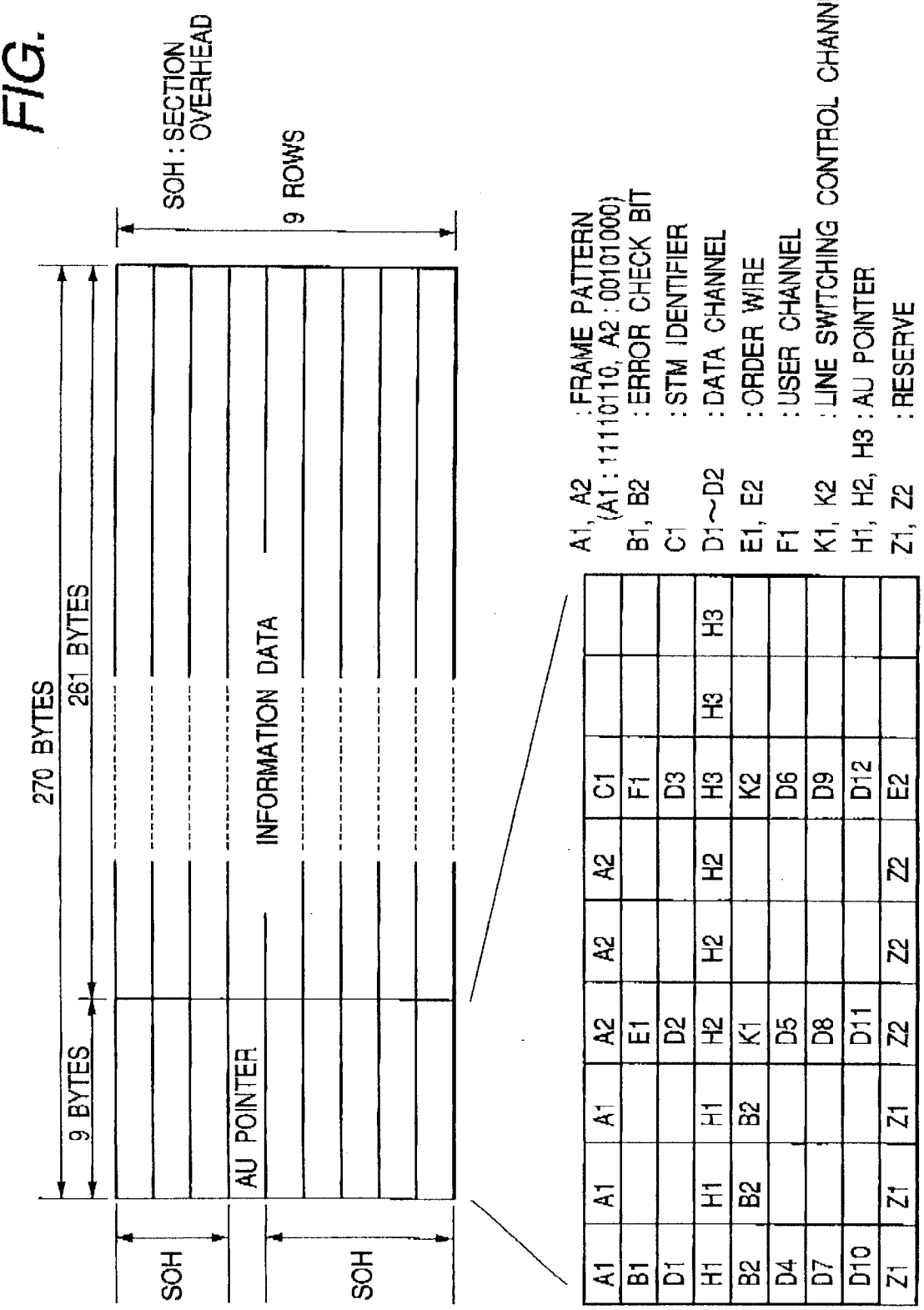
FIG. 1 shows a data format for the STM-1 used for transmission of digital date.
Figure 2:
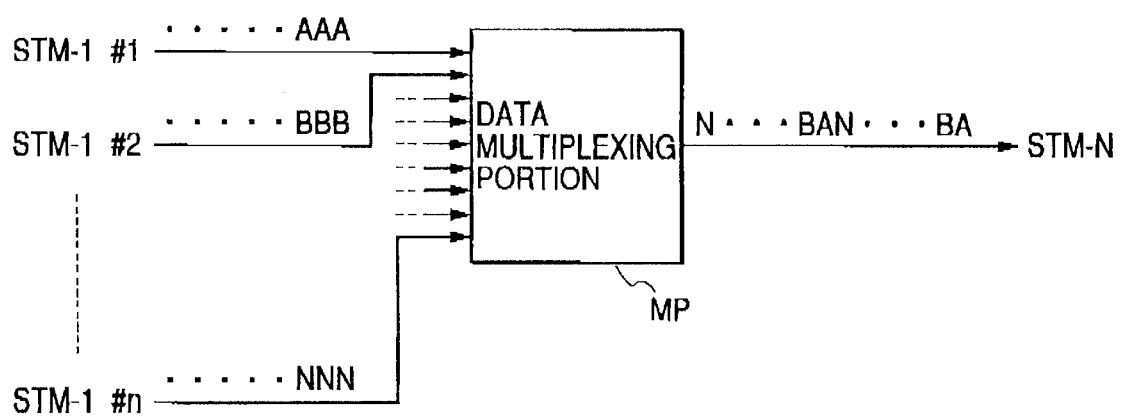
FIG. 2 shows an illustration used for explanation of the STM-N obtained by multiplexing a plurality of STM-1s.
Figure 3:
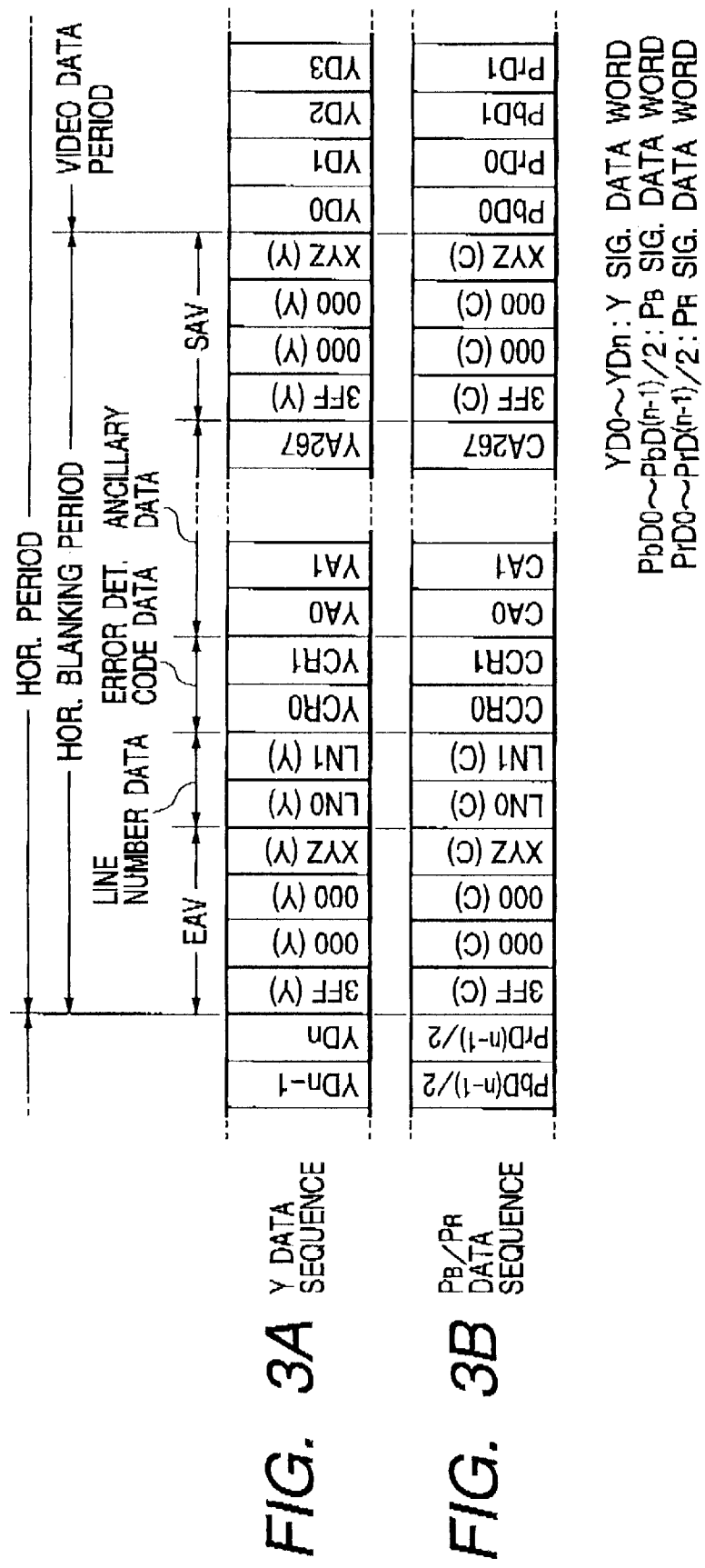
FIGS. 3A and 3B are time charts used for explanation of an example of a data format for a digital video signal.
Figure 4:
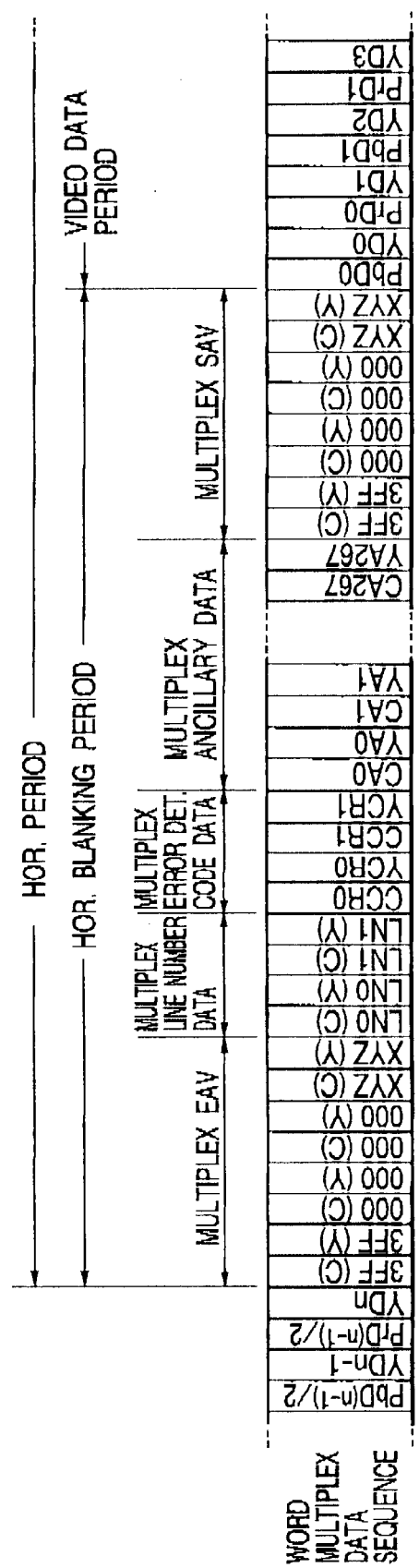
FIG. 4 is a time chart used for explanation of another example of a data format for a digital video signal.

Referring to FIG. 5, a Y data sequence DYV such as shown in FIG. 3A, which represents luminance signal information data constituting partially a digital video signal, is supplied to an 8-bit word sequence data producing portion 10 as first digital image information data. The Y data sequence DYV is constituted with 10-bit word sequence data having the word transmission rate of, for example, 74.25 MBps.

A line synchronous signal SH relative to the Y data sequence DYV is also supplied to the 8-bit word sequence data producing portion 10. In the 8-bit word sequence data producing portion 10, the Y data sequence DYV is converted into word sequence data in which each word is composed of 8 bits with time reference defined by the line synchronous signal SH to produce 8-bit word sequence data DXY(8) having the word transmission rate of, for example, 742.5/8=92.8125 MBps. The 8-bit word sequence data DXY(8) are supplied from the 8-bit word sequence data producing portion 10 to a 8B/10B converting portion 11 for converting every 8 bits into 10 bits.

In the 8B/10B converting portion 11, the 8-bit word sequence data DXY(8) are subjected to 8B/10B conversion by which every 8 bits constituting each word of the 8-bit word sequence data DXY(8) are converted into 10 bits to produce 10-bit word sequence data DXY(10). The 10-bit word sequence data DXY(10) are supplied from the 8B/10B converting portion 11 to a composite data producing portion 12.

In the composite data producing portion 12, the 10-bit word sequence data DXY(10) are supplied to an 8-bit word sequence data producing portion 13. In the 8-bit word sequence data producing portion 13, the 10-bit word sequence data DXY(10) are converted into word sequence data in which each word is composed of 8 bits to produce 8-bit word sequence data DYY(8) having the word transmission rate of, for example, 928.125/8=116.015625 MBps (hereinafter, referred to 116.02 MBps). The 8-bit word sequence data DYY(8) are supplied from the 8-bit word sequence data producing portion 13 to a transmission rate converting and synchronous data inserting portion 14.

An additional word data group DWS which is constituted with a plurality of 8-bit data words including 8-bit word synchronous data and forwarded from a word data supplying portion 15 is also supplied to the transmission rate converting and synchronous data inserting portion 14. The additional word data group DWS has the word transmission rate of 311.04 MBps.

In the transmission rate converting and synchronous data inserting portion 14, the word transmission rate of the 8-bit word sequence data DYY(8) is converted from 116.02 MBps to 311.04 MBps and then the additional word data group DWS including the 8-bit word synchronous data is inserted into the 8-bit word sequence data DYY(8) at predetermined word intervals to produce composite 8-bit word sequence data DZY(8) having the word transmission rate of 311.04 MBps.

Figure 6:
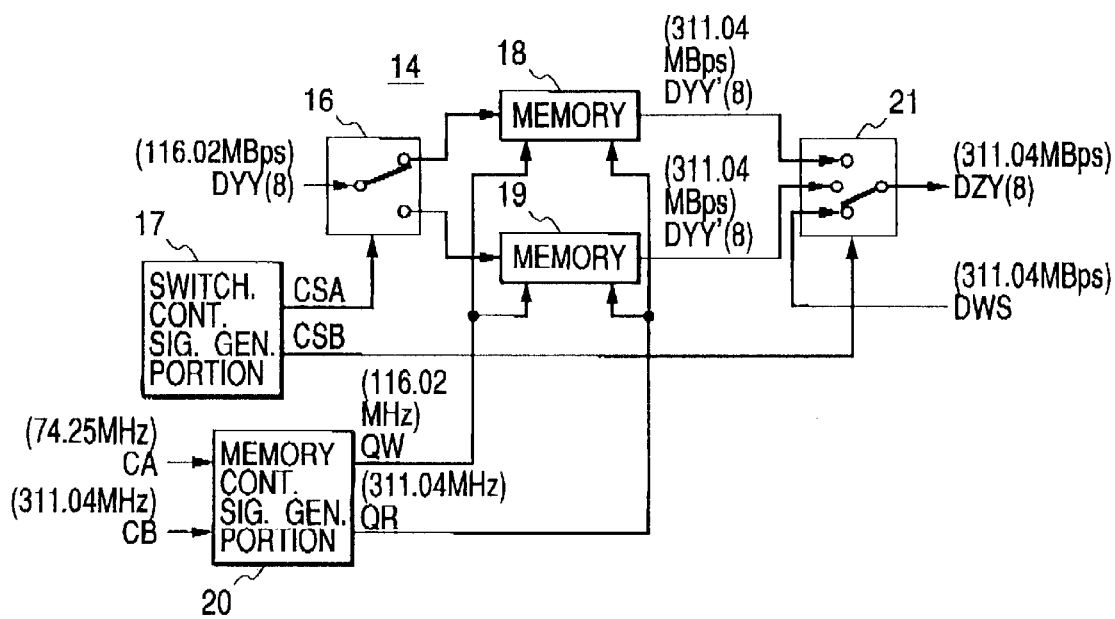
FIG. 6 is a schematic block diagram showing a first embodiment of a transmission date converting and synchronous data inserting portion provided in the apparatus shown in FIG. 5.

FIG. 6 shows an embodiment of the transmission rate converting and synchronous data inserting portion 14. In the embodiment shown in FIG. 6, the 8-bit word sequence data DYY(8) based on the Y data sequence DYV are supplied to a switch 16. The switch 16 performs switching operations at every two line periods (2LT) of the 8-bit word sequence data DYY(8) in response to a control signal CSA supplied from a switching control signal generating portion 17 so as to supply alternately a memory 18 and a memory 19 with the 8-bit word sequence data DYY(8) at every 2LT.

A memory control signal generating portion 20 to which a clock pulse signal CA having the frequency of 74.25 MHz corresponding to the word transmission rate of the Y data sequence DYV and a clock pulse signal CB having the frequency of 311.04 MHz are supplied, is provided in relation to the memories 18 and 19. The memory control signal generating portion 20 is operative to produce a write control signal QW having the frequency of 74.25 MHz× 100/64=116.02 MHz based on the clock pulse signal CA and a read control signal QR having the frequency of 311.04 MHz based on the clock pulse signal CB and to supply each of the memories 18 and 19 with the write control signal QW and the read control signal QR.

In the memory 18, the 8-bit word sequence data DYY(8) having the word transmission rate of 116.02 MBps are written to be stored in accordance with the write control signal QW having the frequency of 116.02 MHz when the 8-bit word sequence data DYY(8) are supplied through the switch 16 to the memory 18. Similarly, in the memory 19, the 8-bit word sequence data DYY(8) having the word transmission rate of 116.02 MBps are written to be stored in accordance with the write control signal QW having the frequency of 116.02 MHz when the 8-bit word sequence data DYY(8) are supplied through the switch 16 to the memory 19. Accordingly, the 8-bit word sequence data DYY(8) having the word transmission rate of 116.02 MBps are written to be stored in the memories 18 and 19 alternately at every 2LT.

The 8-bit word sequence data DYY(8) stored in the memory 18 during a certain 2LT are read from the memory 18 during the next 2LT in accordance with the read control signal QR having the frequency of 311.04 MHz so as to produce 8-bit word sequence data DYY'(8) having the word transmission rate of 311.04 MBps. The 8-bit word sequence data DYY'(8) thus obtained from the memory 18 are supplied to a switch 21. The 8-bit word sequence data DYY(8) stored in the memory 19 during a certain 2LT are read from the memory 19 during the next 2LT in accordance with the read control signal QR having the frequency of 311.04 MHz so as to produce 8-bit word sequence data DYY'(8) having the word transmission rate of 311.04 MBps. The 8-bit word sequence data DYY'(8) thus obtained from the memory 19 are also supplied to the switch 21. The additional word data group DWS having the word transmission rate of 311.04 MBps is further supplied from the word data supplying portion 15 to the switch 21.

The switch 21 is operative to extract successively the additional word data group DWS having the word transmission rate of 311.04 MBps and supplied from the word data supplying portion 15, the 8-bit word sequence data DYY'(8) having the word transmission rate of 311.04 MBps and read from the memory 18 and the 8-bit word sequence data DYY'(8) having the word transmission rate of 311.04 MBps and read from the memory 19 at every portion thereof containing 8-bit word data of a predetermined number, in response to a control signal CSB supplied from the switching control signal generating portion 17. As a result, the composite 8-bit word sequence data DZY(8) which are obtained by inserting the additional word data group DWS having the word transmission rate of 311.04 MBps into the 8-bit word sequence data DYY'(8) having the word transmission rate of 311.04 MBps at predetermined word intervals are derived from the switch 21.

An example of the additional word data group DWS supplied from the word data supplying portion 15, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s each allotted the specific code of 11110110 and following the optional 8-bit word data, and three 8-bit word synchronous data A2s each allotted the specific code of 00101000 and following the 8-bit word synchronous data A1 to be provided at the end portion.

Figure 7:
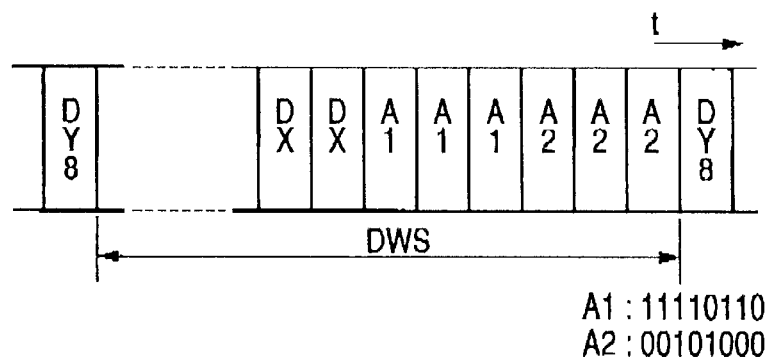
FIG. 7 is a time chart used for explanation of the method carried out in the apparatus shown in FIG. 5.

A portion of the composite 8-bit word sequence data DZY(8) in which the example of the additional word data group DWS mentioned above is inserted is shown in FIG. 7. In FIG. 7, DY8 represents 8-bit word data contained in the 8-bit word sequence data DYY'(8) read from the memory 18 or 19 shown in FIG. 6 and DX represents the optional 8-bit word data. An arrow t shown in FIG. 7 represents the lapse of time.

Another example of the additional word data group DWS supplied from the word data supplying portion 15, which has the word transmission rate of 311.04 MBps, is formed to have at least one optional 8-bit word data provided at the beginning portion, three 8-bit word synchronous data A1s each allotted the specific code of 11110110 and following the optional 8-bit word data, three 8-bit word synchronous data A2s each allotted the specific code of 00101000 and following the 8-bit word synchronous data A1, and at least one optional 8-bit word data provided at the end portion.

Figure 8:
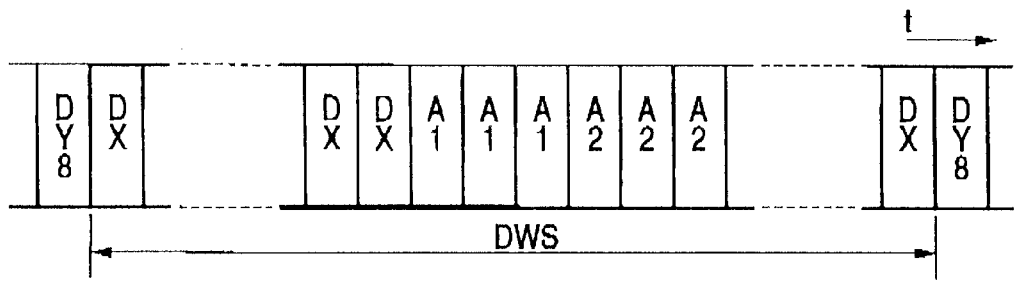
FIG. 8 is a time chart used for explanation of the method carried out in the apparatus shown in FIG. 5.

A portion of the composite 8-bit word sequence data DZY(8) in which the second example of the additional word data group DWS mentioned above is inserted is shown in FIG. 8. In FIG. 8, DY8 represents 8-bit word data contained in the 8-bit word sequence data DYY'(8) read from the memory 18 or 19 shown in FIG. 6 and DX represents the optional 8-bit word data. An arrow t shown in FIG. 8 represents also the lapse of time.

The composite 8-bit word sequence data DZY(8) thus produced in the transmission rate converting and synchronous data inserting portion 14 are derived from the composite data producing portion 12 to a parallel to serial (P/S) converting portion 22. In the P/S converting portion 22, the composite 8-bit word sequence data DZY(8) is subjected to P/S conversion by which parallel data are converted into serial data to produce serial data DSY based on the composite 8-bit word sequence data DZY(8). The serial data DSY are supplied from the P/S converting portion 22 to a transmittal signal producing portion 23. The transmittal signal producing portion 23 is operative to convert the serial data DSY to a transmittal signal which is, for example, an optical signal SLY having the wavelength of about 1.3 μm and fit for a data transmission line made of optical fiber. The optical signal SLY obtained from the transmittal signal producing portion 23 is supplied to a multiplexing portion 24 which is formed with, for example, a wave synthesizing portion.

A $P_B/P_R$ data sequence DCV such as shown in FIG. 3B, which represents chrominance signal information data constituting partially the digital video signal, is supplied to an 8-bit word sequence data producing portion 25 as second digital image information data. The $P_B/P_R$ data sequence DCV is constituted with 10-bit word sequence data having the word transmission rate of, for example, 74.25 MBps.

A line synchronous signal SH relative to the $P_B/P_R$ data sequence DCV is also supplied to the 8-bit word sequence data producing portion 25. In the 8-bit word sequence data producing portion 25, the $P_B/P_R$ data sequence DCV is converted into word sequence data in which each word is composed of 8 bits with time reference defined by the line synchronous signal SH to produce 8-bit word sequence data DXC(8) having the word transmission rate of, for example, 742.5/8=92.8125 MBps. The 8-bit word sequence data DXC(8) are supplied from the 8-bit word sequence data producing portion 25 to a 8B/10B converting portion 26 for converting every 8 bits into 10 bits.

In the 8B/10B converting portion 26, the 8-bit word sequence data DXC(8) are subjected to 8B/10B conversion by which every 8 bits constituting each word of the 8-bit word sequence data DXC(8) are converted into 10 bits to produce 10-bit word sequence data DXC(10). The 10-bit word sequence data DXC(10) are supplied from the 8B/10B converting portion 26 to a composite data producing portion 27.

In the composite data producing portion 27, the 10-bit word sequence data DXC(10) are supplied to an 8-bit word sequence data producing portion 28. In the 8-bit word sequence data producing portion 28, the 10-bit word sequence data DXC(10) are converted into word sequence data in which each word is composed of 8 bits to produce 8-bit word sequence data DYC(8) having the word transmission rate of, for example, 116.02 MBps. The 8-bit word sequence data DYC(8) are supplied from the 8-bit word sequence data producing portion 28 to a transmission rate converting and synchronous data inserting portion 29.

An additional word data group DWS which is constituted with a plurality of 8-bit data words including 8-bit word synchronous data and forwarded from a word data supplying portion 30 is also supplied to the transmission rate converting and synchronous data inserting portion 29. The additional word data group DWS has the word transmission rate of 311.04 MBps.

In the transmission rate converting and synchronous data inserting portion 29, the word transmission rate of the 8-bit word sequence data DYC(8) is converted from 116.02 MBps to 311.04 MBps and then the additional word data group DWS including the 8-bit word synchronous data is inserted into the 8-bit word sequence data DYC(8) at predetermined word intervals to produce composite 8-bit word sequence data DZC(8) having the word transmission rate of 311.04 MBps.

Figure 9:
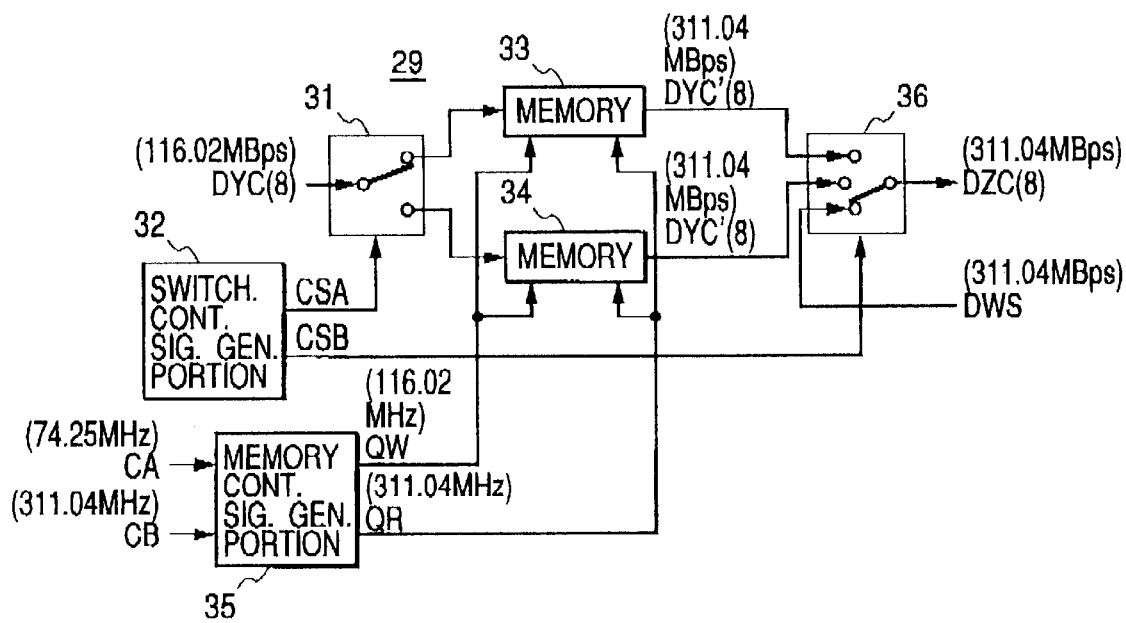
FIG. 9 is a schematic block diagram showing a second embodiment of a transmission date converting and synchronous data inserting portion provided in the apparatus shown in FIG. 5.

FIG. 9 shows an embodiment of the transmission rate converting and synchronous data inserting portion 29. In the embodiment shown in FIG. 9, the 8-bit word sequence data DYC(8) based on the $P_B/P_R$ data sequence DCV are supplied to a switch 31. The switch 31 performs switching operations at every 2LT of the 8-bit word sequence data DYC(8) in response to a control signal CSA supplied from a switching control signal generating portion 32 so as to supply alternately a memory 33 and a memory 34 with the 8-bit word sequence data DYC(8) at every 2LT.

A memory control signal generating portion 35 to which a clock pulse signal CA having the frequency of 74.25 MHz corresponding to the word transmission rate of the $P_B/P_R$ data sequence DCV and a clock pulse signal CB having the frequency of 311.04 MHz are supplied, is provided in relation to the memories 33 and 34. The memory control signal generating portion 35 is operative to produce a write control signal QW having the frequency of 74.25 MHz× 100/64=116.02 MHz based on the clock pulse signal CA and a read control signal QR having the frequency of 311.04 MHz based on the clock pulse signal CB and to supply each of the memories 33 and 34 with the write control signal QW and the read control signal QR.

In the memory 33, the 8-bit word sequence data DYC(8) having the word transmission rate of 116.02 MBps are written to be stored in accordance with the write control signal QW having the frequency of 116.02 MHz when the 8-bit word sequence data DYC(8) are supplied through the switch 31 to the memory 33. Similarly, in the memory 34, the 8-bit word sequence data DYC(8) having the word transmission rate of 116.02 MBps are written to be stored in accordance with the write control signal QW having the frequency of 116.02 MHz when the 8-bit word sequence data DYC(8) are supplied through the switch 31 to the memory 34. Accordingly, the 8-bit word sequence data DYC(8) having the word transmission rate of 116.02 MBps are written to be stored in the memories 33 and 34 alternately at every 2LT.

The 8-bit word sequence data DYC(8) stored in the memory 33 during a certain 2LT are read from the memory 33 during the next 2LT in accordance with the read control signal QR having the frequency of 311.04 MHz so as to produce 8-bit word sequence data DYC'(8) having the word transmission rate of 311.04 MBps. The 8-bit word sequence data DYC'(8) thus obtained from the memory 33 are supplied to a switch 36. The 8-bit word sequence data DYC(8) stored in the memory 34 during a certain 2LT are read from the memory 34 during the next 2LT in accordance with the read control signal QR having the frequency of 311.04 MHz so as to produce 8-bit word sequence data DYC'(8) having the word transmission rate of 311.04 MBps. The 8-bit word sequence data DYC'(8) thus obtained from the memory 34 are also supplied to the switch 36. The additional word data group DWS having the word transmission rate of 311.04 MBps is further supplied from the word data supplying portion 30 to the switch 36.

The switch 36 is operative to extract successively the additional word data group DWS having the word transmission rate of 311.04 MBps and supplied from the word data supplying portion 30, the 8-bit word sequence data DYC'(8) having the word transmission rate of 311.04 MBps and read from the memory 33 and the 8-bit word sequence data DYC'(8) having the word transmission rate of 311.04 MBps and read from the memory 34 at every portion thereof containing 8-bit word data of a predetermined number, in response to a control signal CSB supplied from the switching control signal generating portion 32. As a result, the composite 8-bit word sequence data DZC(8) which are obtained by inserting the additional word data group DWS having the word transmission rate of 311.04 MBps into the 8-bit word sequence data DYC'(8) having the word transmission rate of 311.04 MBps at predetermined word intervals are derived from the switch 36.

An example of the additional word data group DWS supplied from the word data supplying portion 30, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s each allotted the specific code of 11110110 and following the optional 8-bit word data, and three 8-bit word synchronous data A2s each allotted the specific code of 00101000 and following the 8-bit word synchronous data A1 to be provided at the end portion.

Figure 10:
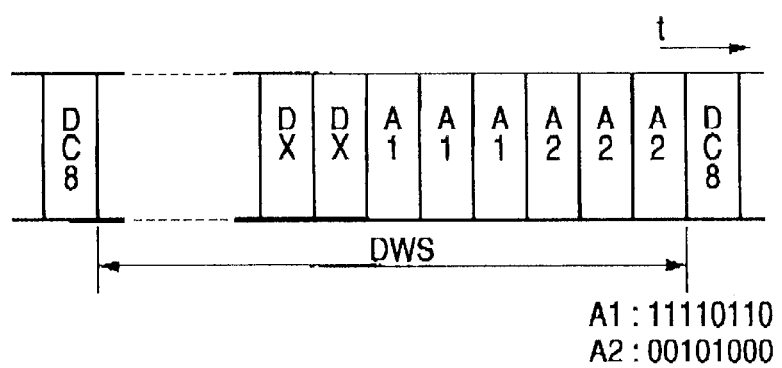
FIG. 10 is a time chart used for explanation of the method carried out in the apparatus shown in FIG. 5.

A portion of the composite 8-bit word sequence data DZC(8) in which the example of the additional word data group DWS mentioned above is inserted is shown in FIG. 10. In FIG. 10, DC8 represents 8-bit word data contained in the 8-bit word sequence data DYC'(8) read from the memory 33 or 34 shown in FIG. 9 and DX represents the optional 8-bit word data. An arrow t shown in FIG. 10 represents the lapse of time.

Another example of the additional word data group DWS supplied from the word data supplying portion 30, which has the word transmission rate of 311.04 MBps, is formed to have at least one optional 8-bit word data provided at the beginning portion, three 8-bit word synchronous data A1s each allotted the specific code of 11110110 and following the optional 8-bit word data, three 8-bit word synchronous data A2s each allotted the specific code of 00101000 and following the 8-bit word synchronous data A1, and at least one optional 8-bit word data provided at the end portion.

Figure 11:
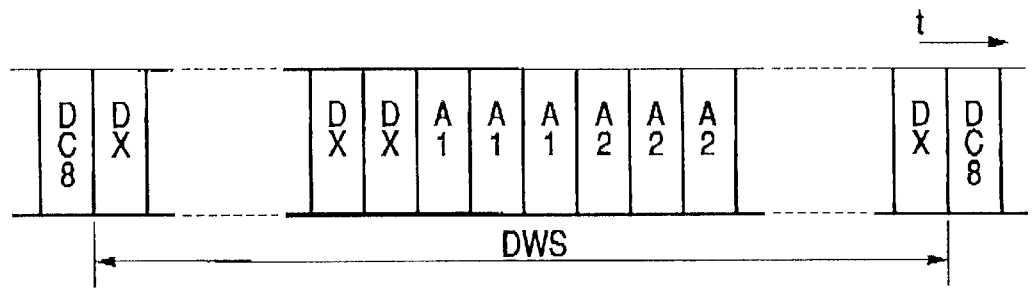
FIG. 11 is a time chart used for explanation of the method carried out in the apparatus shown in FIG. 5.

A portion of the composite 8-bit word sequence data DZC(8) in which the second example of the additional word data group DWS mentioned above is inserted is shown in FIG. 11. In FIG. 11, DC8 represents 8-bit word data contained in the 8-bit word sequence data DYC'(8) read from the memory 33 or 34 shown in FIG. 9 and DX represents the optional 8-bit word data. An arrow t shown in FIG. 11 represents also the lapse of time.

The composite 8-bit word sequence data DZC(8) thus produced in the transmission rate converting and synchronous data inserting portion 29 are derived from the composite data producing portion 27 to a P/S converting portion 37. In the P/S converting portion 37, the composite 8-bit word sequence data DZC(8) is subjected to P/S conversion by which parallel data are converted into serial data to produce serial data DSC based on the composite 8-bit word sequence data DZC(8). The serial data DSC are supplied from the P/S converting portion 37 to a transmittal signal producing portion 38. The transmittal signal producing portion 38 is operative to convert the serial data DSC to a transmittal signal which is, for example, an optical signal SLC having the wavelength of about 1.55 $\mu$m and fit for a data transmission line made of optical fiber. The optical signal SLC obtained from the transmittal signal producing portion 38 is supplied to the multiplexing portion 24 which is formed with, for example, a wave synthesizing portion.

In the multiplexing portion 24, the optical signal SLY obtained from the transmittal signal producing portion 23 and the optical signal SLC obtained from the transmittal signal producing portion 38 are subjected to multiplexing such as wave-synthesizing to produce a multiplex optical signal SLT. The multiplex optical signal SLT is derived from the multiplexing portion 24 to a data transmission line made of optical fiber, so that the serial data DSY and DSC are transmitted through the data transmission line.

In the embodiment shown in FIG. 5, the 8-bit word sequence data DXY(8) obtained from the 8-bit word sequence data producing portion 10 are subjected to the 8B/10B conversion in the 8B/10B converting portion 11 and the 10-bit word sequence data DXY(10) obtained from the 8B/10B converting portion 11 are supplied to the composite data producing portion 12 so as to produce the composite 8-bit word sequence data DZY(8), and the 8-bit word sequence data DXC(8) obtained from the 8-bit word sequence data producing portion 25 are subjected to the 8B/10B conversion in the 8B/10B converting portion 26 and the 10-bit word sequence data DXC(10) obtained from the 8B/10B converting portion 26 are supplied to the composite data producing portion 27 so as to produce the composite 8-bit word sequence data DZC(8). Since the composite 8-bit word sequence data DZY(8) are produced based on the 10-bit word sequence data DXY(10) which are obtained by causing the 8-bit word sequence data DXY(8) to be subjected to the 8B/10B conversion and the composite 8-bit word sequence data DZC(8) are produced based on the 10-bit word sequence data DXC(10) which are obtained by causing the 8-bit word sequence data DXC(8) to be subjected to the 8B/10B conversion as described above, each of the serial data DSY and DSC produced based on the composite 8-bit word sequence data DZY(8) and DZC(8), respectively, are improved in quality of signal and thereby the reliability in transmission thereof is increased.

Figure 12:
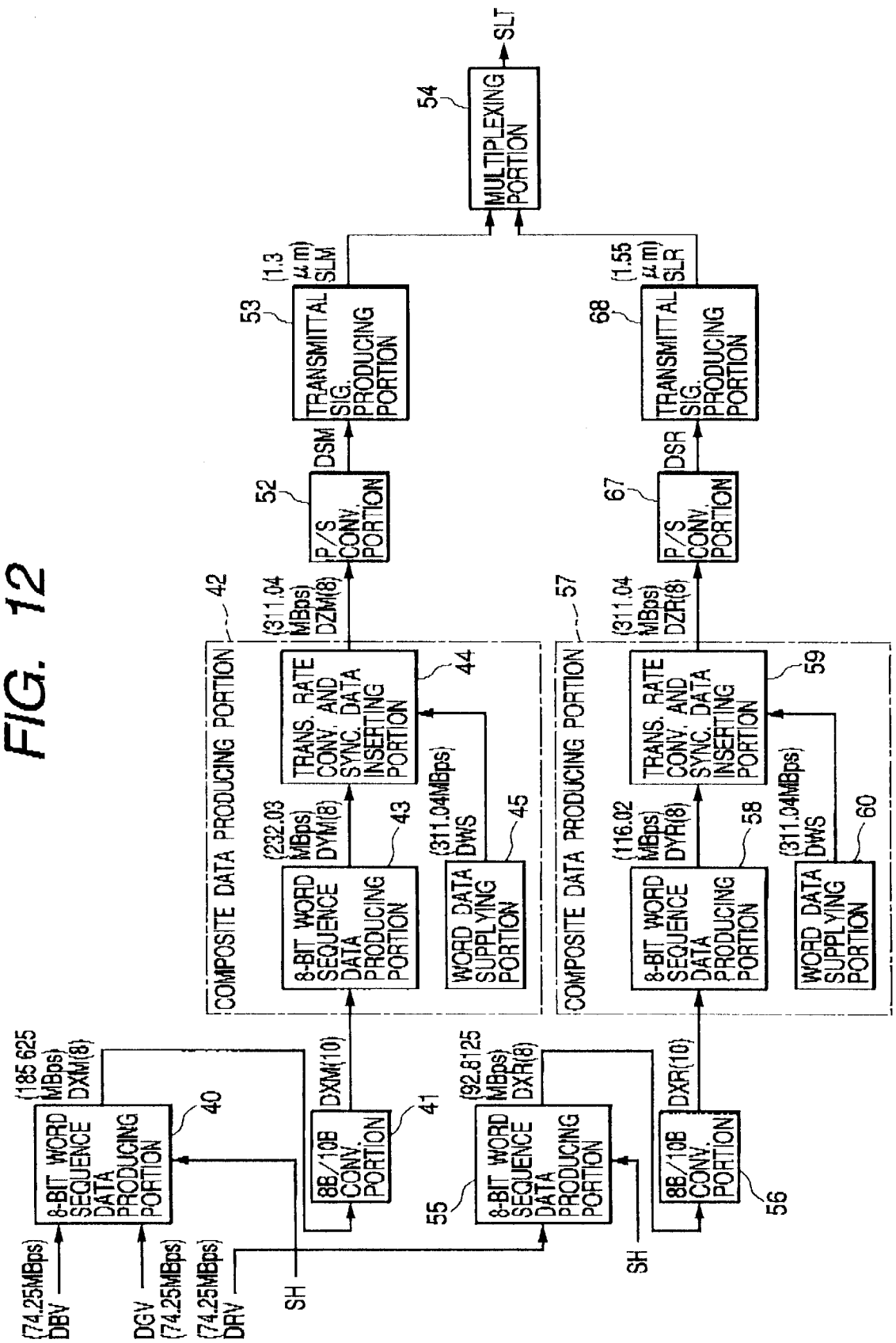
FIG. 12 is a schematic block diagram showing a second embodiment of apparatus for transmitting digital data according to the present invention, in which a second embodiment of method of transmitting digital data according to the present invention is carried out.

FIG. 12 shows a second embodiment of apparatus for transmitting digital data according to the present invention, in which a second embodiment of method of transmitting digital data according to the present invention is carried out.

Referring to FIG. 12, digital data representing blue primary color signal information (blue primary color signal information data) DBV and digital data representing green primary color signal information (green primary color signal information data) DGV, which constitute partially a digital video signal, are supplied to an 8-bit word sequence data producing portion 40 as first digital image information data. Each of the blue primary color signal information data DBV and the green primary color signal information data DGV are constituted with 10-bit word sequence data having the word transmission rate of, for example, 74.25 MBps.

A line synchronous signal SH relative to both of the blue primary color signal information data DBV and the green primary color signal information data DGV is also supplied to the 8-bit word sequence data producing portion 40. In the 8-bit word sequence data producing portion 40, each of the blue primary color signal information data DBV and the green primary color signal information data DGV are converted into word sequence data in which each word is composed of 8 bits with time reference defined by the line synchronous signal SH to produce 8-bit word sequence data DXM(8) having the word transmission rate of, for example, (742.5/8)×2=185.625 MBps. The 8-bit word sequence data DXM(8) are supplied from the 8-bit word sequence data producing portion 40 to a 8B/10B converting portion 41 for converting every 8 bits into 10 bits.

In the 8B/10B converting portion 41, the 8-bit word sequence data DXM(8) are subjected to 8B/10B conversion by which every 8 bits constituting each word of the 8-bit word sequence data DXM(8) are converted into 10 bits to produce 10-bit word sequence data DXM(10). The 10-bit word sequence data DXM(10) are supplied from the 8B/10B converting portion 41 to a composite data producing portion 42.

In the composite data producing portion 42, the 10-bit word sequence data DXM(10) are supplied to an 8-bit word sequence data producing portion 43. In the 8-bit word sequence data producing portion 43, the 10-bit word sequence data DXM(10) are converted into word sequence data in which each word is composed of 8 bits to produce 8-bit word sequence data DYM(8) having the word transmission rate of, for example, 1856.25/8=232.03125 MBps (hereinafter, referred to 232.03 MBps). The 8-bit word sequence data DYM(8) are supplied from the 8-bit word sequence data producing portion 43 to a transmission rate converting and synchronous data inserting portion 44.

An additional word data group DWS which is constituted with a plurality of 8-bit data words including 8-bit word synchronous data and forwarded from a word data supplying portion 45 is also supplied to the transmission rate converting and synchronous data inserting portion 44. The additional word data group DWS has the word transmission rate of 311.04 MBps.

In the transmission rate converting and synchronous data inserting portion 44, the word transmission rate of the 8-bit word sequence data DYM(8) is converted from 232.03 MBps to 311.04 MBps and then the additional word data group DWS including the 8-bit word synchronous data is inserted into the 8-bit word sequence data DYM(8) at predetermined word intervals to produce composite 8-bit word sequence data DZM(8) having the word transmission rate of 311.04 MBps.

Figure 13:
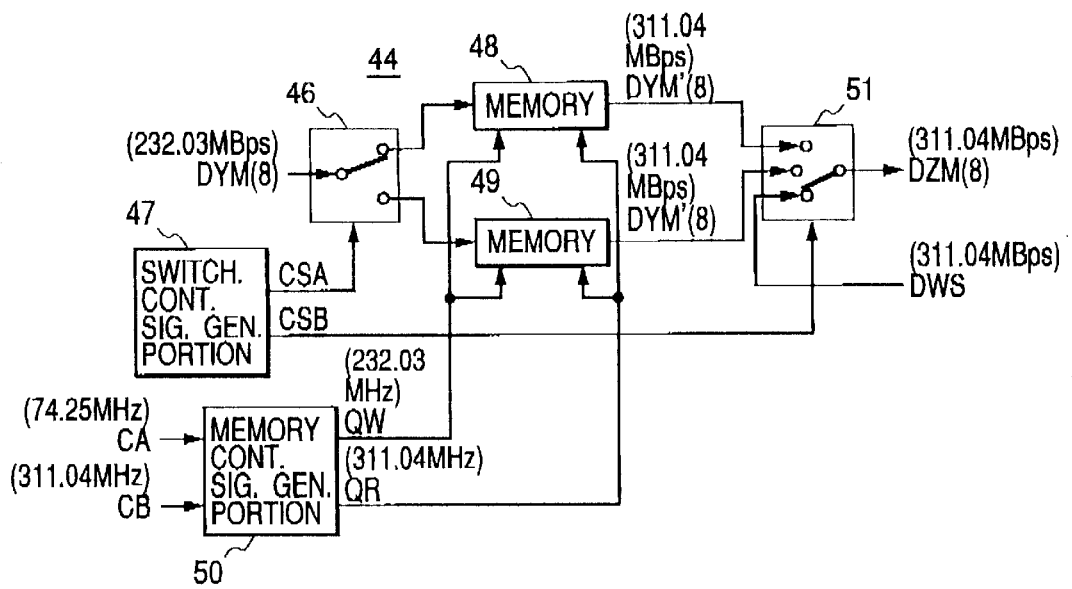
FIG. 13 is a schematic block diagram showing a first embodiment of a transmission date converting and synchronous data inserting portion provided in the apparatus shown in FIG. 12.

FIG. 13 shows an embodiment of the transmission rate converting and synchronous data inserting portion 44. In the embodiment shown in FIG. 13, the 8-bit word sequence data DYM(8) based on the blue primary color signal information data DBV and the green primary color signal information data DGV are supplied to a switch 46. The switch 46 performs switching operations at every 2LT of the 8-bit word sequence data DYM(8) in response to a control signal CSA supplied from a switching control signal generating portion 47 so as to supply alternately a memory 48 and a memory 49 with the 8-bit word sequence data DYM(8) at every 2LT.

A memory control signal generating portion 50 to which a clock pulse signal CA having the frequency of 74.25 MHz corresponding to the word transmission rate of each of the blue primary color signal information data DBV and the green primary color signal information data DGV and a clock pulse signal CB having the frequency of 311.04 MHz are supplied, is provided in relation to the memories 48 and 49. The memory control signal generating portion 50 is operative to produce a write control signal QW having the frequency of (74.25 MHz×100/64)×2=232.03 MHz based on the clock pulse signal CA and a read control signal QR having the frequency of 311.04 MHz based on the clock pulse signal CB and to supply each of the memories 48 and 49 with the write control signal QW and the read control signal QR.

In the memory 48, the 8-bit word sequence data DYM(8) having the word transmission rate of 232.03 MBps are written to be stored in accordance with the write control signal QW having the frequency of 232.03 MHz when the 8-bit word sequence data DYM(8) are supplied through the switch 46 to the memory 48. Similarly, in the memory 49, the 8-bit word sequence data DYM(8) having the word transmission rate of 232.03 MBps are written to be stored in accordance with the write control signal QW having the frequency of 232.03 MHz when the 8-bit word sequence data DYM(8) are supplied through the switch 46 to the memory 49. Accordingly, the 8-bit word sequence data DYM(8) having the word transmission rate of 232.03 MBps are written to be stored in the memories 48 and 49 alternately at every 2LT.

The 8-bit word sequence data DYM(8) stored in the memory 48 during a certain 2LT are read from the memory 48 during the next 2LT in accordance with the read control signal QR having the frequency of 311.04 MHz so as to produce 8-bit word sequence data DYM'(8) having the word transmission rate of 311.04 MBps. The 8-bit word sequence data DYM'(8) thus obtained from the memory 48 are supplied to a switch 51. The 8-bit word sequence data DYM(8) stored in the memory 49 during a certain 2LT are read from the memory 49 during the next 2LT in accordance with the read control signal QR having the frequency of 311.04 MHz so as to produce 8-bit word sequence data DYM'(8) having the word transmission rate of 311.04 MBps. The 8-bit word sequence data DYM'(8) thus obtained from the memory 49 are also supplied to the switch 51. The additional word data group DWS having the word transmission rate of 311.04 MBps is further supplied from the word data supplying portion 45 to the switch 51.

The switch 51 is operative to extract successively the additional word data group DWS having the word transmission rate of 311.04 MBps and supplied from the word data supplying portion 45, the 8-bit word sequence data DYM'(8) having the word transmission rate of 311.04 MBps and read from the memory 48 and the 8-bit word sequence data DYM'(8) having the word transmission rate of 311.04 MBps and read from the memory 49 at every portion thereof containing 8-bit word data of a predetermined number, in response to a control signal CSB supplied from the switching control signal generating portion 47. As a result, the composite 8-bit word sequence data DZM(8) which are obtained by inserting the additional word data group DWS having the word transmission rate of 311.04 MBps into the 8-bit word sequence data DYM'(8) having the word transmission rate of 311.04 MBps at predetermined word intervals are derived from the switch 51.

An example of the additional word data group DWS supplied from the word data supplying portion 45, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion. Another example of the additional word data group DWS supplied from the word data supplying portion 45, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

A portion of the composite 8-bit word sequence data DZY(8) in which one of the examples of the additional word data group DWS mentioned above is inserted is substantially the same as that shown in FIG. 7 or 8.

The composite 8-bit word sequence data DZM(8) thus produced in the transmission rate converting and synchronous data inserting portion 44 are derived from the composite data producing portion 42 to a P/S converting portion 52. In the P/S converting portion 52, the composite 8-bit word sequence data DZM(8) is subjected to P/S conversion by which parallel data are converted into serial data to produce serial data DSM based on the composite 8-bit word sequence data DZM(8). The serial data DSM are supplied from the P/S converting portion 52 to a transmittal signal producing portion 53. The transmittal signal producing portion 53 is operative to convert the serial data DSM to a transmittal signal which is, for example, an optical signal SLM having the wavelength of about 1.3 $\mu$m and fit for a data transmission line made of optical fiber. The optical signal SLM obtained from the transmittal signal producing portion 53 is supplied to a multiplexing portion 54 which is formed with, for example, a wave synthesizing portion.

Red primary color signal information data DRV which constitute the digital video signal, together with the blue primary color signal information data DBV and the green primary color signal information data DGV, are supplied to an 8-bit word sequence data producing portion 55 as second digital image information data. The red primary color signal information data DRV is also constituted with 10-bit word sequence data having the word transmission rate of, for example, 74.25 MBps.

A line synchronous signal SH relative to the red primary color signal information data DRV is also supplied to the 8-bit word sequence data producing portion 55. In the 8-bit word sequence data producing portion 55, the red primary color signal information data DRV are converted into word sequence data in which each word is composed of 8 bits with time reference defined by the line synchronous signal SH to produce 8-bit word sequence data DXR(8) having the word transmission rate of, for example, 742.5/8=92.8125 MBps. The 8-bit word sequence data DXR(8) are supplied from the 8-bit word sequence data producing portion 55 to a 8B/10B converting portion 56 for converting every 8 bits into 10 bits.

In the 8B/10B converting portion 56, the 8-bit word sequence data DXR(8) are subjected to 8B/10B conversion by which every 8 bits constituting each word of the 8-bit word sequence data DXR(8) are converted into 10 bits to produce 10-bit word sequence data DXR(10). The 10-bit word sequence data DXR(10) are supplied from the 8B/10B converting portion 56 to a composite data producing portion 57.

In the composite data producing portion 57, the 10-bit word sequence data DXR(10) are supplied to an 8-bit word sequence data producing portion 58. In the 8-bit word sequence data producing portion 58, the 10-bit word sequence data DXR(10) are converted into word sequence data in which each word is composed of 8 bits to produce 8-bit word sequence data DYR(8) having the word transmission rate of, for example, 116.02 MBps. The 8-bit word sequence data DYR(8) are supplied from the 8-bit word sequence data producing portion 58 to a transmission rate converting and synchronous data inserting portion 59.

An additional word data group DWS which is constituted with a plurality of 8-bit data words including 8-bit word synchronous data and forwarded from a word data supplying portion 60 is also supplied to the transmission rate converting and synchronous data inserting portion 59. The additional word data group DWS has the word transmission rate of 311.04 MBps.

In the transmission rate converting and synchronous data inserting portion 59, the word transmission rate of the 8-bit word sequence data DYR(8) is converted from 116.02 MBps to 311.04 MBps and then the additional word data group DWS including the 8-bit word synchronous data is inserted into the 8-bit word sequence data DYR(8) at predetermined word intervals to produce composite 8-bit word sequence data DZR(8) having the word transmission rate of 311.04 MBps.

Figure 14:
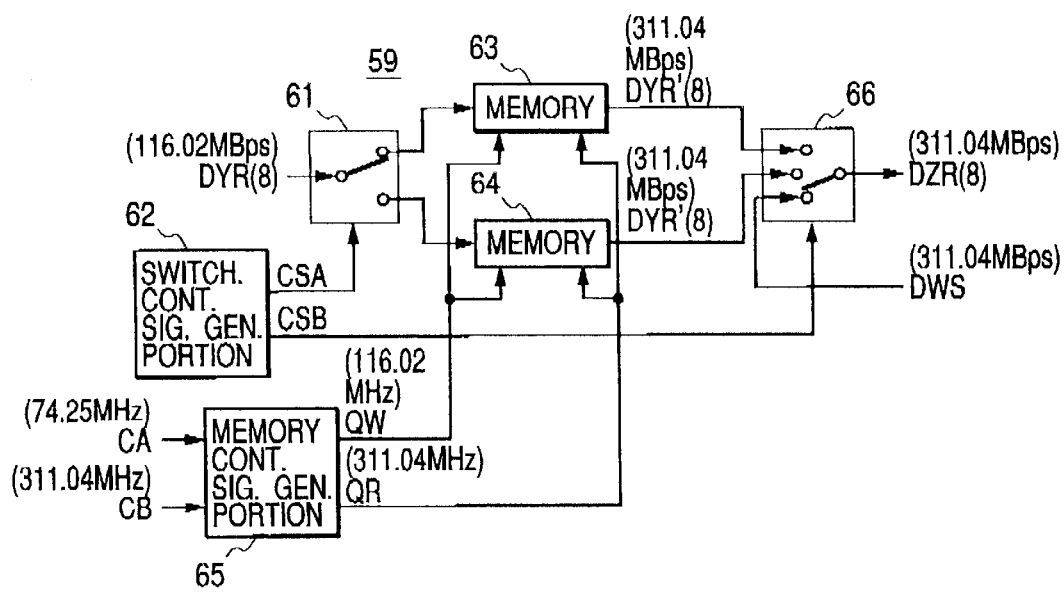
FIG. 14 is a schematic block diagram showing a second embodiment of a transmission rate converting and synchronous data inserting portion provided in the apparatus shown in FIG. 12.

FIG. 14 shows an embodiment of the transmission rate converting and synchronous data inserting portion 59. In the embodiment shown in FIG. 14, the 8-bit word sequence data DYR(8) based on the red primary color signal information data DRV are supplied to a switch 61. The switch 61 performs switching operations at every 2LT of the 8-bit word sequence data DYR(8) in response to a control signal CSA supplied from a switching control signal generating portion 62 so as to supply alternately a memory 63 and a memory 64 with the 8-bit word sequence data DYR(8) at every 2LT.

A memory control signal generating portion 65 to which a clock pulse signal CA having the frequency of 74.25 MHz corresponding to the word transmission rate of the red primary color signal information data DRV and a clock pulse signal CB having the frequency of 311.04 MHz are supplied, is provided in relation to the memories 63 and 64. The memory control signal generating portion 65 is operative to produce a write control signal QW having the frequency of 74.25 MHz×100/64=116.02 MHz based on the clock pulse signal CA and a read control signal QR having the frequency of 311.04 MHz based on the clock pulse signal CB and to supply each of the memories 63 and 64 with the write control signal QW and the read control signal QR.

In the memory 63, the 8-bit word sequence data DYR(8) having the word transmission rate of 116.02 MBps are written to be stored in accordance with the write control signal QW having the frequency of 116.02 MHz when the 8-bit word sequence data DYR(8) are supplied through the switch 61 to the memory 63. Similarly, in the memory 64, the 8-bit word sequence data DYR(8) having the word transmission rate of 116.02 MBps are written to be stored in accordance with the write control signal QW having the frequency of 116.02 MHz when the 8-bit word sequence data DYR(8) are supplied through the switch 61 to the memory 64. Accordingly, the 8-bit word sequence data DYR(8) having the word transmission rate of 116.02 MBps are written to be stored in the memories 63 and 64 alternately at every 2LT.

The 8-bit word sequence data DYR(8) stored in the memory 63 during a certain 2LT are read from the memory 63 during the next 2LT in accordance with the read control signal QR having the frequency of 311.04 MHz so as to produce 8-bit word sequence data DYR'(8) having the word transmission rate of 311.04 MBps. The 8-bit word sequence data DYR'(8) thus obtained from the memory 63 are supplied to a switch 66. The 8-bit word sequence data DYR(8) stored in the memory 64 during a certain 2LT are read from the memory 64 during the next 2LT in accordance with the read control signal QR having the frequency of 311.04 MHz so as to produce 8-bit word sequence data DYR'(8) having the word transmission rate of 311.04 MBps. The 8-bit word sequence data DYR'(8) thus obtained from the memory 64 are also supplied to the switch 66. The additional word data group DWS having the word transmission rate of 311.04 MBps is further supplied from the word data supplying portion 60 to the switch 66.

The switch 66 is operative to extract successively the additional word data group DWS having the word transmission rate of 311.04 MBps and supplied from the word data supplying portion 60, the 8-bit word sequence data DYR'(8) having the word transmission rate of 311.04 MBps and read from the memory 63 and the 8-bit word sequence data DYR'(8) having the word transmission rate of 311.04 MBps and read from the memory 64 at every portion thereof containing 8-bit word data of a predetermined number, in response to a control signal CSB supplied from the switching control signal generating portion 62. As a result, the composite 8-bit word sequence data DZR(8) which are obtained by inserting the additional word data group DWS having the word transmission rate of 311.04 MBps into the 8-bit word sequence data DYR'(8) having the word transmission rate of 311.04 MBps at predetermined word intervals are derived from the switch 66.

An example of the additional word data group DWS supplied from the word data supplying portion 60, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion. Another example of the additional word data group DWS supplied from the word data supplying portion 60, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

A portion of the composite 8-bit word sequence data DZR(8) in which one of the examples of the additional word data group DWS mentioned above is inserted is substantially the same as that shown in FIG. 7 or 8. The composite 8-bit word sequence data DZR(8) thus produced in the transmission rate converting and synchronous data inserting portion 59 are derived from the composite data producing portion 57 to a P/S converting portion 67. In the P/S converting portion 67, the composite 8-bit word sequence data DZR(8) is subjected to P/S conversion by which parallel data are converted into serial data to produce serial data DSR based on the composite 8-bit word sequence data DZR(8). The serial data DSR are supplied from the P/S converting portion 67 to a transmittal signal producing portion 68. The transmittal signal producing portion 68 is operative to convert the serial data DSR to a transmittal signal which is, for example, an optical signal SLR having the wavelength of about 1.55 $\mu$m and fit for a data transmission line made of optical fiber. The optical signal SLR obtained from the transmittal signal producing portion 68 is supplied to the multiplexing portion 54 which is formed with, for example, a wave synthesizing portion.

In the multiplexing portion 54, the optical signal SLM obtained from the transmittal signal producing portion 53 and the optical signal SLR obtained from the transmittal signal producing portion 68 are subjected to multiplexing such as wave-synthesizing to produce a multiplex optical signal SLT. The multiplex optical signal SLT is derived from the multiplexing portion 54 to a data transmission line made of optical fiber, so that the serial data DSM and DSR are transmitted through the data transmission line.

In the embodiment shown in FIG. 12, the 8-bit word sequence data DXM(8) obtained from the 8-bit word sequence data producing portion 40 are subjected to the 8B/10B conversion in the 8B/10B converting portion 41 and the 10-bit word sequence data DXM(10) obtained from the 8B/10B converting portion 41 are supplied to the composite data producing portion 42 so as to produce the composite 8-bit word sequence data DZM(8), and the 8-bit word sequence data DXR(8) obtained from the 8-bit word sequence data producing portion 55 are subjected to the 8B/10B conversion in the 8B/10B converting portion 56 and the 10-bit word sequence data DXR(10) obtained from the 8B/10B converting portion 56 are supplied to the composite data producing portion 57 so as to produce the composite 8-bit word sequence data DZR(8). Since the composite 8-bit word sequence data DZM(8) are produced based on the 10-bit word sequence data DXM(10) which are obtained by causing the 8-bit word sequence data DXM(8) to be subjected to the 8B/10B conversion and the composite 8-bit word sequence data DZR(8) are produced based on the 10-bit word sequence data DXR(10) which are obtained by causing the 8-bit word sequence data DXR(8) to be subjected to the 8B/10B conversion as described above, each of the serial data DSM and DSR produced based on the composite 8-bit word sequence data DZM(8) and DZR(8), respectively, are improved in quality of signal and thereby the reliability in transmission thereof is increased.

Figure 15:
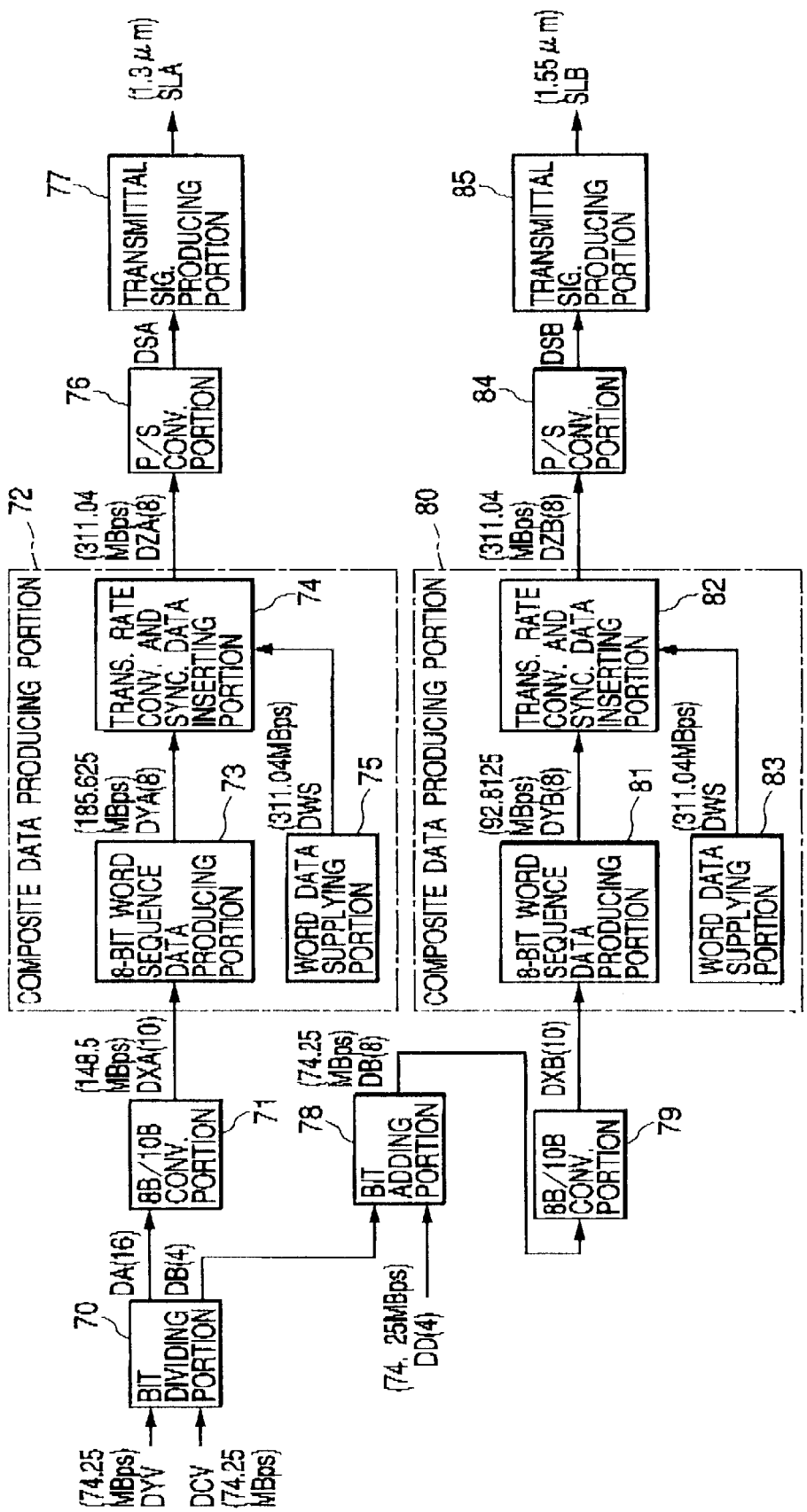
FIG. 15 is a schematic block diagram showing a third embodiment of apparatus for transmitting digital data according to the present invention, in which a third embodiment of method of transmitting digital data according to the present invention is carried out.

FIG. 15 shows a third embodiment of apparatus for transmitting digital data according to the present invention, in which a third embodiment of method of transmitting digital data according to the present invention is carried out.

Referring to FIG. 15, a Y data sequence DYV such as shown in FIG. 3A and a $P_B/P_R$ data sequence DCV such as shown in FIG. 3B which represent respectively the luminance signal information data and the chrominance signal information data constituting a digital video signal, are supplied to a bit dividing portion 70. Each of the Y data sequence DYV and the $P_B/P_R$ data sequence DCV are constituted with 10-bit word sequence data having the word transmission rate of, for example, 74.25 MBps.

In the bit dividing portion 70, each pair of word data of the Y data sequence DYV and word data of the $P_B/P_R$ data sequence DCV corresponding to each other are divided in two bit groups of 16 bits and 4 bits so as to form 16-bit word sequence data DA(16) and 4-bit word sequence data DB(4). Each of the 16-bit word sequence data DA(16) and the 4-bit word sequence data DB(4) have the word transmission rate of 74.25 MBps.

The 16-bit word sequence data DA(16) obtained from the bit dividing portion 70 are supplied to a 8B/10B converting portion 71. In the 8B/10B converting portion 71, the 16-bit word sequence data DA(16) are subjected to 8B/10B conversion by which every 8 bits constituting a half of each word of the 16-bit word sequence data DA(8) are converted into 10 bits to produce 10-bit word sequence data DXA(10) having the word transmission rate of 74.25 MBps×2=148.5 MBps. The 10-bit word sequence data DXA(10) are supplied from the 8B/10B converting portion 71 to a composite data producing portion 72.

In the composite data producing portion 72, the 10-bit word sequence data DXA(10) are supplied to an 8-bit word sequence data producing portion 73. In the 8-bit word sequence data producing portion 73, the 10-bit word sequence data DXA(10) are converted into word sequence data in which each word is composed of 8 bits to produce 8-bit word sequence data DYA(8) having the word transmission rate of 148.5 MBps×10/8=185.625 MBps. The 8-bit word sequence data DYA(8) are supplied from the 8-bit word sequence data producing portion 73 to a transmission rate converting and synchronous data inserting portion 74.

An additional word data group DWS which is constituted with a plurality of 8-bit data words including 8-bit word synchronous data and forwarded from a word data supplying portion 75 is also supplied to the transmission rate converting and synchronous data inserting portion 74. The additional word data group DWS has the word transmission rate of 311.04 MBps.

In the transmission rate converting and synchronous data inserting portion 74, the word transmission rate of the 8-bit word sequence data DYA(8) is converted from 185.625 MBps to 311.04 MBps and then the additional word data group DWS including the 8-bit word synchronous data is inserted into the 8-bit word sequence data DYA(8) at predetermined word intervals to produce composite 8-bit word sequence data DZA(8) having the word transmission rate of 311.04 MBps.

An embodiment of the transmission rate converting and synchronous data inserting portion 74 is substantially the same as the embodiment of the transmission rate converting and synchronous data inserting portion 14 shown in FIG. 6.

An example of the additional word data group DWS supplied from the word data supplying portion 75, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion.

Another example of the additional word data group DWS supplied from the word data supplying portion 75, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

The composite 8-bit word sequence data DZA(8) thus produced in the transmission rate converting and synchronous data inserting portion 74 are derived from the composite data producing portion 72 to a P/S converting portion 76. In the P/S converting portion 76, the composite 8-bit word sequence data DZA(8) is subjected to P/S conversion by which parallel data are converted into serial data to produce serial data DSA based on the composite 8-bit word sequence data DZA(8). The serial data DSA are supplied from the P/S converting portion 76 to a transmittal signal producing portion 77. The transmittal signal producing portion 77 is operative to convert the serial data DSA to a transmittal signal which is, for example, an optical signal SLA having the wavelength of about 1.3 $\mu$m and fit for a data transmission line made of optical fiber. The optical signal SLA is derived from the transmittal signal producing portion 77 to a data transmission line made of optical fiber, so that the serial data DSA are transmitted through the data transmission line.

Further, the 4-bit word sequence data DB(4) obtained from the bit dividing portion 70 are a bit adding portion 78. 4-bit word sequence additional data DD(4) having the word transmission rate of 74.25 MBps are also supplied to the bit adding portion 78. In the bit adding portion 78, the 4-bit word sequence additional data DD(4) are added to the 4-bit word sequence data DB(4) to produce 8-bit word sequence data DB(8) having the word transmission rate of 74.25 MBps. The 8-bit word sequence data DB(8) are supplied from the bit adding portion 78 to a 8B/10B converting portion 79 for converting every 8 bits into 10 bits.

In the 8B/10B converting portion 79, the 8-bit word sequence data DB(8) are subjected to 8B/10B conversion by which every 8 bits constituting each word of the 8-bit word sequence data DB(8) are converted into 10 bits to produce 10-bit word sequence data DXB(10). The 10-bit word sequence data DXB(10) are supplied from the 8B/10B converting portion 79 to a composite data producing portion 80.

In the composite data producing portion 80, the 10-bit word sequence data DXB(10) are supplied to an 8-bit word sequence data producing portion 81. In the 8-bit word sequence data producing portion 81, the 10-bit word sequence data DXB(10) are converted into word sequence data in which each word is composed of 8 bits to produce 8-bit word sequence data DYB(8) having the word transmission rate of, for example, 74.25 MBps×10/8=92.8125 MBps. The 8-bit word sequence data DYB(8) are supplied from the 8-bit word sequence data producing portion 81 to a transmission rate converting and synchronous data inserting portion 82.

An additional word data group DWS which is constituted with a plurality of 8-bit data words including 8-bit word synchronous data and forwarded from a word data supplying portion 83 is also supplied to the transmission rate converting and synchronous data inserting portion 82. The additional word data group DWS has the word transmission rate of 311.04 MBps.

In the transmission rate converting and synchronous data inserting portion 82, the word transmission rate of the 8-bit word sequence data DYB(8) is converted from 92.8125 MBps to 311.04 MBps and then the additional word data group DWS including the 8-bit word synchronous data is inserted into the 8-bit word sequence data DYB(8) at predetermined word intervals to produce composite 8-bit word sequence data DZB(8) having the word transmission rate of 311.04 MBps.

An embodiment of the transmission rate converting and synchronous data inserting portion 82 is substantially the same as the embodiment of the transmission rate converting and synchronous data inserting portion 29 shown in FIG. 9.

An example of the additional word data group DWS supplied from the word data supplying portion 83, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion.

Another example of the additional word data group DWS supplied from the word data supplying portion 83, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

The composite 8-bit word sequence data DZB(8) thus produced in the transmission rate converting and synchronous data inserting portion 82 are derived from the composite data producing portion 80 to a P/S converting portion 84. In the P/S converting portion 84, the composite 8-bit word sequence data DZB(8) is subjected to P/S conversion by which parallel data are converted into serial data to produce serial data DSB based on the composite 8-bit word sequence data DZB(8). The serial data DSB are supplied from the P/S converting portion 84 to a transmittal signal producing portion 85. The transmittal signal producing portion 85 is operative to convert the serial data DSB to a transmittal signal which is, for example, an optical signal SLB having the wavelength of about 1.55 μm and fit for a data transmission line made of optical fiber. The optical signal SLB is derived from the transmittal signal producing portion 85 to a data transmission line made of optical fiber, so that the serial data DSB are transmitted through the data transmission line.

In the embodiment shown in FIG. 15, the 16-bit word sequence data DA(16) obtained from the bit dividing portion 70 are subjected to the 8B/10B conversion in the 8B/10B converting portion 71 and the 10-bit word sequence data DXA(10) obtained from the 8B/10B converting portion 71 are supplied to the composite data producing portion 72 so as to produce the composite 8-bit word sequence data DZA(8), and the 8-bit word sequence data DB(8) obtained from the bit adding portion 78 are subjected to the 8B/10B conversion in the 8B/10B converting portion 79 and the 10-bit word sequence data DXB(10) obtained from the 8B/10B converting portion 79 are supplied to the composite data producing portion 80 so as to produce the composite 8-bit word sequence data DZB(8). Since the composite 8-bit word sequence data DZA(8) are produced based on the 10-bit word sequence data DXA(10) which are obtained by causing the 16-bit word sequence data DA(16) to be subjected to the 8B/10B conversion and the composite 8-bit word sequence data DZB(8) are produced based on the 10-bit word sequence data DXB(10) which are obtained by causing the 8-bit word sequence data DB(8) to be subjected to the 8B/10B conversion as described above, each of the serial data DSA and DSB produced based on the composite 8-bit word sequence data DZA(8) and DZB(8), respectively, are improved in quality of signal and thereby the reliability in transmission thereof is increased.

Figure 16:
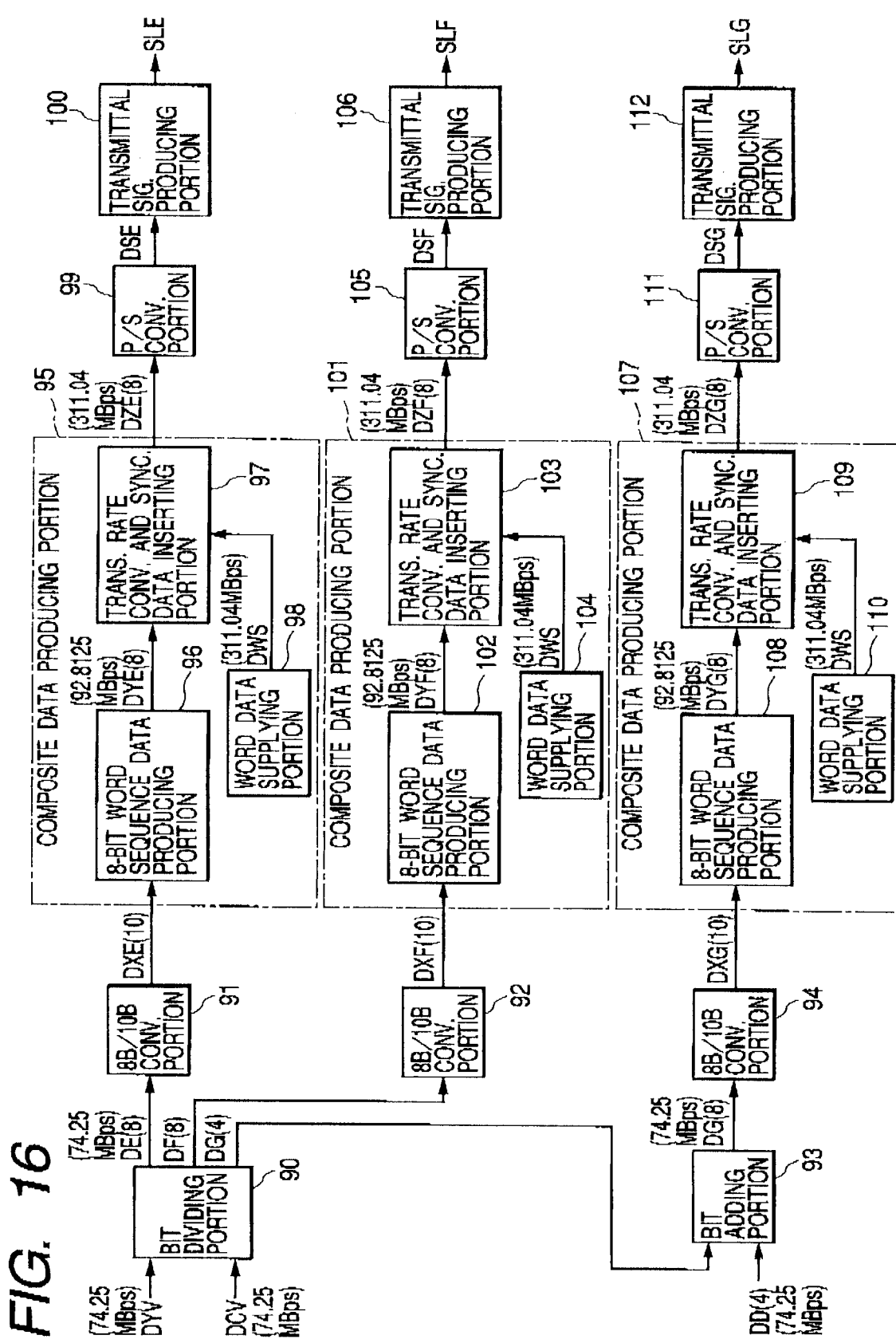
FIG. 16 is a schematic block diagram showing a fourth embodiment of apparatus for transmitting digital data according to the present invention, in which a fourth embodiment of method of transmitting digital data according to the present invention is carried out.

FIG. 16 shows a fourth embodiment of apparatus for transmitting digital data according to the present invention, in which a fourth embodiment of method of transmitting digital data according to the present invention is carried out.

Referring to FIG. 16, a Y data sequence DYV such as shown in FIG. 3A and a $P_B/P_R$ data sequence DCV such as shown in FIG. 3B, which represent respectively the luminance signal information data and the chrominance signal information data constituting a digital video signal, are supplied to a bit dividing portion 90. Each of the Y data sequence DYV and the $P_B/P_R$ data sequence DCV are constituted with 10-bit word sequence data having the word transmission rate of, for example, 74.25 MBps.

In the bit dividing portion 90, each pair of word data of the Y data sequence DYV and word data of the $P_B/P_R$ data sequence DCV corresponding to each other are divided in three bit groups of 8 bits, 8 bits and 4 bits so as to form 8-bit word sequence data DE(8), 8-bit word sequence data DF(8) and 4-bit word sequence data DG(4). Each of the 8-bit word sequence data DE(8), the 8-bit word sequence data DF(8) and the 4-bit word sequence data DG(4) have the word transmission rate of 74.25 MBps.

The 8-bit word sequence data DE(8) obtained from the bit dividing portion 90 are supplied to a 8B/10B converting portion 91. In the 8B/10B converting portion 91, the 8-bit word sequence data DE(8) are subjected to 8B/10B conversion by which every 8 bits constituting each word of the 8-bit word sequence data DE(8) are converted into 10 bits to produce 10-bit word sequence data DXE(10).

The 8-bit word sequence data DF(8) obtained from the bit dividing portion 90 are supplied to a 8B/10B converting portion 92. In the 8B/10B converting portion 92, the 8-bit word sequence data DF(8) are subjected to 8B/10B conversion by which every 8 bits constituting each word of the 8-bit word sequence data DF(8) are converted into 10 bits to produce 10-bit word sequence data DXF(10).

Further, the 4-bit word sequence data DG(4) obtained from the bit dividing portion 90 are supplied to a bit adding portion 93. 4-bit word sequence additional data DD(4) have the word transmission rate of 74.25 MBps are also supplied to the bit adding portion 93. In the bit adding portion 93, the 4-bit word sequence additional data DD(4) are added to the 4-bit word sequence data DG(4) to produce 8-bit word sequence data DG(8) having the word transmission rate of 74.25 MBps.

The 8-bit word sequence data DG(8) are supplied from the bit adding portion 93 to a 8B/10B converting portion 94 for converting every 8 bits into 10 bits. In the 8B/10B converting portion 94, the 8-bit word sequence data DG(8) are subjected to 8B/10B conversion by which every 8 bits constituting each word of the 8-bit word sequence data DG(8) are converted into 10 bits to produce 10-bit word sequence data DXG(10).

The 10-bit word sequence data DXE(10) are supplied from the 8B/10B converting portion 91 to a composite data producing portion 95. In the composite data producing portion 95, the 10-bit word sequence data DXE(10) are supplied to an 8-bit word sequence data producing portion 96. In the 8-bit word sequence data producing portion 96, the 10-bit word sequence data DXE(10) are converted into word sequence data in which each word is composed of 8 bits to produce 8-bit word sequence data DYE(8) having the word transmission rate of, for example, 74.25 MBps×10/8= 92.8125 MBps. The 8-bit word sequence data DYE(8) are supplied from the 8-bit word sequence data producing portion 96 to a transmission rate converting and synchronous data inserting portion 97.

An additional word data group DWS which is constituted with a plurality of 8-bit data words including 8-bit word synchronous data and forwarded from a word data supplying portion 98 is also supplied to the transmission rate converting and synchronous data inserting portion 97. The additional word data group DWS has the word transmission rate of 311.04 MBps.

In the transmission rate converting and synchronous data inserting portion 97, the word transmission rate of the 8-bit word sequence data DYE(8) is converted from 92.8125 MBps to 311.04 MBps and then the additional word data group DWS including the 8-bit word synchronous data is inserted into the 8-bit word sequence data DYE(8) at predetermined word intervals to produce composite 8-bit word sequence data DZE(8) having the word transmission rate of 311.04 MBps.

An embodiment of the transmission rate converting and synchronous data inserting portion 97 is substantially the same as the embodiment of the transmission rate converting and synchronous data inserting portion 14 shown in FIG. 6.

An example of the additional word data group DWS supplied from the word data supplying portion 98, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion.

Another example of the additional word data group DWS supplied from the word data supplying portion 98, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

The composite 8-bit word sequence data DZE(8) thus produced in the transmission rate converting and synchronous data inserting portion 97 are derived from the composite data producing portion 95 to a P/S converting portion 99. In the P/S converting portion 99, the composite 8-bit word sequence data DZE(8) is subjected to P/S conversion by which parallel data are converted into serial data to produce serial data DSE based on the composite 8-bit word sequence data DZE(8). The serial data DSE are supplied from the P/S converting portion 99 to a transmittal signal producing portion 100. The transmittal signal producing portion 100 is operative to convert the serial data DSE to a transmittal signal which is, for example, an optical signal SLE having the wavelength of about 1.55 μm and fit for a data transmission line made of optical fiber. The optical signal SLE is derived from the transmittal signal producing portion 100 to a data transmission line made of optical fiber, so that the serial data DSE are transmitted through the data transmission line.

The 10-bit word sequence data DXF(10) are supplied from the 8B/10B converting portion 92 to a composite data producing portion 101. In the composite data producing portion 101, the 10-bit word sequence data DXF(10) are supplied to an 8-bit word sequence data producing portion 102. In the 8-bit word sequence data producing portion 102, the 10-bit word sequence data DXF(10) are converted into word sequence data in which each word is composed of 8 bits to produce 8-bit word sequence data DYF(8) having the word transmission rate of, for example, 74.25 MBps×10/8= 92.8125 MBps. The 8-bit word sequence data DYE(8) are supplied from the 8-bit word sequence data producing portion 102 to a transmission rate converting and synchronous data inserting portion 103.

An additional word data group DWS which is constituted with a plurality of 8-bit data words including 8-bit word synchronous data and forwarded from a word data supplying portion 104 is also supplied to the transmission rate converting and synchronous data inserting portion 103. The additional word data group DWS has the word transmission rate of 311.04 MBps.

In the transmission rate converting and synchronous data inserting portion 103, the word transmission rate of the 8-bit word sequence data DYF(8) is converted from 92.8125 MBps to 311.04 MBps and then the additional word data group DWS including the 8-bit word synchronous data is inserted into the 8-bit word sequence data DYF(8) at predetermined word intervals to produce composite 8-bit word sequence data DZF(8) having the word transmission rate of 311.04 MBps.

An embodiment of the transmission rate converting and synchronous data inserting portion 103 is substantially the same as the embodiment of the transmission rate converting and synchronous data inserting portion 14 shown in FIG. 6.

An example of the additional word data group DWS supplied from the word data supplying portion 104, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion.

Another example of the additional word data group DWS supplied from the word data supplying portion 104, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

The composite 8-bit word sequence data DZF(8) thus produced in the transmission rate converting and synchronous data inserting portion 103 are derived from the composite data producing portion 101 to a P/S converting portion 105. In the P/S converting portion 105, the composite 8-bit word sequence data DZF(8) is subjected to P/S conversion by which parallel data are converted into serial data to produce serial data DSF based on the composite 8-bit word sequence data DZF(8). The serial data DSF are supplied from the P/S converting portion 105 to a transmittal signal producing portion 106. The transmittal signal producing portion 106 is operative to convert the serial data DSF to a transmittal signal which is, for example, an optical signal SLF fit for a data transmission line made of optical fiber. The optical signal SLF is derived from the transmittal signal producing portion 106 to a data transmission line made of optical fiber, so that the serial data DSE are transmitted through the data transmission line.

The 10-bit word sequence data DXG(10) are supplied from the 8B/10B converting portion 94 to a composite data producing portion 107. In the composite data producing portion 107, the 10-bit word sequence data DXG(10) are supplied to an 8-bit word sequence data producing portion 108. In the 8-bit word sequence data producing portion 108, the 10-bit word sequence data DXG(10) are converted into word sequence data in which each word is composed of 8 bits to produce 8-bit word sequence data DYG(8) having the word transmission rate of, for example, 74.25 MBps×10/8= 92.8125 MBps. The 8-bit word sequence data DYG(8) are supplied from the 8-bit word sequence data producing portion 108 to a transmission rate converting and synchronous data inserting portion 109.

An additional word data group DWS which is constituted with a plurality of 8-bit data words including 8-bit word synchronous data and forwarded from a word data supplying portion 110 is also supplied to the transmission rate converting and synchronous data inserting portion 109. The additional word data group DWS has the word transmission rate of 311.04 MBps.

In the transmission rate converting and synchronous data inserting portion 109, the word transmission rate of the 8-bit word sequence data DYG(8) is converted from 92.8125 MBps to 311.04 MBps and then the additional word data group DWS including the 8-bit word synchronous data is inserted into the 8-bit word sequence data DYG(8) at predetermined word intervals to produce composite 8-bit word sequence data DZG(8) having the word transmission rate of 311.04 MBps.

An embodiment of the transmission rate converting and synchronous data inserting portion 109 is substantially the same as the embodiment of the transmission rate converting and synchronous data inserting portion 14 shown in FIG. 6.

An example of the additional word data group DWS supplied from the word data supplying portion 110, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion.

Another example of the additional word data group DWS supplied from the word data supplying portion 110, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

The composite 8-bit word sequence data DZG(8) thus produced in the transmission rate converting and synchronous data inserting portion 109 are derived from the composite data producing portion 107 to a P/S converting portion 111. In the P/S converting portion 111, the composite 8-bit word sequence data DZG(8) is subjected to P/S conversion by which parallel data are converted into serial data to produce serial data DSG based on the composite 8-bit word sequence data DZG(8). The serial data DSG are supplied from the P/S converting portion 111 to a transmittal signal producing portion 112. The transmittal signal producing portion 112 is operative to convert the serial data DSG to a transmittal signal which is, for example, an optical signal SLG fit for a data transmission line made of optical fiber. The optical signal SLG is derived from the transmittal signal producing portion 112 to a data transmission line made of optical fiber, so that the serial data DSG are transmitted through the data transmission line.

In the embodiment shown in FIG. 16, the 8-bit word sequence data DE(8) obtained from the bit dividing portion 90 are subjected to the 8B/10B conversion in the 8B/10B converting portion 91 and the 10-bit word sequence data DXE(10) obtained from the 8B/10B converting portion 91 are supplied to the composite data producing portion 95 so as to produce the composite 8-bit word sequence data DZE(8), the 8-bit word sequence data DF(8) obtained from the bit dividing portion 90 are subjected to the 8B/10B conversion in the 8B/10B converting portion 92 and the 10-bit word sequence data DXF(10) obtained from the 8B/10B converting portion 92 are supplied to the composite data producing portion 101 so as to produce the composite 8-bit word sequence data DZF(8), and the 8-bit word sequence data DG(8) obtained from the bit adding portion 93 are subjected to the 8B/10B conversion in the 8B/10B converting portion 94 and the 10-bit word sequence data DXG(10) obtained from the 8B/10B converting portion 94 are supplied to the composite data producing portion 107 so as to produce the composite 8-bit word sequence data DZG(8).

Since the composite 8-bit word sequence data DZE(8) are produced based on the 10-bit word sequence data DXE(10) which are obtained by causing the 8-bit word sequence data DE(8) to be subjected to the 8B/10B conversion, the composite 8-bit word sequence data DZF(8) are produced based on the 10-bit word sequence data DXF(10) which are obtained by causing the 8-bit word sequence data DF(8) to be subjected to the 8B/10B conversion, and the composite 8-bit word sequence data DZG(8) are produced based on the 10-bit word sequence data DXG(10) which are obtained by causing the 8-bit word sequence data DG(8) to be subjected to the 8B/10B conversion as described above, each of the serial data DSE, DSF and DSG produced based on the composite 8-bit word sequence data DZE(8), DZF(8) and DZG(8), respectively, are improved in quality of signal and thereby the reliability in transmission thereof is increased.

Figure 17:
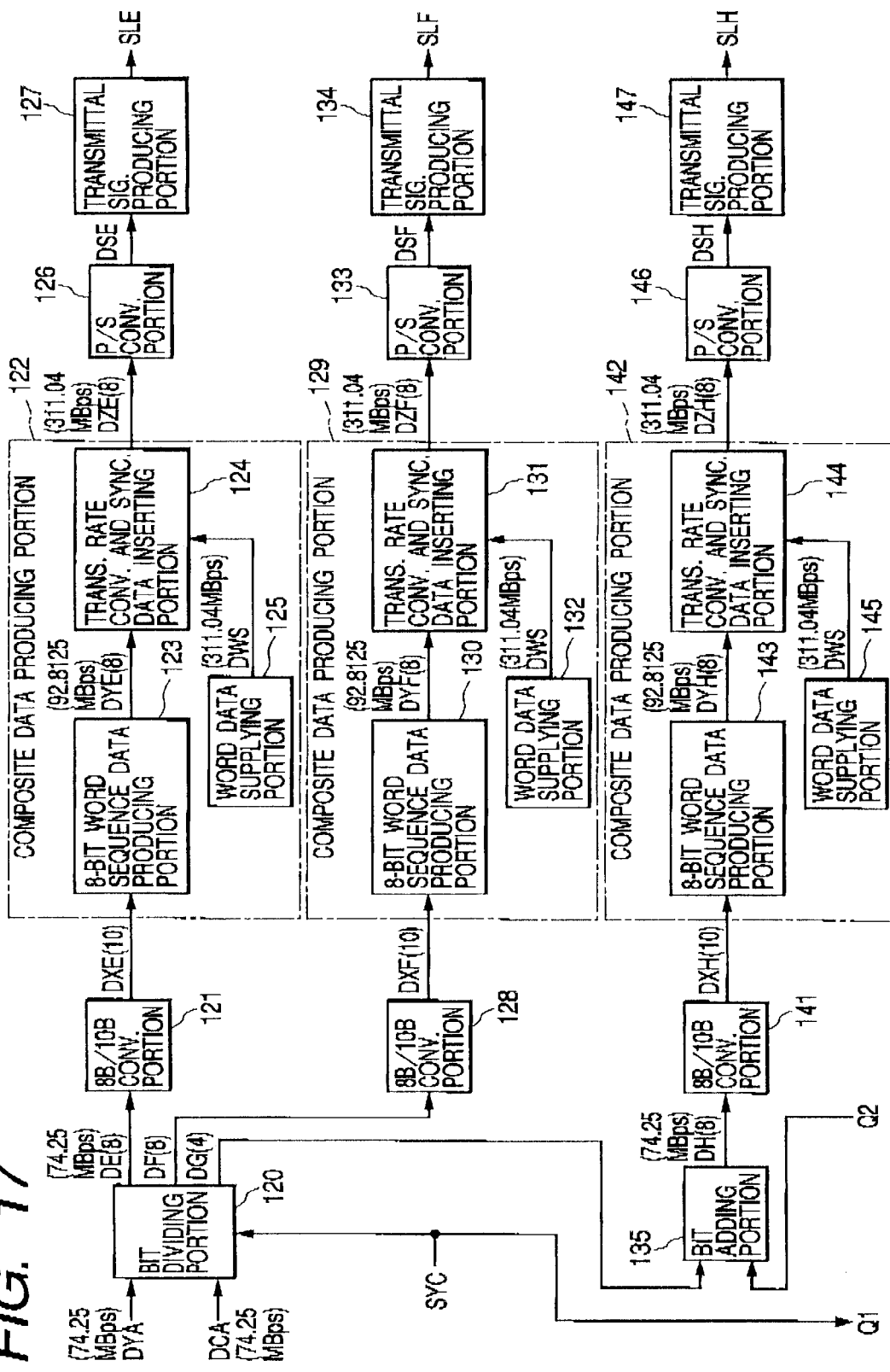
FIG. 17 is a schematic block diagram showing a part of a fifth embodiment of apparatus for transmitting digital data according to the present invention, in which a fifth embodiment of method of transmitting digital data according to the present invention is carried out.
Figure 18:
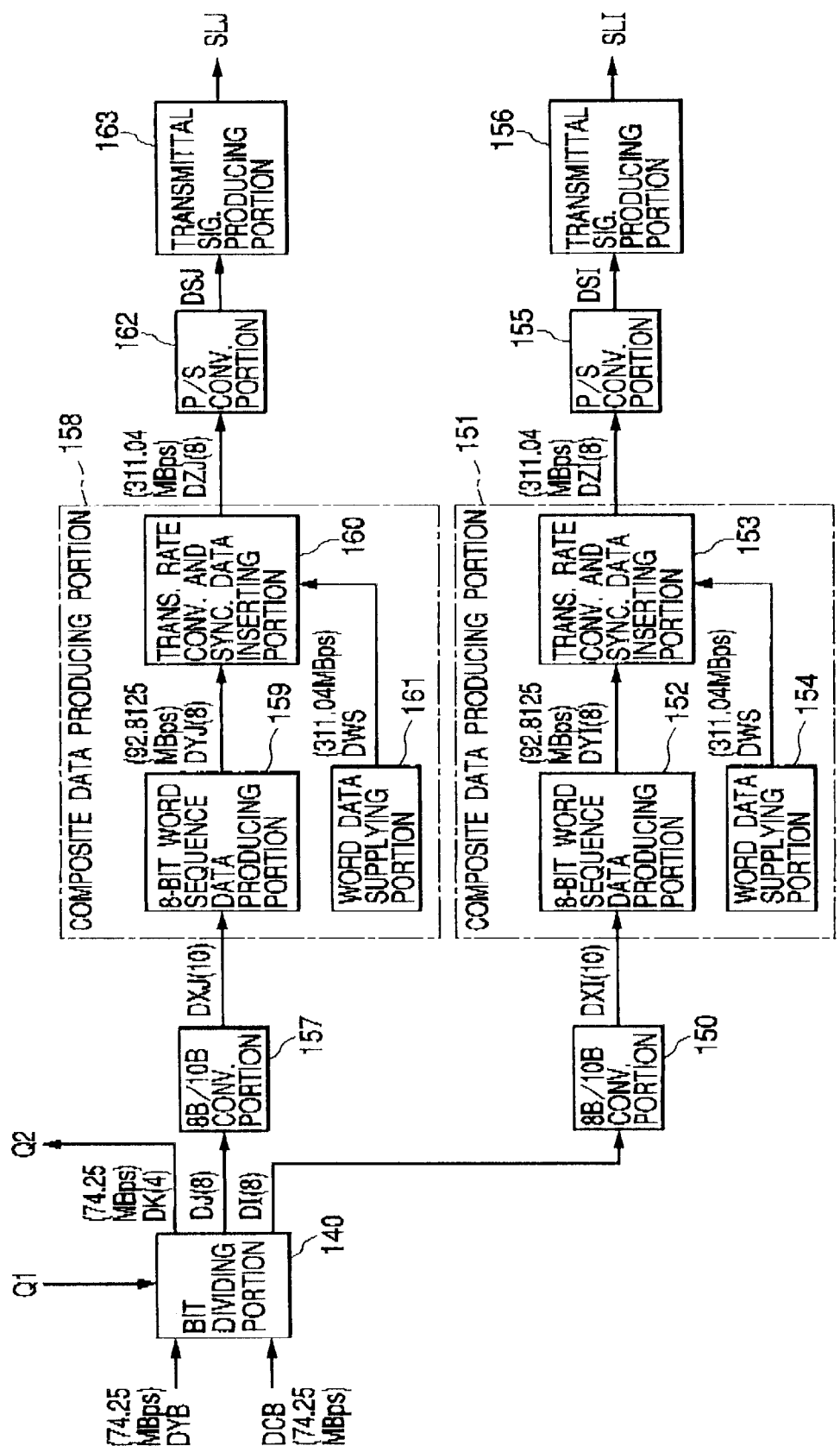
FIG. 18 is a schematic block diagram showing another part of the apparatus shown in FIG. 17.

FIGS. 17 and 18 show a fifth embodiment of apparatus for transmitting digital data according to the present invention, in which a fifth embodiment of method of transmitting digital data according to the present invention is carried out.

Referring to FIGS. 17 and 18, a Y data sequence DYA such as shown in FIG. 3A and a $P_B/P_R$ data sequence DCA such as shown in FIG. 3B, which represent respectively the luminance signal information data and the chrominance signal information data constituting a first digital video signal, are supplied to a bit dividing portion 120. Each of the Y data sequence DYA and the $P_B/P_R$ data sequence DCA are constituted with 10-bit word sequence data having the word transmission rate of, for example, 74.25 MBps.

In the bit dividing portion 120, each pair of word data of the Y data sequence DYA and word data of the $P_B/P_R$ data sequence DCA corresponding to each other are divided in three bit groups of 8 bits, 8 bits and 4 bits so as to form 8-bit word sequence data DE(8), 8-bit word sequence data DF(8) and 4-bit word sequence data DG(4). Each of the 8-bit word sequence data DE(8), the 8-bit word sequence data DF(8) and the 4-bit word sequence data DG(4) have the word transmission rate of 74.25 MBps.

The 8-bit word sequence data DE(8) obtained from the bit dividing portion 120 are supplied to a 8B/10B converting portion 121. In the 8B/10B converting portion 121, the 8-bit word sequence data DE(8) are subjected to 8B/10B conversion by which every 8 bits constituting each word of the 8-bit word sequence data DE(8) are converted into 10 bits to produce 10-bit word sequence data DXE(10).

The 10-bit word sequence data DXE(10) are supplied from the 8B/10B converting portion 121 to a composite data producing portion 122.

In the composite data producing portion 122, the 10-bit word sequence data DXE(10) are supplied to an 8-bit word sequence data producing portion 123. In the 8-bit word sequence data producing portion 123, the 10-bit word sequence data DXE(10) are converted into word sequence data in which each word is composed of 8 bits to produce 8-bit word sequence data DYE(8) having the word transmission rate of, for example, 74.25 MBps×10/8=92.8125 MBps. The 8-bit word sequence data DYE(8) are supplied from the 8-bit word sequence data producing portion 123 to a transmission rate converting and synchronous data inserting portion 124.

An additional word data group DWS which is constituted with a plurality of 8-bit data words including 8-bit word synchronous data and forwarded from a word data supplying portion 125 is also supplied to the transmission rate converting and synchronous data inserting portion 124. The additional word data group DWS has the word transmission rate of 311.04 MBps.

In the transmission rate converting and synchronous data inserting portion 124, the word transmission rate of the 8-bit word sequence data DYE(8) is converted from 92.8125 MBps to 311.04 MBps and then the additional word data group DWS including the 8-bit word synchronous data is inserted into the 8-bit word sequence data DYE(8) at predetermined word intervals to produce composite 8-bit word sequence data DZE(8) having the word transmission rate of 311.04 MBps.

An embodiment of the transmission rate converting and synchronous data inserting portion 124 is substantially the same as the embodiment of the transmission rate converting and synchronous data inserting portion 14 shown in FIG. 6.

An example of the additional word data group DWS supplied from the word data supplying portion 125, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion.

Another example of the additional word data group DWS supplied from the word data supplying portion 125, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

The composite 8-bit word sequence data DZE(8) thus produced in the transmission rate converting and synchronous data inserting portion 124 are derived from the composite data producing portion 122 to a P/S converting portion 126. In the P/S converting portion 126, the composite 8-bit word sequence data DZE(8) is subjected to P/S conversion by which parallel data are converted into serial data to produce serial data DSE based on the composite 8-bit word sequence data DZE(8). The serial data DSE are supplied from the P/S converting portion 126 to a transmittal signal producing portion 127. The transmittal signal producing portion 127 is operative to convert the serial data DSE to a transmittal signal which is, for example, an optical signal SLE fit for a data transmission line made of optical fiber. The optical signal SLE is derived from the transmittal signal producing portion 127 to a data transmission line made of optical fiber, so that the serial data DSE are transmitted through the data transmission line.

The 8-bit word sequence data DF(8) obtained from the bit dividing portion 120 are supplied to a 8B/10B converting portion 128. In the 8B/10B converting portion 128, the 8-bit word sequence data DF(8) are subjected to 8B/10B conversion by which every 8 bits constituting each word of the 8-bit word sequence data DF(8) are converted into 10 bits to produce 10-bit word sequence data DXF(10).

The 10-bit word sequence data DXF(10) are supplied from the 8B/10B converting portion 128 to a composite data producing portion 129.

In the composite data producing portion 129, the 10-bit word sequence data DXF(10) are supplied to an 8-bit word sequence data producing portion 130. In the 8-bit word sequence data producing portion 130, the 10-bit word sequence data DXF(10) are converted into word sequence data in which each word is composed of 8 bits to produce 8-bit word sequence data DYF(8) having the word transmission rate of, for example, 74.25 MBps×10/8=92.8125 MBps. The 8-bit word sequence data DYF(8) are supplied from the 8-bit word sequence data producing portion 130 to a transmission rate converting and synchronous data inserting portion 131.

An additional word data group DWS which is constituted with a plurality of 8-bit data words including 8-bit word synchronous data and forwarded from a word data supplying portion 132 is also supplied to the transmission rate converting and synchronous data inserting portion 131. The additional word data group DWS has the word transmission rate of 311.04 MBps.

In the transmission rate converting and synchronous data inserting portion 131, the word transmission rate of the 8-bit word sequence data DYF(8) is converted from 92.8125 MBps to 311.04 MBps and then the additional word data group DWS including the 8-bit word synchronous data is inserted into the 8-bit word sequence data DYF(8) at predetermined word intervals to produce composite 8-bit word sequence data DZF(8) having the word transmission rate of 311.04 MBps.

An embodiment of the transmission rate converting and synchronous data inserting portion 131 is also substantially the same as the embodiment of the transmission rate converting and synchronous data inserting portion 14 shown in FIG. 6.

An example of the additional word data group DWS supplied from the word data supplying portion 132, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion.

Another example of the additional word data group DWS supplied from the word data supplying portion 132, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

The composite 8-bit word sequence data DZF(8) thus produced in the transmission rate converting and synchronous data inserting portion 131 are derived from the composite data producing portion 129 to a P/S converting portion 133. In the P/S converting portion 133, the composite 8-bit word sequence data DZF(8) is subjected to P/S conversion by which parallel data are converted into serial data to produce serial data DSF based on the composite 8-bit word sequence data DZF(8). The serial data DSF are supplied from the P/S converting portion 133 to a transmittal signal producing portion 134. The transmittal signal producing portion 134 is operative to convert the serial data DSF to a transmittal signal which is, for example, an optical signal SLF fit for a data transmission line made of optical fiber. The optical signal SLF is derived from the transmittal signal producing portion 134 to a data transmission line made of optical fiber, so that the serial data DSF are transmitted through the data transmission line.

Further, the 4-bit word sequence data DG(4) obtained from the bit dividing portion 120 are supplied to a bit adding portion 135.

A Y data sequence DYB such as shown in FIG. 3A and a $P_B/P_R$ data sequence DCB such as shown in FIG. 3B, which represent respectively the luminance signal information data and the chrominance signal information data constituting a second digital video signal, are supplied to a bit dividing portion 140. Each of the Y data sequence DYB and the $P_B/P_R$ data sequence DCB are constituted with 10-bit word sequence data having the word transmission rate of, for example, 74.25 MBps.

A common synchronous signal SYC is supplied to both of the bit dividing portion 120 and the bit dividing portion 140. The bit dividing portion 120 and the bit dividing portion 140 are so controlled by the synchronous signal SYC as to be synchronized in operation with each other.

In the bit dividing portion 140, each pair of word data of the Y data sequence DYB and word data of the $P_B/P_R$ data sequence DCB corresponding to each other are divided in three bit groups of 8 bits, 8 bits and 4 bits so as to form 8-bit word sequence data DI(8), 8-bit word sequence data DJ(8) and 4-bit word sequence data DK(4). Each of the 8-bit word sequence data DI(8), the 8-bit word sequence data DJ(8) and the 4-bit word sequence data DK(4) have the word transmission rate of 74.25 MBps.

The 8-bit word sequence data DI(8) obtained from the bit dividing portion 140 are supplied to a 8B/10B converting portion 150. In the 8B/10B converting portion 150, the 8-bit word sequence data DI(8) are subjected to 8B/10B conversion by which every 8 bits constituting each word of the 8-bit word sequence data DI(8) are converted into 10 bits to produce 10-bit word sequence data DXI(10).

The 10-bit word sequence data DXI(10) are supplied from the 8B/10B converting portion 150 to a composite data producing portion 151. In the composite data producing portion 151, the 10-bit word sequence data DXI(10) are supplied to an 8-bit word sequence data producing portion 152. In the 8-bit word sequence data producing portion 152, the 10-bit word sequence data DXI(10) are converted into word sequence data in which each word is composed of 8 bits to produce 8-bit word sequence data DYI(8) having the word transmission rate of, for example, 74.25 MBps×10/8= 92.8125 MBps. The 8-bit word sequence data DYI(8) are supplied from the 8-bit word sequence data producing portion 152 to a transmission rate converting and synchronous data inserting portion 153.

An additional word data group DWS which is constituted with a plurality of 8-bit data words including 8-bit word synchronous data and forwarded from a word data supplying portion 154 is also supplied to the transmission rate converting and synchronous data inserting portion 153. The additional word data group DWS has the word transmission rate of 311.04 MBps.

In the transmission rate converting and synchronous data inserting portion 153, the word transmission rate of the 8-bit word sequence data DYI(8) is converted from 92.8125 MBps to 311.04 MBps and then the additional word data group DWS including the 8-bit word synchronous data is inserted into the 8-bit word sequence data DYI(8) at predetermined word intervals to produce composite 8-bit word sequence data DZI(8) having the word transmission rate of 311.04 MBps.

An embodiment of the transmission rate converting and synchronous data inserting portion 153 is substantially the same as the embodiment of the transmission rate converting and synchronous data inserting portion 14 shown in FIG. 6.

An example of the additional word data group DWS supplied from the word data supplying portion 154, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion.

Another example of the additional word data group DWS supplied from the word data supplying portion 154, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

The composite 8-bit word sequence data DZI(8) thus produced in the transmission rate converting and synchronous data inserting portion 153 are derived from the composite data producing portion 151 to a P/S converting portion 155. In the P/S converting portion 155, the composite 8-bit word sequence data DZI(8) is subjected to P/S conversion by which parallel data are converted into serial data to produce serial data DSI based on the composite 8-bit word sequence data DZI(8). The serial data DSI are supplied from the P/S converting portion 155 to a transmittal signal producing portion 156. The transmittal signal producing portion 156 is operative to convert the serial data DSI to a transmittal signal which is, for example, an optical signal SLI fit for a data transmission line made of optical fiber. The optical signal SLI is derived from the transmittal signal producing portion 156 to a data transmission line made of optical fiber, so that the serial data DSI are transmitted through the data transmission line.

The 8-bit word sequence data DJ(8) obtained from the bit dividing portion 140 are supplied to a 8B/10B converting portion 157. In the 8B/10B converting portion 157, the 8-bit word sequence data DJ(8) are subjected to 8B/10B conversion by which every 8 bits constituting each word of the 8-bit word sequence data DJ(8) are converted into 10 bits to produce 10-bit word sequence data DXJ(10).

The 10-bit word sequence data DXJ(10) are supplied from the 8B/10B converting portion 157 to a composite data producing portion 158.

In the composite data producing portion 158, the 10-bit word sequence data DXJ(10) are supplied to an 8-bit word sequence data producing portion 159. In the 8-bit word sequence data producing portion 159, the 10-bit word sequence data DXJ(10) are converted into word sequence data in which each word is composed of 8 bits to produce 8-bit word sequence data DYJ(8) having the word transmission rate of, for example, 74.25 MBps×10/8=92.8125 MBps. The 8-bit word sequence data DYJ(8) are supplied from the 8-bit word sequence data producing portion 159 to a transmission rate converting and synchronous data inserting portion 160.

An additional word data group DWS which is constituted with a plurality of 8-bit data words including 8-bit word synchronous data and forwarded from a word data supplying portion 161 is also supplied to the transmission rate converting and synchronous data inserting portion 160. The additional word data group DWS has the word transmission rate of 311.04 MBps.

In the transmission rate converting and synchronous data inserting portion 160, the word transmission rate of the 8-bit word sequence data DYJ(8) is converted from 92.8125 MBps to 311.04 MBps and then the additional word data group DWS including the 8-bit word synchronous data is inserted into the 8-bit word sequence data DYJ(8) at predetermined word intervals to produce composite 8-bit word sequence data DZJ(8) having the word transmission rate of 311.04 MBps.

An embodiment of the transmission rate converting and synchronous data inserting portion 160 is also substantially the same as the embodiment of the transmission rate converting and synchronous data inserting portion 14 shown in FIG. 6.

An example of the additional word data group DWS supplied from the word data supplying portion 161, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion.

Another example of the additional word data group DWS supplied from the word data supplying portion 161, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

The composite 8-bit word sequence data DZJ(8) thus produced in the transmission rate converting and synchronous data inserting portion 160 are derived from the composite data producing portion 158 to a P/S converting portion 162. In the P/S converting portion 162, the composite 8-bit word sequence data DZJ(8) is subjected to P/S conversion by which parallel data are converted into serial data to produce serial data DSJ based on the composite 8-bit word sequence data DZJ(8). The serial data DSJ are supplied from the P/S converting portion 162 to a transmittal signal producing portion 163. The transmittal signal producing portion 163 is operative to convert the serial data DSJ to a transmittal signal which is, for example, an optical signal SLJ fit for a data transmission line made of optical fiber. The optical signal SLJ is derived from the transmittal signal producing portion 163 to a data transmission line made of optical fiber, so that the serial data DSJ are transmitted through the data transmission line.

Further, the 4-bit word sequence data DK(4) obtained from the bit dividing portion 140 are supplied to the bit adding portion 135.

In the bit adding portion 135, the 4-bit word sequence data DK(4) from the bit dividing portion 140 are added to the 4-bit word sequence data DG(4) from the bit dividing portion 120 to produce 8-bit word sequence data DH(8) having the word transmission rate of 74.25 MBps.

The 8-bit word sequence data DH(8) are supplied from the bit adding portion 135 to a 8B/10B converting portion 141 for converting every 8 bits into 10 bits. In the 8B/10B converting portion 141, the 8-bit word sequence data DH(8) are subjected to 8B/10B conversion by which every 8 bits constituting each word of the 8-bit word sequence data DH(8) are converted into 10 bits to produce 10-bit word sequence data DXH(10).

The 10-bit word sequence data DXH(10) are supplied from the 8B/10B converting portion 141 to a composite data producing portion 142.

In the composite data producing portion 142, the 10-bit word sequence data DXH(10) are supplied to an 8-bit word sequence data producing portion 143. In the 8-bit word sequence data producing portion 143, the 10-bit word sequence data DXH(10) are converted into word sequence data in which each word is composed of 8 bits to produce 8-bit word sequence data DYH(8) having the word transmission rate of, for example, 74.25 MBps×10/8=92.8125 MBps. The 8-bit word sequence data DYH(8) are supplied from the 8-bit word sequence data producing portion 143 to a transmission rate converting and synchronous data inserting portion 144.

An additional word data group DWS which is constituted with a plurality of 8-bit data words including 8-bit word synchronous data and forwarded from a word data supplying portion 145 is also supplied to the transmission rate converting and synchronous data inserting portion 144. The additional word data group DWS has the word transmission rate of 311.04 MBps.

In the transmission rate converting and synchronous data inserting portion 144, the word transmission rate of the 8-bit word sequence data DYH(8) is converted from 92.8125 MBps to 311.04 MBps and then the additional word data group DWS including the 8-bit word synchronous data is inserted into the 8-bit word sequence data DYH(8) at predetermined word intervals to produce composite 8-bit word sequence data DZH(8) having the word transmission rate of 311.04 MBps.

An embodiment of the transmission rate converting and synchronous data inserting portion 144 is also substantially the same as the embodiment of the transmission rate converting and synchronous data inserting portion 14 shown in FIG. 6.

An example of the additional word data group DWS supplied from the word data supplying portion 145, which is constituted with a plurality of 8-bit data words including 8-bit word synchronous data allotted the predetermined code and has the word transmission rate of 311.04 MBps, is formed to have at least one optional 8-bit word data provided at the beginning portion, three 8-bit word synchronous data A1s following the optional 8-bit word data, and three 8-bit word synchronous data A2s following the 8-bit word synchronous data A1 to be provided at the end portion.

Another example of the additional word data group DWS supplied from the word data supplying portion 145, which has the word transmission rate of 311.04 MBps, is formed to have at least one optional 8-bit word data provided at the beginning portion, three 8-bit word synchronous data A1s following the optional 8-bit word data, three 8-bit word synchronous data A2s following the 8-bit word synchronous data A1, and at least one optional 8-bit word data provided at the end portion.

The composite 8-bit word sequence data DZH(8) thus produced in the transmission rate converting and synchronous data inserting portion 144 are derived from the composite data producing portion 142 to a P/S converting portion 146. In the P/S converting portion 146, the composite 8-bit word sequence data DZH(8) is subjected to P/S conversion by which parallel data are converted into serial data to produce serial data DSH based on the composite 8-bit word sequence data DZH(8). The serial data DSH are supplied from the P/S converting portion 146 to a transmittal signal producing portion 147. The transmittal signal producing portion 147 is operative to convert the serial data DSH to a transmittal signal which is, for example, an optical signal SLH fit for a data transmission line made of optical fiber. The optical signal SLH is derived from the transmittal signal producing portion 147 to a data transmission line made of optical fiber, so that the serial data DSH are transmitted through the data transmission line.

In the embodiment shown in FIGS. 17 and 18, the 8-bit word sequence data DE(8) obtained from the bit dividing portion 120 are subjected to the 8B/10B conversion in the 8B/10B converting portion 121 and the 10-bit word sequence data DXE(10) obtained from the 8B/10B converting portion 121 are supplied to the composite data producing portion 122 so as to produce the composite 8-bit word sequence data DZE(8), the 8-bit word sequence data DF(8) obtained from the bit dividing portion 120 are subjected to the 8B/10B conversion in the 8B/10B converting portion 128 and the 10-bit word sequence data DXF(10) obtained from the 8B/10B converting portion 128 are supplied to the composite data producing portion 129 so as to produce the composite 8-bit word sequence data DZF(8), the 8-bit word sequence data DI(8) obtained from the bit dividing portion 140 are subjected to the 8B/10B conversion in the 8B/10B converting portion 150 and the 10-bit word sequence data DXI(10) obtained from the 8B/10B converting portion 150 are supplied to the composite data producing portion 151 so as to produce the composite 8-bit word sequence data DZI(8), the 8-bit word sequence data DJ(8) obtained from the bit dividing portion 140 are subjected to the 8B/10B conversion in the 8B/10B converting portion 157 and the 10-bit word sequence data DXJ(10) obtained from the 8B/10B converting portion 157 are supplied to the composite data producing portion 158 so as to produce the composite 8-bit word sequence data DZJ(8), and the 8-bit word sequence data DH(8) obtained from the bit adding portion 135 are subjected to the 8B/10B conversion in the 8B/10B converting portion 141 and the 10-bit word sequence data DXH(10) obtained from the 8B/10B converting portion 141 are supplied to the composite data producing portion 142 so as to produce the composite 8-bit word sequence data DZH(8).

Since the composite 8-bit word sequence data DZE(8) are produced based on the 10-bit word sequence data DXE(10) which are obtained by causing the 8-bit word sequence data DE(8) to be subjected to the 8B/10B conversion, the composite 8-bit word sequence data DZF(8) are produced based on the 10-bit word sequence data DXF(10) which are obtained by causing the 8-bit word sequence data DF(8) to be subjected to the 8B/10B conversion, the composite 8-bit word sequence data DZI(8) are produced based on the 10-bit word sequence data DXI(10) which are obtained by causing the 8-bit word sequence data DI(8) to be subjected to the 8B/10B conversion, the composite 8-bit word sequence data DZJ(8) are produced based on the 10-bit word sequence data DXJ(10) which are obtained by causing the 8-bit word sequence data DJ(8) to be subjected to the 8B/10B conversion, and the composite 8-bit word sequence data DZH(8) are produced based on the 10-bit word sequence data DXH(10) which are obtained by causing the 8-bit word sequence data DH(8) to be subjected to the 8B/10B conversion as described above, each of the serial data DSE, DSF, DSI, DSJ and DSH produced based on the composite 8-bit word sequence data DZE(8), DZF(8), DZI(8), DZJ(8) and DZH(8), respectively, are improved in quality of signal and thereby the reliability in transmission thereof is increased.

Figure 19:
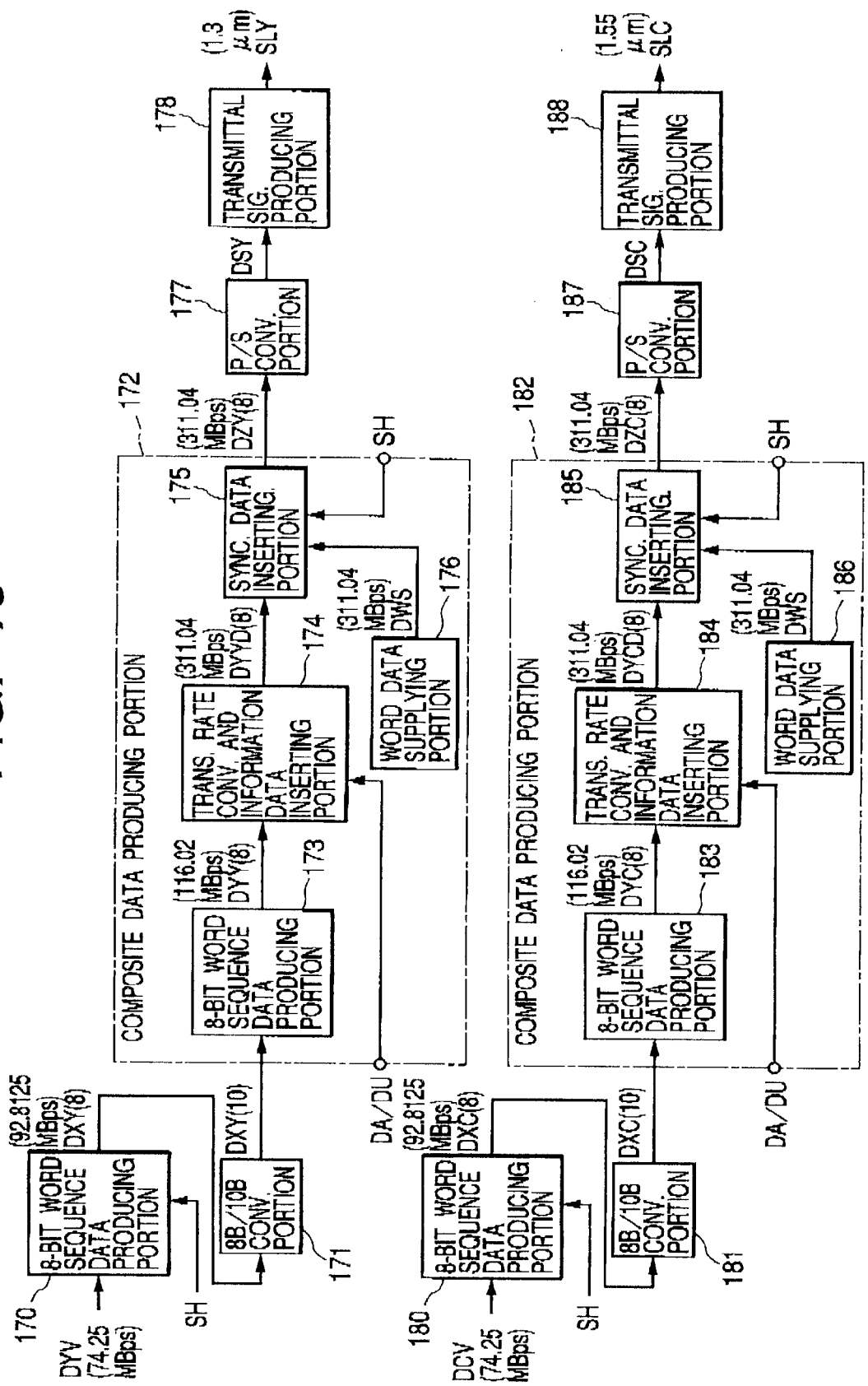
FIG. 19 is a schematic block diagram showing a sixth embodiment of apparatus for transmitting digital data according to the present invention, in which a sixth embodiment of method of transmitting digital data according to the present invention is carried out.

FIG. 19 shows a sixth embodiment of apparatus for transmitting digital data according to the present invention, in which a sixth embodiment of method of transmitting digital data according to the present invention is carried out.

Referring to FIG. 19, a Y data sequence DYV such as shown in FIG. 3A, which represents luminance signal information data constituting partially a digital video signal, is supplied to an 8-bit word sequence data producing portion 170 as first digital image information data. The Y data sequence DYV is constituted with 10-bit word sequence data having the word transmission rate of, for example, 74.25 MBps.

A line synchronous signal SH relative to the Y data sequence DYV is also supplied to the 8-bit word sequence data producing portion 170.

In the 8-bit word sequence data producing portion 170, the Y data sequence DYV is converted into word sequence data in which each word is composed of 8 bits with time reference defined by the line synchronous signal SH to produce 8-bit word sequence data DXY(8) having the word transmission rate of, for example, 742.5/8=92.8125 MBps. The 8-bit word sequence data DXY(8) are supplied from the 8-bit word sequence data producing portion 170 to a 8B/10B converting portion 171.

In the 8B/10B converting portion 171, the 8-bit word sequence data DXY(8) are subjected to 8B/10B conversion by which every 8 bits constituting each word of the 8-bit word sequence data DXY(8) are converted into 10 bits to produce 10-bit word sequence data DXY(10). The 10-bit word sequence data DXY(10) are supplied from the 8B/10B converting portion 171 to a composite data producing portion 172.

In the composite data producing portion 172, the 10-bit word sequence data DXY(10) are supplied to an 8-bit word sequence data producing portion 173. In the 8-bit word sequence data producing portion 173, the 10-bit word sequence data DXY(10) are converted into word sequence data in which each word is composed of 8 bits to produce 8-bit word sequence data DYY(8) having the word transmission rate of 116.02 MBps. The 8-bit word sequence data DYY(8) are supplied from the 8-bit word sequence data producing portion 173 to a transmission rate converting and information data inserting portion 174.

A digital audio signal DA or a digital ancillary signal DU constituted with 8-bit word sequence data is also supplied to the transmission rate converting and information data inserting portion 174 as specific information data. The digital audio signal DA or the digital ancillary signal DU has the word transmission rate of 311.04 MBps.

In the transmission rate converting and information data inserting portion 174, the word transmission rate of the 8-bit word sequence data DYY(8) is converted from 116.02

MBps to 311.04 MBps and then the digital audio signal DA or the digital ancillary signal DU is inserted into the 8-bit word sequence data DYY(8) at predetermined word intervals to be multiplexed on the 8-bit word sequence data DYY(8) and to produce multiplex 8-bit word sequence data DYYD(8) having the word transmission rate of 311.04 MBps.

Figure 20:
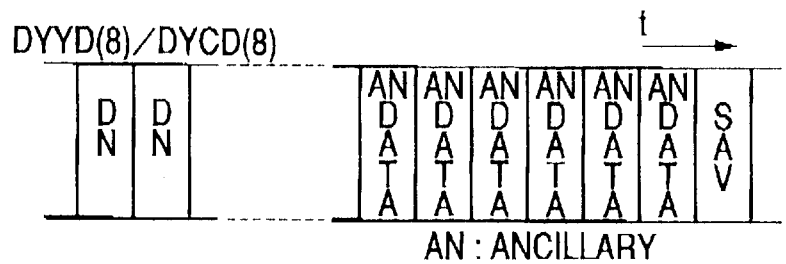
FIG. 20 is a time chart used for explanation of the method carried out in the apparatus shown in FIG. 19.

A portion of the multiplex 8-bit word sequence data DYYD(8), which corresponds partially to each line blanking period and in which the digital audio signal DA or the digital ancillary signal DU is inserted, is shown in FIG. 20. In FIG. 20, DN represents 8-bit word data contained in the 8-bit word sequence data DYY(8) on which the digital audio signal DA or the digital ancillary signal DU is multiplexed and an arrow t represents the lapse of time.

The multiplex 8-bit word sequence data DYYD(8) are supplied from the transmission rate converting and information data inserting portion 174 to a synchronous data inserting portion 175. An additional word data group DWS which is constituted with a plurality of 8-bit data word including 8-bit word synchronous data and forwarded from a word data supplying portion 176 is also supplied to the synchronous data inserting portion 175. Further, the line synchronous signal SH is supplied to the synchronous data inserting portion 175.

An example of the additional word data group DWS supplied from the word data supplying portion 176 is formed to include three successive 8-bit word synchronous data A1s each allotted the specific code of 11110110 and three successive 8-bit word synchronous data A2s each allotted the specific code of 00101000 following the 8-bit word synchronous data A1s. The additional word data group DWS thus formed has the word transmission rate of 311.04 MBps.

In the synchronous data inserting portion 175, the additional word data group DWS is inserted into the multiplex 8-bit word sequence data DYYD(8) at the timing determined in accordance with the line synchronous signal SH in such a manner that, for example, six words of a group of ancillary data located just before time reference code data SAV are replaced by the three successive 8-bit word synchronous data A1s and the three successive 8-bit word synchronous data A2s contained in the additional word data group DWS in each portion of the multiplex 8-bit word sequence data DYYD(8) corresponding to the line blanking period. As a result, composite 8-bit word sequence data DZY(8) having the word transmission rate of 311.04 MBps is produced based on the 8-bit word sequence data DXY(8) having the word transmission rate of 92.8125 MBps and obtained from the 8-bit word sequence data producing portion 170.

Figure 21:
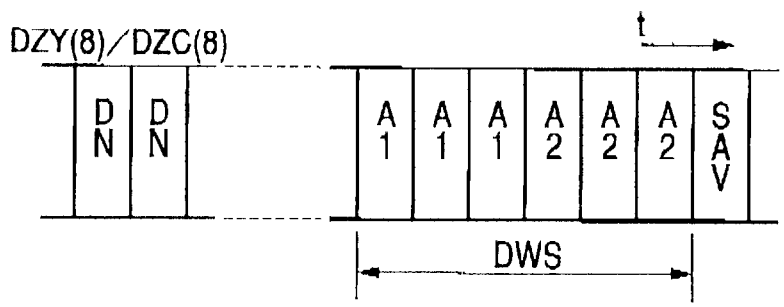
FIG. 21 is a time chart used for explanation of the method carried out in the apparatus shown in FIG. 19.

A portion of the composite 8-bit word sequence data DZY(8) in which the additional word data group DWS including the three successive 8-bit word synchronous data A1s and three successive 8-bit word synchronous data A2s obtained as mentioned above is inserted is shown in FIG. 21. In FIG. 21, DN represents 8-bit word data contained in the 8-bit word sequence data DYYD(8) on which the digital audio signal DA or the digital ancillary signal DU is multiplexed and an arrow t represents the lapse of time.

The composite 8-bit word sequence data DZY(8) thus produced in the synchronous data inserting portion 175 are derived from the composite data producing portion 172 to a P/S converting portion 177. In the P/S converting portion 177, the composite 8-bit word sequence data DZY(8) is subjected to P/S conversion by which parallel data are converted into serial data to produce serial data DSY based on the composite 8-bit word sequence data DZY(8). The serial data DSY are supplied from the P/S converting portion 177 to a transmittal signal producing portion 178. The transmittal signal producing portion 178 is operative to convert the serial data DSY to a transmittal signal which is, for example, an optical signal SLY having the wavelength of, for example, about 1.3 μm and fit for a data transmission line made of optical fiber. The optical signal SLY is derived from the transmittal signal producing portion 178 to a data transmission line made of optical fiber, so that the serial data DSY are transmitted through the data transmission line.

A $P_B/P_R$ data sequence DCV such as shown in FIG. 3B, which represents chrominance signal information data constituting partially the digital video signal, is supplied to an 8-bit word sequence data producing portion 180 as second digital image information data. The $P_B/P_R$ data sequence DCV is constituted with 10-bit word sequence data having the word transmission rate of, for example, 74.25 MBps.

A line synchronous signal SH relative to the $P_B/P_R$ data sequence DCV is also supplied to the 8-bit word sequence data producing portion 180. In the 8-bit word sequence data producing portion 180, the $P_B/P_R$ data sequence DCV is converted into word sequence data in which each word is composed of 8 bits with time reference defined by the line synchronous signal SH to produce 8-bit word sequence data DXC(8) having the word transmission rate of, for example, 742.5/8=92.8125 MBps. The 8-bit word sequence data DXC(8) are supplied from the 8-bit word sequence data producing portion 180 to a 8B/10B converting portion 181.

In the 8B/10B converting portion 181, the 8-bit word sequence data DXC(8) are subjected to 8B/10B conversion by which every 8 bits constituting each word of the 8-bit word sequence data DXC(8) are converted into 10 bits to produce 10-bit word sequence data DXC(10). The 10-bit word sequence data DXC(10) are supplied from the 8B/10B converting portion 181 to a composite data producing portion 182.

In the composite data producing portion 182, the 10-bit word sequence data DXC(10) are supplied to an 8-bit word sequence data producing portion 183. In the 8-bit word sequence data producing portion 183, the 10-bit word sequence data DXC(10) are converted into word sequence data in which each word is composed of 8 bits to produce 8-bit word sequence data DYC(8) having the word transmission rate of, for example, 116.02 MBps. The 8-bit word sequence data DYC(8) are supplied from the 8-bit word sequence data producing portion 183 to a transmission rate converting and information data inserting portion 184.

A digital audio signal DA or a digital ancillary signal DU constituted with 8-bit word sequence data is also supplied to the transmission rate converting and information data inserting portion 184 as specific information data. The digital audio signal DA or the digital ancillary signal DU has the word transmission rate of 311.04 MBps.

In the transmission rate converting and information data inserting portion 184, the word transmission rate of the 8-bit word sequence data DYC(8) is converted from 116.02 MBps to 311.04 MBps and then the digital audio signal DA or the digital ancillary signal DU is inserted into the 8-bit word sequence data DYC(8) at predetermined word intervals to be multiplexed on the 8-bit word sequence data DYC(8) and to produce multiplex 8-bit word sequence data DYCD(8) having the word transmission rate of 311.04 MBps.

A portion of the multiplex 8-bit word sequence data DYCD(8), which corresponds partially to each line blanking period and in which the digital audio signal DA or the digital ancillary signal DU is inserted, is shown in FIG. 20.

The multiplex 8-bit word sequence data DYCD(8) are supplied from the transmission rate converting and information data inserting portion 184 to a synchronous data inserting portion 185. An additional word data group DWS which is constituted with a plurality of 8-bit data word including 8-bit word synchronous data and forwarded from a word data supplying portion 186 is also supplied to the synchronous data inserting portion 185. Further, the line synchronous signal SH is supplied to the synchronous data inserting portion 185.

An example of the additional word data group DWS supplied from the word data supplying portion 186 is formed to include three successive 8-bit word synchronous data A1s each allotted the specific code of 11110110 and three successive 8-bit word synchronous data A2s each allotted the specific code of 00101000 following the 8-bit word synchronous data A1s. The additional word data group DWS thus formed has the word transmission rate of 311.04 MBps.

In the synchronous data inserting portion 185, the additional word data group DWS is inserted into the multiplex 8-bit word sequence data DYCD(8) at the timing determined in accordance with the line synchronous signal SH in such a manner that, for example, six words of a group of ancillary data located just before time reference code data SAV are replaced by the three successive 8-bit word synchronous data A1s and the three successive 8-bit word synchronous data A2s contained in the additional word data group DWS in each portion of the multiplex 8-bit word sequence data DYCD(8) corresponding to the line blanking period. As a result, composite 8-bit word sequence data DZC(8) having the word transmission rate of 311.04 MBps is produced based on the 8-bit word sequence data DXC(8) having the word transmission rate of 92.8125 MBps and obtained from the 8-bit word sequence data producing portion 180.

A portion of the composite 8-bit word sequence data DZC(8) in which the additional word data group DWS including the three successive 8-bit word synchronous data A1s and three successive 8-bit word synchronous data A2s obtained as mentioned above is inserted is shown in FIG. 21.

The composite 8-bit word sequence data DZC(8) thus produced in the synchronous data inserting portion 185 are derived from the composite data producing portion 182 to a P/S converting portion 187. In the P/S converting portion 187, the composite 8-bit word sequence data DZC(8) is subjected to P/S conversion by which parallel data are converted into serial data to produce serial data DSC based on the composite 8-bit word sequence data DZC(8). The serial data DSC are supplied from the P/S converting portion 187 to a transmittal signal producing portion 188. The transmittal signal producing portion 188 is operative to convert the serial data DSC to a transmittal signal which is, for example, an optical signal SLC having the wavelength of, for example, about 1.55 μm and fit for a data transmission line made of optical fiber. The optical signal SLC is derived from the transmittal signal producing portion 188 to a data transmission line made of optical fiber, so that the serial data DSC are transmitted through the data transmission line.

Figure 22:
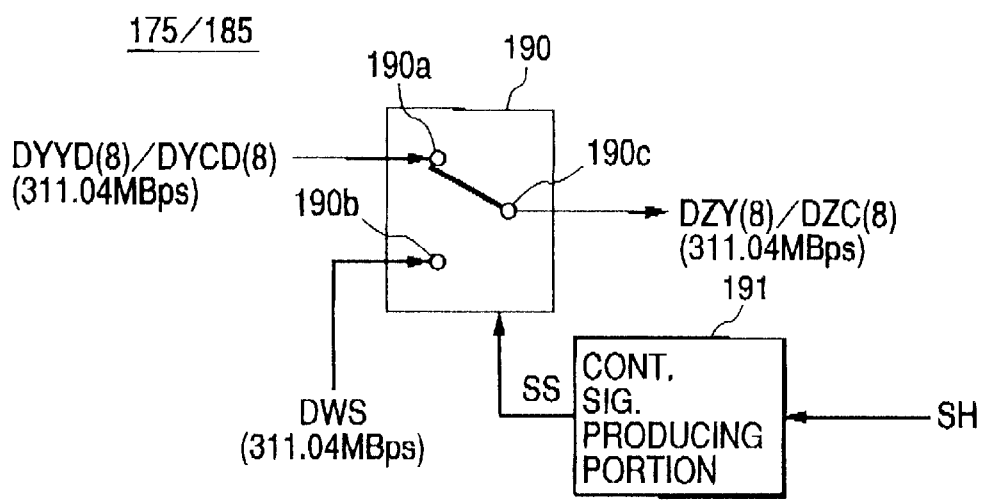
FIG. 22 is a schematic block diagram showing a first embodiment of a synchronous data inserting portion provided in the apparatus shown in FIG. 19.

FIG. 22 shows an embodiment of the synchronous data inserting portion 175 or 185. In the embodiment shown in FIG. 22, the multiplex 8-bit word sequence data DYYD(8) or DYCD(8) having the word transmission rate of 311.04 MBps are supplied to a selective contact 190a of a switch 190. The additional word data group DWS including the three successive 8-bit word synchronous data A1s and three successive 8-bit word synchronous data A2s and having the word transmission rate of 311.04 MBps is supplied to a selective contact 190b of the switch 190. The additional word data group DWS is so controlled in timing that the three successive 8-bit word synchronous data A1s and three successive 8-bit word synchronous data A2s are synchronized with the six words of the group of ancillary data located just before the time reference code data SAV in each portion of the multiplex 8-bit word sequence data DYYD(8) or DYCD(8) corresponding to the line blanking period.

A control signal SS obtained from a control signal producing portion 191 to synchronize with the line synchronous signal SH is also supplied to the switch 190. The switch 190 is so controlled by the control signal SS that a movable contact 190c of the switch 190 is connected with the selective contact 190b, to which the additional word data group DWS is supplied, to extract the additional word data group DWS during a first period in which the six words of the group of ancillary data located just before the time reference code data SAV in each portion of the multiplex 8-bit word sequence data DYYD(8) or DYCD(8) corresponding to the line blanking period are supplied to the selective contact 190a and connected with the selective contact 190a, to which the multiplex 8-bit word sequence data DYYD(8) or DYCD(8) are supplied, to extract multiplex 8-bit word sequence data DYYD(8) or DYCD(8) during a second period other than the first period. Consequently, the composite 8-bit word sequence data DZY(8) or DZC(8) which include three successive 8-bit word synchronous data A1s and three successive 8-bit word synchronous data A2s inserted in place of the six words of the group of ancillary data located just before the time reference code data SAV in each portion of the multiplex 8-bit word sequence data DYYD(8) or DYCD(8) corresponding to the line blanking period and have the word transmission rate of 311.04 MBps, are obtained at the movable contact 190c of the switch 190.

In the embodiment shown in FIG. 19, the 8-bit word sequence data DXY(8) obtained from the 8-bit word sequence data producing portion 170 are subjected to the 8B/10B conversion in the 8B/10B converting portion 171 and the 10-bit word sequence data DXY(10) obtained from the 8B/10B converting portion 171 are supplied to the composite data producing portion 172 so as to produce the composite 8-bit word sequence data DZY(8), and the 8-bit word sequence data DXC(8) obtained from the 8-bit word sequence data producing portion 180 are subjected to the 8B/10B conversion in the 8B/10B converting portion 181 and the 10-bit word sequence data DXC(10) obtained from the 8B/10B converting portion 181 are supplied to the composite data producing portion 182 so as to produce the composite 8-bit word sequence data DZC(8). Since the composite 8-bit word sequence data DZY(8) are produced based on the 10-bit word sequence data DXY(10) which are obtained by causing the 8-bit word sequence data DXY(8) to be subjected to the 8B/10B conversion and the composite 8-bit word sequence data DZC(8) are produced based on the 10-bit word sequence data DXC(10) which are obtained by causing the 8-bit word sequence data DXC(8) to be subjected to the 8B/10B conversion as described above, each of the serial data DSY and DSC produced based on the composite 8-bit word sequence data DZY(8) and DZC(8), respectively, are improved in quality of signal and thereby the reliability in transmission thereof is increased.

Figure 23:
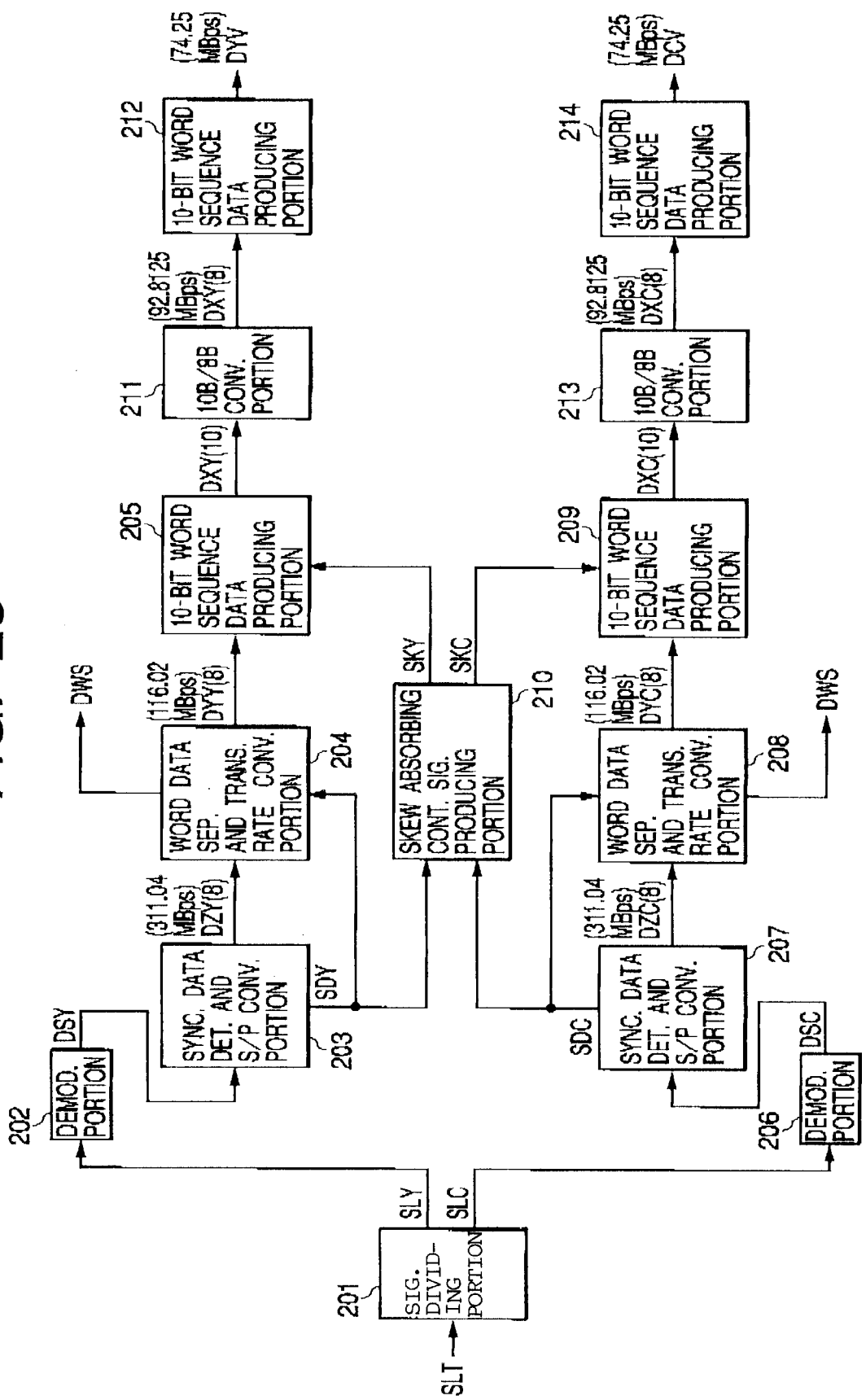
FIG. 23 is a schematic block diagram showing a data receiving apparatus for receiving a signal transmitted from the apparatus shown in FIG. 5.

FIG. 23 shows an example of a data receiving apparatus for receiving a multiplex optical signal SLT transmitted from the first embodiment of apparatus for transmitting digital data according to the present invention shown in FIG. 5.

Referring to FIG. 23, the multiplex optical signal SLT transmitted through the data transmission line made of optical fiber is received by a signal dividing portion 201. The signal dividing portion 201 is operative to divide the multiplex optical signal SLT into an optical signal SLY and an optical signal SLC.

The optical signal SLY obtained from the signal dividing portion 201 is supplied to a demodulating portion 202. In the demodulating portion 202, the optical signal SLY is demodulated to reproduce serial data DSY and the serial data DSY thus reproduced are supplied to a synchronous data detecting and serial to parallel (S/P) converting portion 203.

Figure 24A:
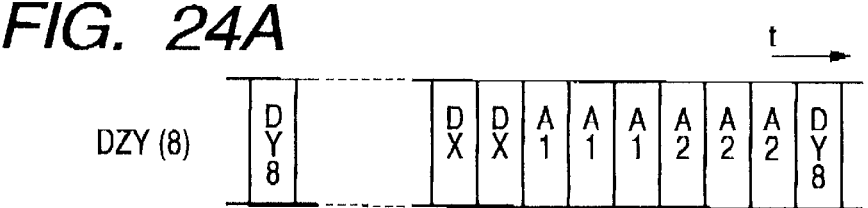
FIGS. 24A and 24B are time charts used for explanation of an operation of the data receiving apparatus shown in FIG. 23.
Figure 25A:
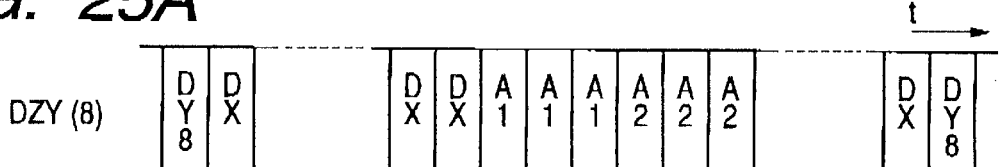
FIGS. 25A and 25B are time charts used for explanation of an operation of the data receiving apparatus shown in FIG. 23.

In the synchronous data detecting and S/P converting portion 203, a part of the serial data DSY which corresponds to three successive 8-bit word synchronous data A1s and three successive 8-bit word synchronous data A2s are detected as synchronous data and the serial data DSY are subjected to S/P conversion under the word synchronization by the detected synchronous data to produce composite 8-bit word sequence data DZY(8) which have such portions as shown in FIGS. 24A or 25A and the word transmission rate of 311.04 MBps. The composite 8-bit word sequence data DZY(8) obtained from the synchronous data detecting and S/P converting portion 203 are supplied to a word data separating and transmission rate converting portion 204.

Figure 24B:
Figure 25B:

Further, in the synchronous data detecting and S/P converting portion 203, the three successive 8-bit word synchronous data A1s and three successive 8-bit word synchronous data A2s contained in additional word data group DWS in the composite 8-bit word sequence data DZY(8) are detected to produce a synchronous data detection output signal SDY. This synchronous data detection output signal SDY is so obtained as to correspond to, for example, the last one of the three successive 8-bit word synchronous data A1s and three successive 8-bit word synchronous data A2s contained in the additional word data group DWS in the composite 8-bit word sequence data DZY(8), as shown in FIG. 24B or 25B. The synchronous data detection output signal SDY thus obtained from the synchronous data detecting and S/P converting portion 203 is supplied to the word data separating and transmission rate converting portion 204 and a skew absorbing control signal producing portion 210.

In the word data separating and transmission rate converting portion 204, the additional word data group DWS is separated from the composite 8-bit word sequence data DZY(8) with use of the synchronous data detection output signal SDY, and the additional word data group DWS and 8-bit word sequence data DYY(8) each based on the composite 8-bit word sequence data DZY(8) are extracted separately from each other. Then, the word transmission rate of the 8-bit word sequence data DYY(8) is converted from 311.04 MBps to 116.02 MBps.

The 8-bit word sequence data DYY(8) having the word transmission rate of 116.02 MBps are supplied from the word data separating and transmission rate converting portion 204 to a 10-bit word sequence data producing portion 205.

The optical signal SLC obtained from the signal dividing portion 201 is supplied to a demodulating portion 206. In the demodulating portion 206, the optical signal SLC is demodulated to reproduce serial data DSC and the serial data DSC thus reproduced are supplied to a synchronous data detecting and S/P converting portion 207.

Figure 26A:
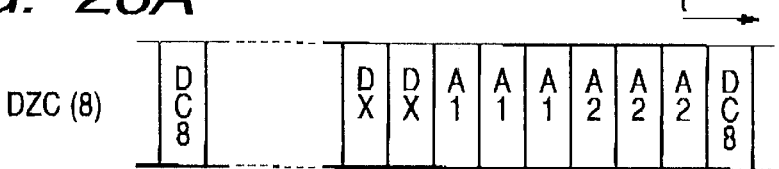
FIGS. 26A and 26B are time charts used for explanation of an operation of the data receiving apparatus shown in FIG. 23.
Figure 27A:
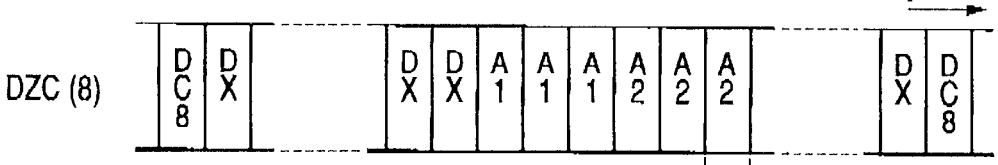
FIGS. 27A and 27B are time charts used for explanation of an operation of the data receiving apparatus shown in FIG. 23.

In the synchronous data detecting and S/P converting portion 207, a part of the serial data DSC which corresponds to three successive 8-bit word synchronous data A1s and three successive 8-bit word synchronous data A2s are detected as synchronous data and the serial data DSC are subjected to S/P conversion under the word synchronization by the detected synchronous data to produce composite 8-bit word sequence data DZC(8) which have such portions as shown in FIGS. 26A or 27A and the word transmission rate of 311.04 MBps. The composite 8-bit word sequence data DZC(8) obtained from the synchronous data detecting and S/P converting portion 207 are supplied to a word data separating and transmission rate converting portion 208.

Figure 26B:
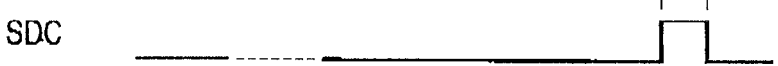
Figure 27B:
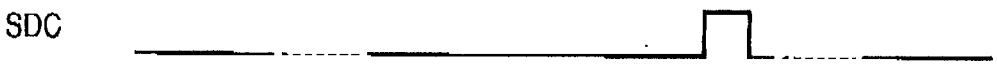

Further, in the synchronous data detecting and S/P converting portion 207, the three successive 8-bit word synchronous data A1s and three successive 8-bit word synchronous data A2s contained in the additional word data group DWS in the composite 8-bit word sequence data DZC(8) are detected to produce a synchronous data detection output signal SDC. This synchronous data detection output signal SDC is so obtained as to correspond to, for example, the last one of the three successive 8-bit word synchronous data A1s and three successive 8-bit word synchronous data A2s contained in the additional word data group DWS in the composite 8-bit word sequence data DZC(8), as shown in FIG. 26B or 27B. The synchronous data detection output signal SDC thus obtained from the synchronous data detecting and S/P converting portion 207 is supplied to the word data separating and transmission rate converting portion 208 and the skew absorbing control signal producing portion 210.

In the word data separating and transmission rate converting portion 208, the additional word data group DWS is separated from the composite 8-bit word sequence data DZC(8) with use of the synchronous data detection output signal SDC, and the additional word data group DWS and 8-bit word sequence data DYC(8) each based on the composite 8-bit word sequence data DZC(8) are extracted separately from each other. Then, the word transmission rate of the 8-bit word sequence data DYC(8) is converted from 311.04 MBps to 116.02 MBps.

The 8-bit word sequence data DYC(8) having the word transmission rate of 116.02 MBps are supplied from the word data separating and transmission rate converting portion 208 to a 10-bit word sequence data producing portion 209.

In the skew absorbing control signal producing portion 210 to which the synchronous data detection output signal SDY obtained from the synchronous data detecting and S/P converting portion 203 and the synchronous data detection output signal SDC obtained from the synchronous data detecting and S/P converting portion 207 are supplied, a time difference between the optical signals SLY and SLC which results from the fact that the optical signal SLY has the wavelength of about 1.3 $\mu$m and the optical signal SLC has the wavelength of about 1.55 $\mu$m is detected on the strength of a time difference between the synchronous data detection output signals SDY and SDC and skew absorbing control signals SKY and SKC are produced based on the detected time difference between the optical signals SLY and SLC. The skew absorbing control signals SKY and SKC thus produced are supplied to both of the 10-bit word sequence data producing portion 205 and the 10-bit word sequence data producing portion 209.

In the 10-bit word sequence data producing portion 205, the 8-bit word sequence data DYY(8) are converted into word sequence data in which each word is composed of 10 bits with the timing control by the skew absorbing control signals SKY to produce 10-bit word sequence data DXY(10) having the word transmission rate of 116.02×8/10=92.8125

MBps. The 10-bit word sequence data DXY(10) obtained from the 10-bit word sequence data producing portion 205 are supplied to a 10 bits to 8 bits (10B/8B) converting portion 211.

In the 10B/8B converting portion 211, the 10-bit word sequence data DXY(10) are subjected to 10B/8B conversion by which every 10 bits constituting each word of the 10-bit word sequence data DXY(10) are converted into 8 bits to produce 8-bit word sequence data DXY(8) having the word transmission rate of 92.8125 MBps. The 8-bit word sequence data DXY(8) are supplied from the 10B/8B converting portion 211 to a 10-bit word sequence data producing portion 212.

In the 10-bit word sequence data producing portion 212, the 8-bit word sequence data DXY(8) are converted into word sequence data in which each word is composed of 10 bits to produce 10-bit word sequence data having the word transmission rate of 92.8125×8/10=74.25 MBps. This 10-bit word sequence data thus obtained are derived from the 10-bit word sequence data producing portion 212 as a Y data sequence DYV constituted with 10-bit word sequence data and having the word transmission rate of 74.25 MBps.

In the 10-bit word sequence data producing portion 209, the 8-bit word sequence data DYC(8) are converted into word sequence data in which each word is composed of 10 bits with the timing control by the skew absorbing control signals SKC to produce 10-bit word sequence data DXC(10) having the word transmission rate of 116.02×8/10=92.8125 MBps. The 10-bit word sequence data DXC(10) obtained from the 10-bit word sequence data producing portion 209 are supplied to a 10B/8B converting portion 213.

In the 10B/8B converting portion 213, the 10-bit word sequence data DXC(10) are subjected to 10B/8B conversion by which every 10 bits constituting each word of the 10-bit word sequence data DXC(10) are converted into 8 bits to produce 8-bit word sequence data DXC(8) having the word transmission rate of 92.8125 MBps. The 8-bit word sequence data DXC(8) are supplied from the 10B/8B converting portion 213 to a 10-bit word sequence data producing portion 214.

In the 10-bit word sequence data producing portion 214, the 8-bit word sequence data DXC(8) are converted into word sequence data in which each word is composed of 10 bits to produce 10-bit word sequence data having the word transmission rate of 92.8125×8/10=74.25 MBps. This 10-bit word sequence data thus obtained are derived from the 10-bit word sequence data producing portion 214 as a $P_B/P_R$ data sequence DCV constituted with 10-bit word sequence data and having the word transmission rate of 74.25 MBps.

Consequently, the Y data sequence DYV and the $P_B/P_R$ data sequence DCV which are reproduced without skew resulting from the time difference between the optical signals SLY and SLC are obtained from the 10-bit word sequence data producing portion 212 and the 10-bit word sequence data producing portion 214, respectively.

FIG. 28 shows an example of a data receiving apparatus for receiving a multiplex optical signal SLT transmitted from the second embodiment of apparatus for transmitting digital data according to the present invention shown in FIG. 12.

Referring to FIG. 28, the multiplex optical signal SLT transmitted through the data transmission line made of optical fiber is received by a signal dividing portion 221. The signal dividing portion 221 is operative to divide the multiplex optical signal SLT into an optical signal SLM and an optical signal SLR.

The optical signal SLM obtained from the signal dividing portion 221 is supplied to a demodulating portion 222. In the demodulating portion 222, the optical signal SLM is demodulated to reproduce serial data DSM and the serial data DSM thus reproduced are supplied to a synchronous data detecting and S/P converting portion 223.

In the synchronous data detecting and S/P converting portion 223, a part of the serial data DSM which corresponds to three successive 8-bit word synchronous data A1s and three successive 8-bit word synchronous data A2s are detected as synchronous data and the serial data DSM are subjected to S/P conversion under the word synchronization by the detected synchronous data to produce composite 8-bit word sequence data DZM(8) having the word transmission rate of 311.04 MBps. The composite 8-bit word sequence data DZM(8) obtained from the synchronous data detecting and S/P converting portion 223 are supplied to a word data separating and transmission rate converting portion 224.

Further, in the synchronous data detecting and S/P converting portion 223, the three successive 8-bit word synchronous data A1s and three successive 8-bit word synchronous data A2s contained in additional word data group DWS in the composite 8-bit word sequence data DZM(8) are detected to produce a synchronous data detection output signal SDM. This synchronous data detection output signal SDM is so obtained as to correspond to, for example, the last one of the three successive 8-bit word synchronous data A1s and three successive 8-bit word synchronous data A2s contained in the additional word data group DWS in the composite 8-bit word sequence data DZM(8). The synchronous data detection output signal SDM thus obtained from the synchronous data detecting and S/P converting portion 223 is supplied to the word data separating and transmission rate converting portion 224 and a skew absorbing control signal producing portion 230.

In the word data separating and transmission rate converting portion 224, the additional word data group DWS is separated from the composite 8-bit word sequence data DZM(8) with use of the synchronous data detection output signal SDM, and the additional word data group DWS and 8-bit word sequence data DYM(8) each based on the composite 8-bit word sequence data DZM(8) are extracted separately from each other. Then, the word transmission rate of the 8-bit word sequence data DYM(8) is converted from 311.04 MBps to 232.03 MBps.

The 8-bit word sequence data DYM(8) having the word transmission rate of 232.03 MBps are supplied from the word data separating and transmission rate converting portion 224 to a 10-bit word sequence data producing portion 225.

The optical signal SLR obtained from the signal dividing portion 221 is supplied to a demodulating portion 226. In the demodulating portion 226, the optical signal SLR is demodulated to reproduce serial data DSR and the serial data DSR thus reproduced are supplied to a synchronous data detecting and S/P converting portion 227.

In the synchronous data detecting and S/P converting portion 227, a part of the serial data DSR which corresponds to three successive 8-bit word synchronous data A1s and three successive 8-bit word synchronous data A2s are detected as synchronous data and the serial data DSR are subjected to S/P conversion under the word synchronization by the detected synchronous data to produce composite 8-bit word sequence data DZR(8) having the word transmission rate of 311.04 MBps. The composite 8-bit word sequence data DZR(8) obtained from the synchronous data detecting and S/P converting portion 227 are supplied to a word data separating and transmission rate converting portion 228.

Further, in the synchronous data detecting and S/P converting portion 227, the three successive 8-bit word synchronous data A1s and three successive 8-bit word synchronous data A2s contained in the additional word data group DWS in the composite 8-bit word sequence data DZR(8) are detected to produce a synchronous data detection output signal SDR. This synchronous data detection output signal SDR is so obtained as to correspond to, for example, the last one of the three successive 8-bit word synchronous data A1s and three successive 8-bit word synchronous data A2s contained in the additional word data group DWS in the composite 8-bit word sequence data DZR(8). The synchronous data detection output signal SDR thus obtained from the synchronous data detecting and S/P converting portion 227 is supplied to the word data separating and transmission rate converting portion 228 and the skew absorbing control signal producing portion 230.

In the word data separating and transmission rate converting portion 228, the additional word data group DWS is separated from the composite 8-bit word sequence data DZR(8) with use of the synchronous data detection output signal SDR, and the additional word data group DWS and 8-bit word sequence data DYR(8) each based on the composite 8-bit word sequence data DZR(8) are extracted separately from each other. Then, the word transmission rate of the 8-bit word sequence data DYR(8) is converted from 311.04 MBps to 116.02 MBps.

The 8-bit word sequence data DYR(8) having the word transmission rate of 116.02 MBps are supplied from the word data separating and transmission rate converting portion 228 to a 10-bit word sequence data producing portion 229.

In the skew absorbing control signal producing portion 230 to which the synchronous data detection output signal SDM obtained from the synchronous data detecting and S/P converting portion 223 and the synchronous data detection output signal SDR obtained from the synchronous data detecting and S/P converting portion 227 are supplied, a time difference between the optical signals SLM and SLR which results from the fact that the optical signal SLM has the wavelength of about 1.3 $\mu$m and the optical signal SLR has the wavelength of about 1.55 $\mu$m is detected on the strength of a time difference between the synchronous data detection output signals SDM and SDR and skew absorbing control signals SKM and SKR are produced based on the detected time difference between the optical signals SLM and SLR. The skew absorbing control signals SKM and SKR thus produced are supplied to both of the 10-bit word sequence data producing portion 225 and the 10-bit word sequence data producing portion 229.

In the 10-bit word sequence data producing portion 225, the 8-bit word sequence data DYM(8) are converted into word sequence data in which each word is composed of 10 bits with timing control by the skew absorbing control signals SKM to produce 10-bit word sequence data DXM(10) having the word transmission rate of 185.625 MBps. The 10-bit word sequence data DXM(10) obtained from the 10-bit word sequence data producing portion 225 are supplied to a 10B/8B converting portion 231.

In the 10B/8B converting portion 231, the 10-bit word sequence data DXM(10) are subjected to 10B/8B conversion by which every 10 bits constituting each word of the 10-bit word sequence data DXM(10) are converted into 8 bits to produce 8-bit word sequence data DXM(8) having the word transmission rate of 185.625 MBps. The 8-bit word sequence data DXM(8) are supplied from the 10B/8B converting portion 231 to a 10-bit word sequence data producing portion 232.

In the 10-bit word sequence data producing portion 232, the 8-bit word sequence data DXM(8) are converted into word sequence data in which each word is composed of 10 bits and then divided into two 10-bit word sequence data, each of which have the word transmission rate of (185.625× 8/10)/2=74.25 MBps. These two 10-bit word sequence data thus obtained are derived from the 10-bit word sequence data producing portion 232 as blue primary color signal information data DBV and green primary color signal information data DGV each having the word transmission rate of 74.25 MBps.

In the 10-bit word sequence data producing portion 229, the 8-bit word sequence data DYR(8) are converted into word sequence data in which each word is composed of 10 bits with timing control by the skew absorbing control signals SKR to produce 10-bit word sequence data DXR(10) having the word transmission rate of 116.02×8/10=92.8125 MBps. The 10-bit word sequence data DXR(10) obtained from the 10-bit word sequence data producing portion 229 are supplied to a 10B/8B converting portion 233.

In the 10B/8B converting portion 233, the 10-bit word sequence data DXR(10) are subjected to 10B/8B conversion by which every 10 bits constituting each word of the 10-bit word sequence data DXR(10) are converted into 8 bits to produce 8-bit word sequence data DXR(8) having the word transmission rate of 92.8125 MBps. The 8-bit word sequence data DXR(8) are supplied from the 10B/8B converting portion 233 to a 10-bit word sequence data producing portion 234.

In the 10-bit word sequence data producing portion 234, the 8-bit word sequence data DXR(8) are converted into word sequence data in which each word is composed of 10 bits to produce 10-bit word sequence data having the word transmission rate of 92.8125×8/10=74.25 MBps. This 10-bit word sequence data thus obtained are derived from the 10-bit word sequence data producing portion 234 as red primary color signal information data DRV having the word transmission rate of 74.25 MBps.

Consequently, the blue primary color signal information data DBV, the green primary color signal information data DGV and the red primary color signal information data DRV which are reproduced without skew resulting from the time difference between the optical signals SLM and SLR are obtained from the 10-bit word sequence data producing portion 232 and the 10-bit word sequence data producing portion 234.

Figure 29:
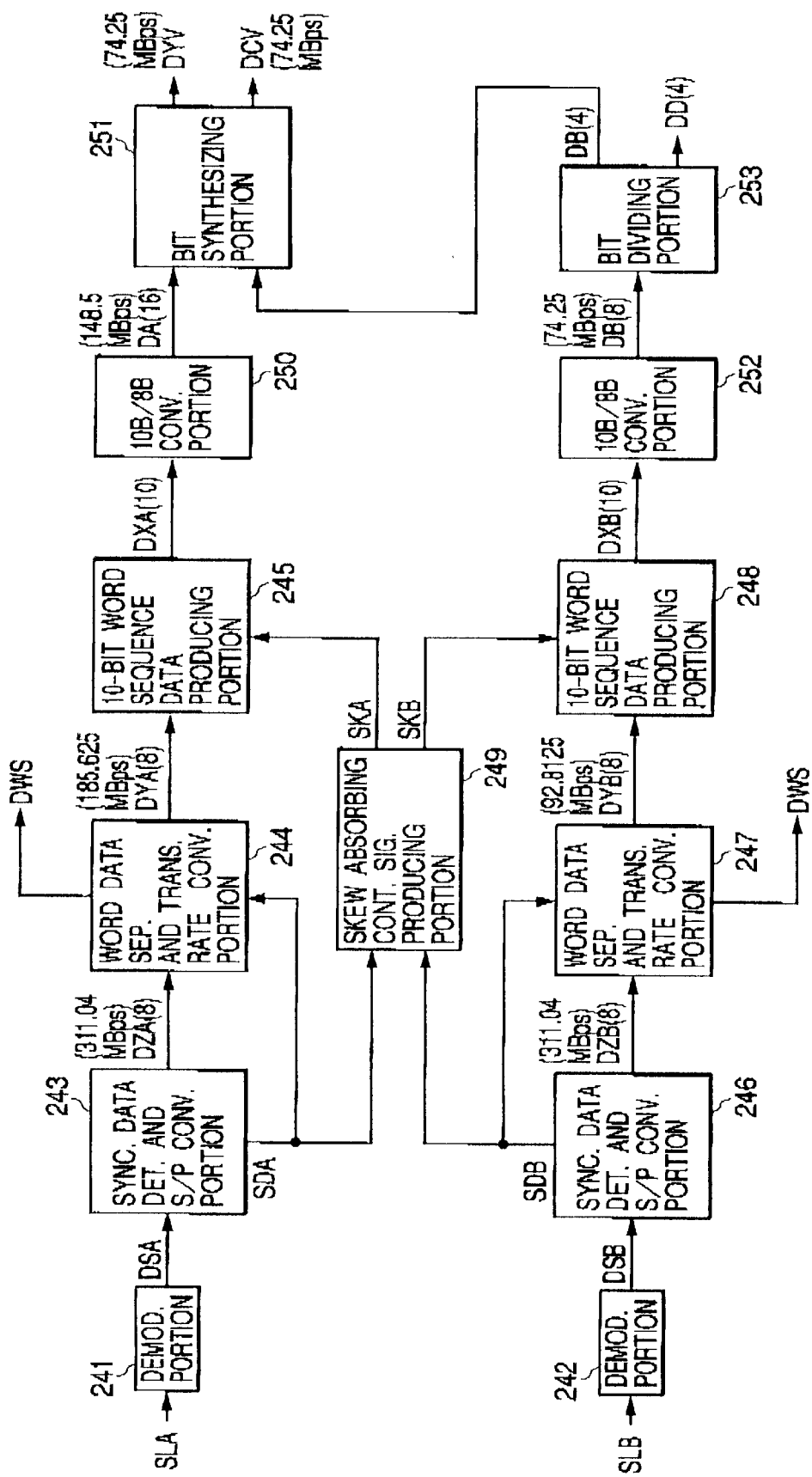
FIG. 29 is a schematic block diagram showing a data receiving apparatus for receiving a signal transmitted from the apparatus shown in FIG. 15.

FIG. 29 shows an example of a data receiving apparatus for receiving optical signals SLA and SLB transmitted from the third embodiment of apparatus for transmitting digital data according to the present invention shown in FIG. 15.

Referring to FIG. 29, the optical signals SLA and SLB transmitted through the data transmission lines each made of optical fiber are received by a demodulating portion 241 and a demodulating portion 242, respectively.

In the demodulating portion 241, the optical signal SLA is demodulated to reproduce serial data DSA and the serial data DSA thus reproduced are supplied to a synchronous data detecting and S/P converting portion 243.

In the synchronous data detecting and S/P converting portion 243, a part of the serial data DSA which corresponds to three successive 8-bit word synchronous data A1s and three successive 8-bit word synchronous data A2s are detected as synchronous data and the serial data DSA are subjected to S/P conversion under the word synchronization by the detected synchronous data to produce composite 8-bit word sequence data DZA(8) having the word transmission rate of 311.04 MBps. The composite 8-bit word sequence data DZA(8) obtained from the synchronous data detecting and S/P converting portion 243 are supplied to a word data separating and transmission rate converting portion 244.

Further, in the synchronous data detecting and S/P converting portion 243, the three successive 8-bit word synchronous data A1s and three successive 8-bit word synchronous data A2s contained in additional word data group DWS in the composite 8-bit word sequence data DZA(8) are detected to produce a synchronous data detection output signal SDA. This synchronous data detection output signal SDA is so obtained as to correspond to, for example, the last one of the three successive 8-bit word synchronous data A1s and three successive 8-bit word synchronous data A2s contained in the additional word data group DWS in the composite 8-bit word sequence data DZA(8). The synchronous data detection output signal SDA thus obtained from the synchronous data detecting and S/P converting portion 243 is supplied to the word data separating and transmission rate converting portion 244 and a skew absorbing control signal producing portion 249.

In the word data separating and transmission rate converting portion 244, the additional word data group DWS is separated from the composite 8-bit word sequence data DZA(8) with use of the synchronous data detection output signal SDA, and the additional word data group DWS and 8-bit word sequence data DYA(8) each based on the composite 8-bit word sequence data DZA(8) are extracted separately from each other. Then, the word transmission rate of the 8-bit word sequence data DYA(8) is converted from 311.04 MBps to 185.625 MBps.

The 8-bit word sequence data DYA(8) having the word transmission rate of 185.625 MBps are supplied from the word data separating and transmission rate converting portion 244 to a 10-bit word sequence data producing portion 245.

In the demodulating portion 242, the optical signal SLB is demodulated to reproduce serial data DSB and the serial data DSB thus reproduced are supplied to a synchronous data detecting and S/P converting portion 246.

In the synchronous data detecting and S/P converting portion 246, a part of the serial data DSB which corresponds to three successive 8-bit word synchronous data A1s and three successive 8-bit word synchronous data A2s are detected as synchronous data and the serial data DSB are subjected to S/P conversion under the word synchronization by the detected synchronous data to produce composite 8-bit word sequence data DZB(8) having the word transmission rate of 311.04 MBps. The composite 8-bit word sequence data DZB(8) obtained from the synchronous data detecting and S/P converting portion 246 are supplied to a word data separating and transmission rate converting portion 247.

Further, in the synchronous data detecting and S/P converting portion 246, the three successive 8-bit word synchronous data A1s and three successive 8-bit word synchronous data A2s contained in the additional word data group DWS in the composite 8-bit word sequence data DZB(8) are detected to produce a synchronous data detection output signal SDB. This synchronous data detection output signal SDB is so obtained as to correspond to, for example, the last one of the three successive 8-bit word synchronous data A1s and three successive 8-bit word synchronous data A2s contained in the additional word data group DWS in the composite 8-bit word sequence data DZB(8). The synchronous data detection output signal SDB thus obtained from the synchronous data detecting and S/P converting portion 246 is supplied to the word data separating and transmission rate converting portion 247 and the skew absorbing control signal producing portion 249.

In the word data separating and transmission rate converting portion 247, the additional word data group DWS is separated from the composite 8-bit word sequence data DZB(8) with use of the synchronous data detection output signal SDB, and the additional word data group DWS and 8-bit word sequence data DYB(8) each based on the composite 8-bit word sequence data DZB(8) are extracted separately from each other. Then, the word transmission rate of the 8-bit word sequence data DYB(8) is converted from 311.04 MBps to 92.8125 MBps.

The 8-bit word sequence data DYB(8) having the word transmission rate of 92.8125 MBps are supplied from the word data separating and transmission rate converting portion 247 to a 10-bit word sequence data producing portion 248.

In the skew absorbing control signal producing portion 249 to which the synchronous data detection output signal SDA obtained from the synchronous data detecting and S/P converting portion 243 and the synchronous data detection output signal SDB obtained from the synchronous data detecting and S/P converting portion 246 are supplied, a time difference between the optical signals SLA and SLB which results from the fact that the optical signal SLA has the wavelength of about 1.3 $\mu$m and the optical signal SLB has the wavelength of about 1.55 $\mu$m is detected on the strength of a time difference between the synchronous data detection output signals SDA and SDB and skew absorbing control signals SKA and SKB are produced based on the detected time difference between the optical signals SLA and SLB. The skew absorbing control signals SKA and SKB thus produced are supplied to both of the 10-bit word sequence data producing portion 245 and the 10-bit word sequence data producing portion 248.

In the 10-bit word sequence data producing portion 245, the 8-bit word sequence data DYA(8) are converted into word sequence data in which each word is composed of 10 bits with the timing control by the skew absorbing control signals SKA to produce 10-bit word sequence data DXA(10) having the word transmission rate of 185.625×8/10=148.5 MBps. The 10-bit word sequence data DXA(10) obtained from the 10-bit word sequence data producing portion 245 are supplied to a 10B/8B converting portion 250.

In the 10B/8B converting portion 250, the 10-bit word sequence data DXA(10) are subjected to 10B/8B conversion by which every 10 bits constituting each word of the 10-bit word sequence data DXA(10) are converted into 16 bits to produce 16-bit word sequence data DA(16) having the word transmission rate of 148.5 MBps. The 16-bit word sequence data DA(16) are supplied from the 10B/8B converting portion 250 to a bit synthesizing portion 251.

In the 10-bit word sequence data producing portion 248, the 8-bit word sequence data DYB(8) are converted into word sequence data in which each word is composed of 10 bits with the timing control by the skew absorbing control signals SKB to produce 10-bit word sequence data DXB(10) having the word transmission rate of 92.8125×8/10=74.25 MBps. The 10-bit word sequence data DXB(10) obtained from the 10-bit word sequence data producing portion 248 are supplied to a 10B/8B converting portion 252.

In the 10B/8B converting portion 252, the 10-bit word sequence data DXB(10) are subjected to 10B/8B conversion by which every 10 bits constituting each word of the 10-bit word sequence data DXB(10) are converted into 8 bits to produce 8-bit word sequence data DB(8) having the word transmission rate of 74.25 MBps. The 8-bit word sequence data DB(8) are supplied from the 10B/8B converting portion 252 to a bit dividing portion 253.

In the bit dividing portion 253, the 8-bit word sequence data DB(8) are divided into two 4-bit word sequence data DB(4) and DD(8). The 4-bit word sequence data DB(4) are supplied from the bit dividing portion 253 to the bit synthesizing portion 251 and the 4-bit word sequence data DD(4) are derived from the bit dividing portion 253 as reproduced data.

In the bit synthesizing portion 251 to which the 16-bit word sequence data DA(16) from the 10B/8B converting portion 250 and the 4-bit word sequence data DB(4) from the bit dividing portion 253 are supplied, the 4-bit word sequence data DB(4) are added to the 16-bit word sequence data DA(16) to produce 20-bit word sequence data and then the 20-bit word sequence data are divided into two 10-bit word sequence data each having the word transmission rate of 74.25 MBps. These two 10-bit word sequence data are derived from the bit synthesizing portion 251 as a Y data sequence DYV and a $P_B/P_R$ data sequence DCV, respectively.

Consequently, the Y data sequence DYV and the $P_B/P_R$ data sequence DCV which are reproduced without skew resulting from the time difference between the optical signals SLA and SLB are obtained from the bit synthesizing portion 251.

Figure 30:
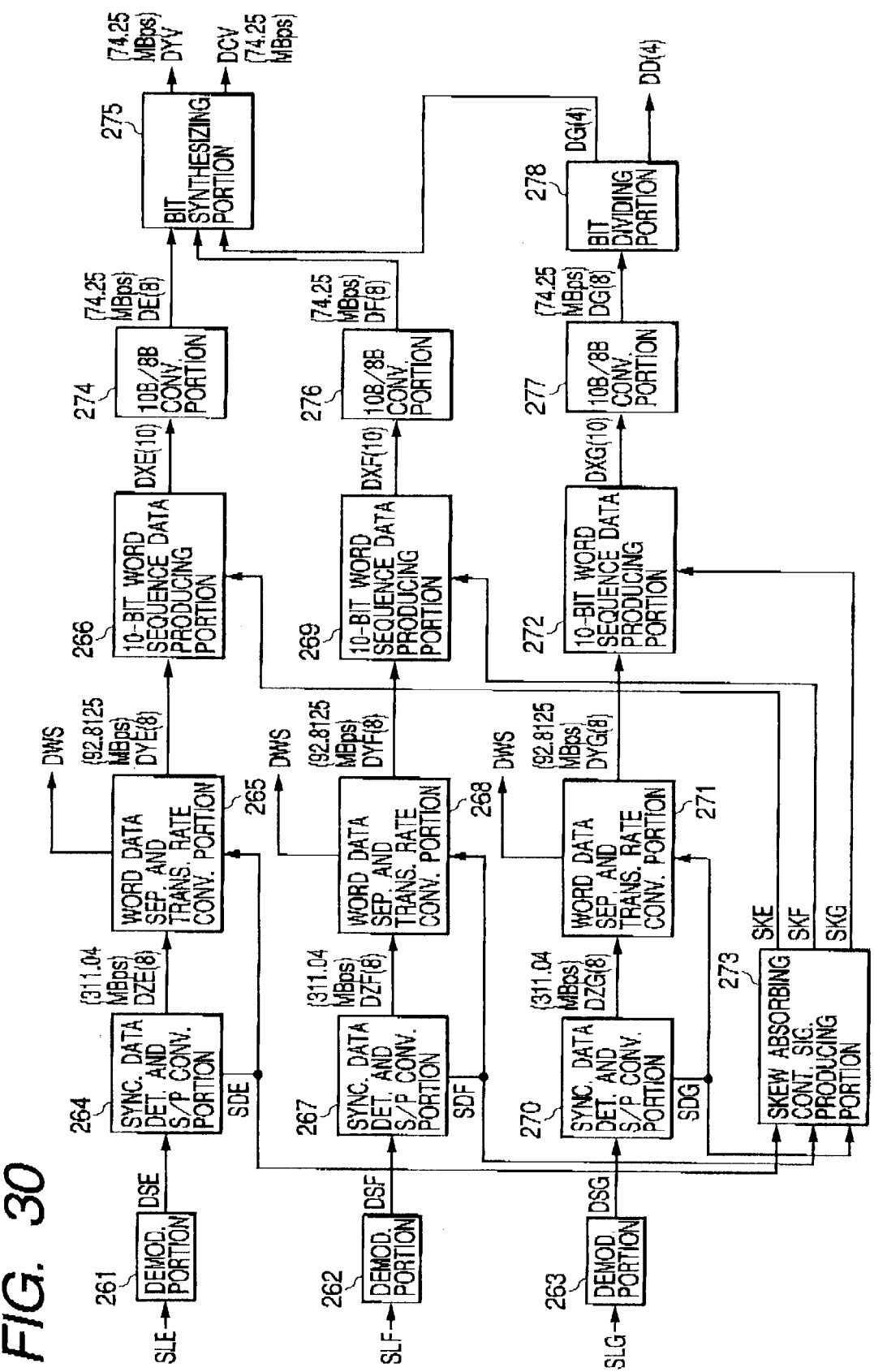
FIG. 30 is a schematic block diagram showing a data receiving apparatus for receiving a signal transmitted from the apparatus shown in FIG. 16.

FIG. 30 shows an example of a data receiving apparatus for receiving optical signals SLE, SLF and SLG transmitted from the fourth embodiment of apparatus for transmitting digital data according to the present invention shown in FIG. 16.

Referring to FIG. 30, the optical signals SLE, SLF and SLG transmitted through the data transmission lines each made of optical fiber are received by a demodulating portion 261, a demodulating portion 262 and a demodulating portion 263, respectively.

In the demodulating portion 261, the optical signal SLE is demodulated to reproduce serial data DSE and the serial data DSE thus reproduced are supplied to a synchronous data detecting and S/P converting portion 264.

In the synchronous data detecting and S/P converting portion 264, a part of the serial data DSE which corresponds to three successive 8-bit word synchronous data A1s and three successive 8-bit word synchronous data A2s are detected as synchronous data and the serial data DSE are subjected to S/P conversion under the word synchronization by the detected synchronous data to produce composite 8-bit word sequence data DZE(8) having the word transmission rate of 311.04 MBps. The composite 8-bit word sequence data DZE(8) obtained from the synchronous data detecting and S/P converting portion 264 are supplied to a word data separating and transmission rate converting portion 265.

Further, in the synchronous data detecting and S/P converting portion 264, the three successive 8-bit word synchronous data A1s and three successive 8-bit word synchronous data A2s contained in additional word data group DWS in the composite 8-bit word sequence data DZE(8) are detected to produce a synchronous data detection output signal SDE. This synchronous data detection output signal SDE is so obtained as to correspond to, for example, the last one of the three successive 8-bit word synchronous data A1s and three successive 8-bit word synchronous data A2s contained in the additional word data group DWS in the composite 8-bit word sequence data DZE(8). The synchronous data detection output signal SDE thus obtained from the synchronous data detecting and S/P converting portion 264 is supplied to the word data separating and transmission rate converting portion 265 and a skew absorbing control signal producing portion 273.

In the word data separating and transmission rate converting portion 265, the additional word data group DWS is separated from the composite 8-bit word sequence data DZE(8) with use of the synchronous data detection output signal SDE, and the additional word data group DWS and 8-bit word sequence data DYE(8) each based on the composite 8-bit word sequence data DZE(8) are extracted separately from each other. Then, the word transmission rate of the 8-bit word sequence data DYE(8) is converted from 311.04 MBps to 92.8125 MBps.

The 8-bit word sequence data DYE(8) having the word transmission rate of 92.8125 MBps are supplied from the word data separating and transmission rate converting portion 265 to a 10-bit word sequence data producing portion 266.

In the demodulating portion 262, the optical signal SLF is demodulated to reproduce serial data DSF and the serial data DSF thus reproduced are supplied to a synchronous data detecting and S/P converting portion 267.

In the synchronous data detecting and S/P converting portion 267, a part of the serial data DSF which corresponds to three successive 8-bit word synchronous data A1s and three successive 8-bit word synchronous data A2s are detected as synchronous data and the serial data DSF are subjected to S/P conversion under the word synchronization by the detected synchronous data to produce composite 8-bit word sequence data DZF(8) having the word transmission rate of 311.04 MBps. The composite 8-bit word sequence data DZF(8) obtained from the synchronous data detecting and S/P converting portion 267 are supplied to a word data separating and transmission rate converting portion 268.

Further, in the synchronous data detecting and S/P converting portion 267, the three successive 8-bit word synchronous data A1s and three successive 8-bit word synchronous data A2s contained in the additional word data group DWS in the composite 8-bit word sequence data DZF(8) are detected to produce a synchronous data detection output signal SDF. This synchronous data detection output signal SDF is so obtained as to correspond to, for example, the last one of the three successive 8-bit word synchronous data A1s and three successive 8-bit word synchronous data A2s contained in the additional word data group DWS in the composite 8-bit word sequence data DZF(8). The synchronous data detection output signal SDF thus obtained from the synchronous data detecting and S/P converting portion 267 is supplied to the word data separating and transmission rate converting portion 268 and the skew absorbing control signal producing portion 273.

In the word data separating and transmission rate converting portion 268, the additional word data group DWS is separated from the composite 8-bit word sequence data DZF(8) with use of the synchronous data detection output signal SDF, and the additional word data group DWS and 8-bit word sequence data DYF(8) each based on the composite 8-bit word sequence data DZF(8) are extracted separately from each other. Then, the word transmission rate of the 8-bit word sequence data DYF(8) is converted from 311.04 MBps to 92.8125 MBps.

The 8-bit word sequence data DYF(8) having the word transmission rate of 92.8125 MBps are supplied from the word data separating and transmission rate converting portion 268 to a 10-bit word sequence data producing portion 269.

In the demodulating portion 263, the optical signal SLG is demodulated to reproduce serial data DSG and the serial data DSG thus reproduced are supplied to a synchronous data detecting and S/P converting portion 270.

In the synchronous data detecting and S/P converting portion 270, a part of the serial data DSG which corresponds to three successive 8-bit word synchronous data A1s and three successive 8-bit word synchronous data A2s are detected as synchronous data and the serial data DSG are subjected to S/P conversion under the word synchronization by the detected synchronous data to produce composite 8-bit word sequence data DZG(8) having the word transmission rate of 311.04 MBps. The composite 8-bit word sequence data DZG(8) obtained from the synchronous data detecting and S/P converting portion 270 are supplied to a word data separating and transmission rate converting portion 271.

Further, in the synchronous data detecting and S/P converting portion 270, the three successive 8-bit word synchronous data A1s and three successive 8-bit word synchronous data A2s contained in the additional word data group DWS in the composite 8-bit word sequence data DZG(8) are detected to produce a synchronous data detection output signal SDG. This synchronous data detection output signal SDG is so obtained as to correspond to, for example, the last one of the three successive 8-bit word synchronous data A1s and three successive 8-bit word synchronous data A2s contained in the additional word data group DWS in the composite 8-bit word sequence data DZG(8). The synchronous data detection output signal SDG thus obtained from the synchronous data detecting and S/P converting portion 270 is supplied to the word data separating and transmission rate converting portion 271 and the skew absorbing control signal producing portion 273.

In the word data separating and transmission rate converting portion 271, the additional word data group DWS is separated from the composite 8-bit word sequence data DZG(8) with use of the synchronous data detection output signal SDG, and the additional word data group DWS and 8-bit word sequence data DYG(8) each based on the composite 8-bit word sequence data DZG(8) are extracted separately from each other. Then, the word transmission rate of the 8-bit word sequence data DYG(8) is converted from 311.04 MBps to 92.8125 MBps.

The 8-bit word sequence data DYG(8) having the word transmission rate of 92.8125 MBps are supplied from the word data separating and transmission rate converting portion 271 to a 10-bit word sequence data producing portion 272.

In the skew absorbing control signal producing portion 273 to which the synchronous data detection output signal SDE obtained from the synchronous data detecting and S/P converting portion 264, the synchronous data detection output signal SDF obtained from the synchronous data detecting and S/P converting portion 267 and the synchronous data detection output signal SDG obtained from the synchronous data detecting and S/P converting portion 270 are supplied, time differences among the optical signals SLE, SLF and SLG which results from differences among the wavelength of the optical signal SLE, the wavelength of the optical signal SLF and the wavelength of the optical signal SLG or differences in length of the optical fibers through which the optical signals SLE, SLF and SLG are transmitted, respectively, are detected on the strength of time differences among the synchronous data detection output signals SDE, SDF and SDG and skew absorbing control signals SKE, SKF and SKG are produced based on the detected time differences among the optical signals SLE, SLF and SLG. The skew absorbing control signals SKE, SKF and SKG thus produced are supplied to the 10-bit word sequence data producing portions 266, 269 and 272, respectively.

In the 10-bit word sequence data producing portion 266, the 8-bit word sequence data DYE(8) are converted into word sequence data in which each word is composed of 10 bits with the timing control by the skew absorbing control signal SKE to produce 10-bit word sequence data DXE(10) having the word transmission rate of 92.8125×8/10=74.25 MBps. The 10-bit word sequence data DXE(10) obtained from the 10-bit word sequence data producing portion 266 are supplied to a 10B/8B converting portion 274.

In the 10B/8B converting portion 274, the 10-bit word sequence data DXE(10) are subjected to 10B/8B conversion by which every 10 bits constituting each word of the 10-bit word sequence data DXE(10) are converted into 8 bits to produce 8-bit word sequence data DE(8) having the word transmission rate of 74.25 MBps. The 8-bit word sequence data DE(8) are supplied from the 10B/8B converting portion 274 to a bit synthesizing portion 275.

In the 10-bit word sequence data producing portion 269, the 8-bit word sequence data DYF(8) are converted into word sequence data in which each word is composed of 10 bits with the timing control by the skew absorbing control signal SKF to produce 10-bit word sequence data DXF(10) having the word transmission rate of 92.8125×8/10=74.25 MBps. The 10-bit word sequence data DXF(10) obtained from the 10-bit word sequence data producing portion 269 are supplied to a 10B/8B converting portion 276.

In the 10B/8B converting portion 276, the 10-bit word sequence data DXF(10) are subjected to 10B/8B conversion by which every 10 bits constituting each word of the 10-bit word sequence data DXF(10) are converted into 8 bits to produce 8-bit word sequence data DF(8) having the word transmission rate of 74.25 MBps. The 8-bit word sequence data DF(8) are supplied from the 10B/8B converting portion 276 to the bit dividing portion 275.

In the 10-bit word sequence data producing portion 272, the 8-bit word sequence data DYG(8) are converted into word sequence data in which each word is composed of 10 bits with the timing control by the skew absorbing control signal SKG to produce 10-bit word sequence data DXG(10) having the word transmission rate of 92.8125×8/10=74.25 MBps. The 10-bit word sequence data DXG(10) obtained from the 10-bit word sequence data producing portion 272 are supplied to a 10B/8B converting portion 277.

In the 10B/8B converting portion 277, the 10-bit word sequence data DXG(10) are subjected to 10B/8B conversion by which every 10 bits constituting each word of the 10-bit word sequence data DXG(10) are converted into 8 bits to produce 8-bit word sequence data DG(8) having the word transmission rate of 74.25 MBps. The 8-bit word sequence data DG(8) are supplied from the 10B/8B converting portion 277 to a bit dividing portion 278.

In the bit dividing portion 278, the 8-bit word sequence data DG(8) are divided into two 4-bit word sequence data DG(4) and DD(8). The 4-bit word sequence data DG(4) are supplied from the bit dividing portion 278 to the bit synthesizing portion 275 and the 4-bit word sequence data DD(4) are derived from the bit dividing portion 278 as reproduced data.

In the bit synthesizing portion 275, to which the 8-bit word sequence data DE(8) from the 10B/8B converting portion 274, the 8-bit word sequence data DF(8) from the 10B/8B converting portion 276 and the 4-bit word sequence data DG(4) from the bit dividing portion 278 are supplied, the 8-bit word sequence data DE(8), the 8-bit word sequence data DF(8) and the 4-bit word sequence data DG(4) are added to each other to produce 20-bit word sequence data and then the 20-bit word sequence data are divided into two 10-bit word sequence data each having the word transmission rate of 74.25 MBps. These two 10-bit word sequence data are derived from the bit synthesizing portion 275 as a Y data sequence DYV and a $P_B/P_R$ data sequence DCV, respectively.

Consequently, the Y data sequence DYV and the $P_B/P_R$ data sequence DCV which are reproduced without skew resulting from the time differences among the optical signals SLE, SLF and SLG are obtained from the bit synthesizing portion 275.

Figure 31:
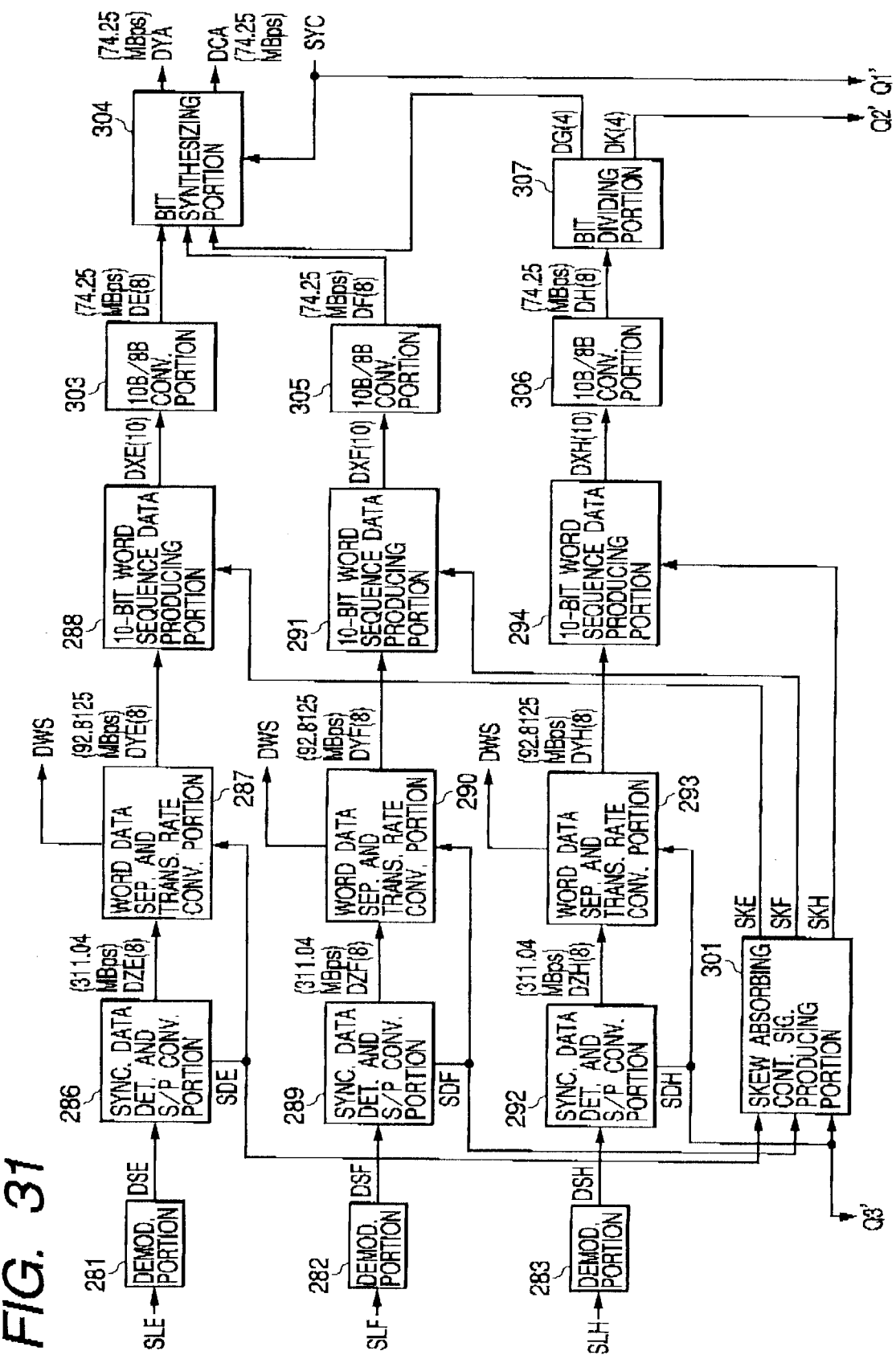
FIG. 31 is a schematic block diagram showing a part of data receiving apparatus for receiving a signal transmitted from the apparatus shown in FIGS. 17 and 18.
Figure 32:
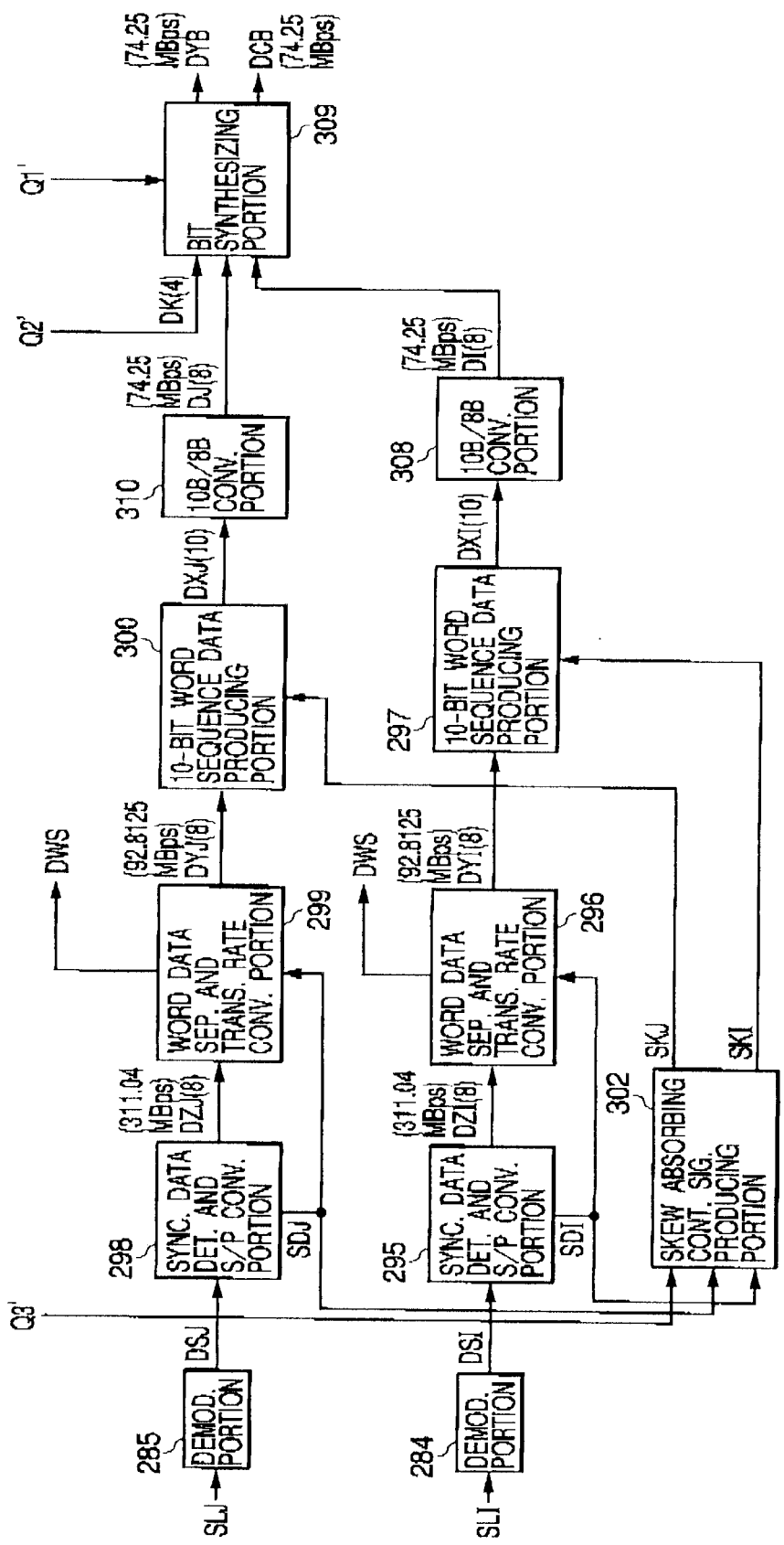
FIG. 32 is a schematic block diagram showing another part of the data receiving apparatus shown in FIG. 31.

FIGS. 31 and 32 show an example of a data receiving apparatus for receiving optical signals SLE, SLF, SLH, SLI and SLJ transmitted from the fifth embodiment of apparatus for transmitting digital data according to the present invention shown in FIGS. 17 and 18.

Referring to FIGS. 31 and 32, the optical signals SLE, SLF, SLH, SLI and SLJ transmitted through the data transmission lines each made of optical fiber are received by a demodulating portion 281, a demodulating portion 282, a demodulating portion 283, a demodulating portion 284 and a demodulating portion 285, respectively.

In the demodulating portion 281, the optical signal SLE is demodulated to reproduce serial data DSE and the serial data DSE thus reproduced are supplied to a synchronous data detecting and S/P converting portion 286.

In the synchronous data detecting and S/P converting portion 286, a part of the serial data DSE which corresponds to three successive 8-bit word synchronous data A1s and three successive 8-bit word synchronous data A2s are detected as synchronous data and the serial data DSE are subjected to S/P conversion under the word synchronization by the detected synchronous data to produce composite 8-bit word sequence data DZE(8) having the word transmission rate of 311.04 MBps. The composite 8-bit word sequence data DZE(8) obtained from the synchronous data detecting and S/P converting portion 286 are supplied to a word data separating and transmission rate converting portion 287.

Further, in the synchronous data detecting and S/P converting portion 286, the three successive 8-bit word synchronous data A1s and three successive 8-bit word synchronous data A2s contained in additional word data group DWS in the composite 8-bit word sequence data DZE(8) are detected to produce a synchronous data detection output signal SDE. This synchronous data detection output signal SDE is so obtained as to correspond to, for example, the last one of the three successive 8-bit word synchronous data A1s and three successive 8-bit word synchronous data A2s contained in the additional word data group DWS in the composite 8-bit word sequence data DZE(8). The synchronous data detection output signal SDE thus obtained from the synchronous data detecting and S/P converting portion 286 is supplied to the word data separating and transmission rate converting portion 287 and a skew absorbing control signal producing portion 301.

In the word data separating and transmission rate converting portion 287, the additional word data group DWS is separated from the composite 8-bit word sequence data DZE(8) with use of the synchronous data detection output signal SDE, and the additional word data group DWS and 8-bit word sequence data DYE(8) each based on the composite 8-bit word sequence data DZE(8) are extracted separately from each other. Then, the word transmission rate of the 8-bit word sequence data DYE(8) is converted from 311.04 MBps to 92.8125 MBps.

The 8-bit word sequence data DYE(8) having the word transmission rate of 92.8125 MBps are supplied from the word data separating and transmission rate converting portion 287 to a 10-bit word sequence data producing portion 288.

In the demodulating portion 282, the optical signal SLF is demodulated to reproduce serial data DSF and the serial data DSF thus reproduced are supplied to a synchronous data detecting and S/P converting portion 289.

In the synchronous data detecting and S/P converting portion 289, a part of the serial data DSF which corresponds to three successive 8-bit word synchronous data A1s and three successive 8-bit word synchronous data A2s are detected as synchronous data and the serial data DSF are subjected to S/P conversion under the word synchronization by the detected synchronous data to produce composite 8-bit word sequence data DZF(8) having the word transmission rate of 311.04 MBps. The composite 8-bit word sequence data DZF(8) obtained from the synchronous data detecting and S/P converting portion 289 are supplied to a word data separating and transmission rate converting portion 290.

Further, in the synchronous data detecting and S/P converting portion 289, the three successive 8-bit word synchronous data A1s and three successive 8-bit word synchronous data A2s contained in the additional word data group DWS in the composite 8-bit word sequence data DZF(8) are detected to produce a synchronous data detection output signal SDF. This synchronous data detection output signal SDF is so obtained as to correspond to, for example, the last one of the three successive 8-bit word synchronous data A1s and three successive 8-bit word synchronous data A2s contained in the additional word data group DWS in the composite 8-bit word sequence data DZF(8). The synchronous data detection output signal SDF thus obtained from the synchronous data detecting and S/P converting portion 289 is supplied to the word data separating and transmission rate converting portion 290 and the skew absorbing control signal producing portion 301.

In the word data separating and transmission rate converting portion 290, the additional word data group DWS is separated from the composite 8-bit word sequence data DZF(8) with use of the synchronous data detection output signal SDF, and the additional word data group DWS and 8-bit word sequence data DYF(8) each based on the composite 8-bit word sequence data DZF(8) are extracted separately from each other. Then, the word transmission rate of the 8-bit word sequence data DYF(8) is converted from 311.04 MBps to 92.8125 MBps.

The 8-bit word sequence data DYF(8) having the word transmission rate of 92.8125 MBps are supplied from the word data separating and transmission rate converting portion 290 to a 10-bit word sequence data producing portion 291.

In the demodulating portion 283, the optical signal SLH is demodulated to reproduce serial data DSH and the serial data DSH thus reproduced are supplied to a synchronous data detecting and S/P converting portion 292.

In the synchronous data detecting and S/P converting portion 292, a part of the serial data DSH which corresponds to three successive 8-bit word synchronous data A1s and three successive 8-bit word synchronous data A2s are detected as synchronous data and the serial data DSH are subjected to S/P conversion under the word synchronization by the detected synchronous data to produce composite 8-bit word sequence data DZH(8) having the word transmission rate of 311.04 MBps. The composite 8-bit word sequence data DZH(8) obtained from the synchronous data detecting and S/P converting portion 292 are supplied to a word data separating and transmission rate converting portion 293.

Further, in the synchronous data detecting and S/P converting portion 292, the three successive 8-bit word synchronous data A1s and three successive 8-bit word synchronous data A2s contained in the additional word data group DWS in the composite 8-bit word sequence data DZH(8) are detected to produce a synchronous data detection output signal SDH. This synchronous data detection output signal SDH is so obtained as to correspond to, for example, the last one of the three successive 8-bit word synchronous data A1s and three successive 8-bit word synchronous data A2s contained in the additional word data group DWS in the composite 8-bit word sequence data DZH(8). The synchronous data detection output signal SDH thus obtained from the synchronous data detecting and S/P converting portion 292 is supplied to the word data separating and transmission rate converting portion 293, the skew absorbing control signal producing portion 301 and a skew absorbing control signal producing portion 302.

In the word data separating and transmission rate converting portion 293, the additional word data group DWS is separated from the composite 8-bit word sequence data DZH(8) with use of the synchronous data detection output signal SDH, and the additional word data group DWS and 8-bit word sequence data DYH(8) each based on the composite 8-bit word sequence data DZH(8) are extracted separately from each other. Then, the word transmission rate of the 8-bit word sequence data DYH(8) is converted from 311.04 MBps to 92.8125 MBps.

The 8-bit word sequence data DYH(8) having the word transmission rate of 92.8125 MBps are supplied from the word data separating and transmission rate converting portion 293 to a 10-bit word sequence data producing portion 294.

In the demodulating portion 284, the optical signal SLI is demodulated to reproduce serial data DSI and the serial data DSI thus reproduced are supplied to a synchronous data detecting and S/P converting portion 295.

In the synchronous data detecting and S/P converting portion 295, a part of the serial data DSI which corresponds to three successive 8-bit word synchronous data A1s and three successive 8-bit word synchronous data A2s are detected as synchronous data and the serial data DSI are subjected to S/P conversion under the word synchronization by the detected synchronous data to produce composite 8-bit word sequence data DZI(8) having the word transmission rate of 311.04 MBps. The composite 8-bit word sequence data DZI(8) obtained from the synchronous data detecting and S/P converting portion 295 are supplied to a word data separating and transmission rate converting portion 296.

Further, in the synchronous data detecting and S/P converting portion 295, the three successive 8-bit word synchronous data A1s and three successive 8-bit word synchronous data A2s contained in the additional word data group DWS in the composite 8-bit word sequence data DZI(8) are detected to produce a synchronous data detection output signal SDI. This synchronous data detection output signal SDI is so obtained as to correspond to, for example, the last one of the three successive 8-bit word synchronous data A1s and three successive 8-bit word synchronous data A2s contained in the additional word data group DWS in the composite 8-bit word sequence data DZI(8). The synchronous data detection output signal SDI thus obtained from the synchronous data detecting and S/P converting portion 295 is supplied to the word data separating and transmission rate converting portion 296 and the skew absorbing control signal producing portion 302.

In the word data separating and transmission rate converting portion 296, the additional word data group DWS is separated from the composite 8-bit word sequence data DZI(8) with use of the synchronous data detection output signal SDI, and the additional word data group DWS and 8-bit word sequence data DYI(8) each based on the composite 8-bit word sequence data DZI(8) are extracted separately from each other. Then, the word transmission rate of the 8-bit word sequence data DYI(8) is converted from 311.04 MBps to 92.8125 MBps.

The 8-bit word sequence data DYI(8) having the word transmission rate of 92.8125 MBps are supplied from the word data separating and transmission rate converting portion 296 to a 10-bit word sequence data producing portion 297.

In the demodulating portion 285, the optical signal SLJ is demodulated to reproduce serial data DSJ and the serial data DSJ thus reproduced are supplied to a synchronous data detecting and S/P converting portion 298.

In the synchronous data detecting and S/P converting portion 298, a part of the serial data DSJ which corresponds to three successive 8-bit word synchronous data A1s and three successive 8-bit word synchronous data A2s are detected as synchronous data and the serial data DSJ are subjected to S/P conversion under the word synchronization by the detected synchronous data to produce composite 8-bit word sequence data DZJ(8) having the word transmission rate of 311.04 MBps. The composite 8-bit word sequence data DZJ(8) obtained from the synchronous data detecting and S/P converting portion 298 are supplied to a word data separating and transmission rate converting portion 299.

Further, in the synchronous data detecting and S/P converting portion 298, the three successive 8-bit word synchronous data A1s and three successive 8-bit word synchronous data A2s contained in the additional word data group DWS in the composite 8-bit word sequence data DZJ(8) are detected to produce a synchronous data detection output signal SDJ. This synchronous data detection output signal SDJ is so obtained as to correspond to, for example, the last one of the three successive 8-bit word synchronous data A1s and three successive 8-bit word synchronous data A2s contained in the additional word data group DWS in the composite 8-bit word sequence data DZJ(8). The synchronous data detection output signal SDJ thus obtained from the synchronous data detecting and S/P converting portion 298 is supplied to the word data separating and transmission rate converting portion 299 and the skew absorbing control signal producing portion 302.

In the word data separating and transmission rate converting portion 299, the additional word data group DWS is separated from the composite 8-bit word sequence data DZJ(8) with use of the synchronous data detection output signal SDJ, and the additional word data group DWS and 8-bit word sequence data DYJ(8) each based on the composite 8-bit word sequence data DZJ(8) are extracted separately from each other. Then, the word transmission rate of the 8-bit word sequence data DYJ(8) is converted from 311.04 MBps to 92.8125 MBps.

The 8-bit word sequence data DYJ(8) having the word transmission rate of 92.8125 MBps are supplied from the word data separating and transmission rate converting portion 299 to a 10-bit word sequence data producing portion 300.

In the skew absorbing control signal producing portion 301 to which the synchronous data detection output signal SDE obtained from the synchronous data detecting and S/P converting portion 286, the synchronous data detection output signal SDF obtained from the synchronous data detecting and S/P converting portion 289 and the synchronous data detection output signal SDH obtained from the synchronous data detecting and S/P converting portion 292 are supplied, time differences among the optical signals SLE, SLF and SLH which results from differences among the wavelength of the optical signal SLE, the wavelength of the optical signal SLF and the wavelength of the optical signal SLH or differences in length of the optical fibers through which the optical signals SLE, SLF and SLH are transmitted, respectively, are detected on the strength of time differences among the synchronous data detection output signals SDE, SDF and SDH and skew absorbing control signals SKE, SKF and SKH are produced based on the detected time differences among the optical signals SLE, SLF and SLH. The skew absorbing control signals SKF, SKF and SKH thus produced are supplied to the 10-bit word sequence data producing portions 288, 291 and 294, respectively.

Further, in the skew absorbing control signal producing portion 302 to which the synchronous data detection output signal SDH obtained from the synchronous data detecting and S/P converting portion 292, the synchronous data detection output signal SDI obtained from the synchronous data detecting and S/P converting portion 295 and the synchronous data detection output signal SDJ obtained from the synchronous data detecting and S/P converting portion 298 are supplied, time differences among the optical signals SLH, SLI and SLJ which results from differences among the wavelength of the optical signal SLH, the wavelength of the optical signal SLI and the wavelength of the optical signal SLJ or differences in length of the optical fibers through which the optical signals SLH, SLI and SLJ are transmitted, respectively, are detected on the strength of time differences among the synchronous data detection output signals SDH, SDI and SDJ and skew absorbing control signals SKI and SKJ are produced based on the detected time differences among the optical signals SLH, SLI and SLJ. The skew absorbing control signals SKI and SKJ thus produced are supplied to the 10-bit word sequence data producing portions 297 and 300, respectively.

In the 10-bit word sequence data producing portion 288, the 8-bit word sequence data DYE(8) are converted into word sequence data in which each word is composed of 10 bits with the timing control by the skew absorbing control signal SKE to produce 10-bit word sequence data DXE(10) having the word transmission rate of 92.8125×8/10=74.25 MBps. The 10-bit word sequence data DXE(10) obtained from the 10-bit word sequence data producing portion 288 are supplied to a 10B/8B converting portion 303.

In the 10B/8B converting portion 303, the 10-bit word sequence data DXE(10) are subjected to 10B/8B conversion by which every 10 bits constituting each word of the 10-bit word sequence data DXE(10) are converted into 8 bits to produce 8-bit word sequence data DE(8) having the word transmission rate of 74.25 MBps. The 8-bit word sequence data DE(8) are supplied from the 10B/8B converting portion 303 to a bit synthesizing portion 304.

In the 10-bit word sequence data producing portion 291, the 8-bit word sequence data DYF(8) are converted into word sequence data in which each word is composed of 10 bits with the timing control by the skew absorbing control signal SKF to produce 10-bit word sequence data DXF(10) having the word transmission rate of 92.8125×8/10=74.25 MBps. The 10-bit word sequence data DXF(10) obtained from the 10-bit word sequence data producing portion 291 are supplied to a 10B/8B converting portion 305.

In the 10B/8B converting portion 305, the 10-bit word sequence data DXF(10) are subjected to 10B/8B conversion by which every 10 bits constituting each word of the 10-bit word sequence data DXF(10) are converted into 8 bits to produce 8-bit word sequence data DF(8) having the word transmission rate of 74.25 MBps. The 8-bit word sequence data DF(8) are supplied from the 10B/8B converting portion 305 to the bit synthesizing portion 304.

In the 10-bit word sequence data producing portion 294, the 8-bit word sequence data DYH(8) are converted into word sequence data in which each word is composed of 10 bits with the timing control by the skew absorbing control signal SKH to produce 10-bit word sequence data DXH(10) having the word transmission rate of 92.8125×8/10=74.25 MBps. The 10-bit word sequence data DXH(10) obtained from the 10-bit word sequence data producing portion 294 are supplied to a 10B/8B converting portion 306.

In the 10B/8B converting portion 306, the 10-bit word sequence data DXH(10) are subjected to 10B/8B conversion by which every 10 bits constituting each word of the 10-bit word sequence data DXH(10) are converted into 8 bits to produce 8-bit word sequence data DH(8) having the word transmission rate of 74.25 MBps. The 8-bit word sequence data DH(8) are supplied from the 10B/8B converting portion 306 to a bit dividing portion 307.

In the bit dividing portion 307, the 8-bit word sequence data DH(8) are divided into two 4-bit word sequence data DG(4) and DK(4). The 4-bit word sequence data DG(4) are supplied from the bit dividing portion 307 to the bit synthesizing portion 304 and the 4-bit word sequence data DK(4) are supplied from the bit dividing portion 307 to a bit synthesizing portion 309.

In the 10-bit word sequence data producing portion 297, the 8-bit word sequence data DYI(8) are converted into word sequence data in which each word is composed of 10 bits with the timing control by the skew absorbing control signal SKI to produce 10-bit word sequence data DXI(10) having the word transmission rate of 92.8125×8/10=74.25 MBps. The 10-bit word sequence data DXI(10) obtained from the 10-bit word sequence data producing portion 297 are supplied to a 10B/8B converting portion 308.

In the 10B/8B converting portion 308, the 10-bit word sequence data DXI(10) are subjected to 10B/8B conversion by which every 10 bits constituting each word of the 10-bit word sequence data DXI(10) are converted into 8 bits to produce 8-bit word sequence data DI(8) having the word transmission rate of 74.25 MBps. The 8-bit word sequence data DI(8) are supplied from the 10B/8B converting portion 308 to the bit synthesizing portion 309.

In the 10-bit word sequence data producing portion 300, the 8-bit word sequence data DYJ(8) are converted into word sequence data in which each word is composed of 10 bits with the timing control by the skew absorbing control signal SKJ to produce 10-bit word sequence data DXJ(10)

having the word transmission rate of 92.8125×8/10=74.25 MBps. The 10-bit word sequence data DXJ(10) obtained from the 10-bit word sequence data producing portion 300 are supplied to a 10B/8B converting portion 310.

In the 10B/8B converting portion 310, the 10-bit word sequence data DXJ(10) are subjected to 10B/8B conversion by which every 10 bits constituting each word of the 10-bit word sequence data DXJ(10) are converted into 8 bits to produce 8-bit word sequence data DJ(8) having the word transmission rate of 74.25 MBps. The 8-bit word sequence data DJ(8) are supplied from the 10B/8B converting portion 310 to the bit synthesizing portion 309.

A common synchronous signal SYC is supplied to both of the bit synthesizing portions 304 and 309. The bit synthesizing portions 304 and 309 are so controlled by the common synchronous signal SYC as to be synchronized in operation with each other.

In the bit synthesizing portion 304, to which the 8-bit word sequence data DE(8) from the 10B/8B converting portion 303, the 8-bit word sequence data DF(8) from the 10B/8B converting portion 305 and the 4-bit word sequence data DG(4) from the bit dividing portion 307 are supplied, the 8-bit word sequence data DE(8), the 8-bit word sequence data DF(8) and the 4-bit word sequence data DG(4) are added to each other to produce 20-bit word sequence data and then the 20-bit word sequence data are divided into two 10-bit word sequence data each having the word transmission rate of 74.25 MBps. These two 10-bit word sequence data are derived from the bit synthesizing portion 304 as a Y data sequence DYA and a $P_B/P_R$ data sequence DCA, respectively.

Further, in the bit synthesizing portion 309, to which the 8-bit word sequence data DI(8) from the 10B/8B converting portion 308, the 8-bit word sequence data DJ(8) from the 10B/8B converting portion 310 and the 4-bit word sequence data DK(4) from the bit dividing portion 307 are supplied, the 8-bit word sequence data DI(8), the 8-bit word sequence data DJ(8) and the 4-bit word sequence data DK(4) are added to each other to produce 20-bit word sequence data and then the 20-bit word sequence data are divided into two 10-bit word sequence data each having the word transmission rate of 74.25 MBps. These two 10-bit word sequence data are derived from the bit synthesizing portion 309 as a Y data sequence DYB and a $P_B/P_R$ data sequence DCB, respectively.

Consequently, the Y data sequence DYA and the $P_B/P_R$ data sequence DCA which are reproduced without skew resulting from the time differences among the optical signals SLE, SLF and SLH are obtained from the bit synthesizing portion 304 and the Y data sequence DYB and the $P_B/P_R$ data sequence DCB which are reproduced without skew resulting from the time differences among the optical signals SLH, SLI and SLJ are obtained from the bit synthesizing portion 309.

FIG. 33 shows an example of a data receiving apparatus for receiving optical signals SLY and SLC transmitted from the sixth embodiment of apparatus for transmitting digital data according to the present invention shown in FIG. 19.

Referring to FIG. 33, the optical signals SLY and SLC transmitted through the data transmission lines each made of optical fiber are received by a demodulating portion 321 and a demodulating portion 322, respectively.

In the demodulating portion 321, the optical signal SLY is demodulated to reproduce serial data DSY and the serial data DSY thus reproduced are supplied to a synchronous data detecting and S/P converting portion 323.

In the synchronous data detecting and S/P converting portion 323, a part of the serial data DSY which corresponds to three successive 8-bit word synchronous data A1s and three successive 8-bit word synchronous data A2s are detected as synchronous data and the serial data DSY are subjected to S/P conversion under the word synchronization by the detected synchronous data to produce composite 8-bit word sequence data DZY(8) having the word transmission rate of 311.04 MBps. The composite 8-bit word sequence data DZY(8) obtained from the synchronous data detecting and S/P converting portion 323 are supplied to a synchronous data separating portion 324.

Further, in the synchronous data detecting and S/P converting portion 323, the three successive 8-bit word synchronous data A1s and three successive 8-bit word synchronous data A2s contained in additional word data group DWS in the composite 8-bit word sequence data DZY(8) are detected to produce a synchronous data detection output signal SDY. This synchronous data detection output signal SDY is so obtained as to correspond to, for example, the last one of the three successive 8-bit word synchronous data A1s and three successive 8-bit word synchronous data A2s contained in the additional word data group DWS in the composite 8-bit word sequence data DZY(8). The synchronous data detection output signal SDY thus obtained from the synchronous data detecting and S/P converting portion 323 is supplied to the synchronous data separating portion 324, an information data separating and transmission rate converting portion 325 and a skew absorbing control signal producing portion 331.

In the synchronous data separating portion 324, the additional word data group DWS is separated from the composite 8-bit word sequence data DZY(8) with use of the synchronous data detection output signal SDY, and the additional word data group DWS and 8-bit word sequence data DYYD(8) each based on the composite 8-bit word sequence data DZY(8) are extracted separately from each other. Then, the 8-bit word sequence data DYYD(8) is supplied to the information data separating and transmission rate converting portion 325.

In the information data separating and transmission rate converting portion 325, a digital audio signal DA or a digital ancillary data DU which represents information data is separated from the 8-bit word sequence data DYYD(8) with use of the synchronous data detection output signal SDY, and the digital audio signal DA or the digital ancillary data DU and 8-bit word sequence data DYY(8) each based on the composite 8-bit word sequence data DYYD(8) are extracted separately from each other. Then, the word transmission rate of the 8-bit word sequence data DYY(8) is converted from 311.04 MBps to 116.02 MBps.

The 8-bit word sequence data DYY(8) having the word transmission rate of 116.02 MBps are supplied from the information data separating and transmission rate converting portion 325 to a 10-bit word sequence data producing portion 326.

In the demodulating portion 322, the optical signal SLC is demodulated to reproduce serial data DSC and the serial data DSC thus reproduced are supplied to a synchronous data detecting and S/P converting portion 327.

In the synchronous data detecting and S/P converting portion 327, a part of the serial data DSC which corresponds to three successive 8-bit word synchronous data A1s and three successive 8-bit word synchronous data A2s are detected as synchronous data and the serial data DSC are subjected to S/P conversion under the word synchronization by the detected synchronous data to produce composite 8-bit word sequence data DZC(8) having the word transmission rate of 311.04 MBps. The composite 8-bit word sequence data DZC(8) obtained from the synchronous data detecting and S/P converting portion 327 are supplied to a synchronous data separating portion 328.

Further, in the synchronous data detecting and S/P converting portion 327, the three successive 8-bit word synchronous data A1s and three successive 8-bit word synchronous data A2s contained in the additional word data group DWS in the composite 8-bit word sequence data DZC(8) are detected to produce a synchronous data detection output signal SDC. This synchronous data detection output signal SDC is so obtained as to correspond to, for example, the last one of the three successive 8-bit word synchronous data A1s and three successive 8-bit word synchronous data A2s contained in the additional word data group DWS in the composite 8-bit word sequence data DZC(8). The synchronous data detection output signal SDC thus obtained from the synchronous data detecting and S/P converting portion 327 is supplied to the synchronous data separating portion 328, an information data separating and transmission rate converting portion 329 and the skew absorbing control signal producing portion 331.

In the synchronous data separating portion 328, the additional word data group DWS is separated from the composite 8-bit word sequence data DZC(8) with use of the synchronous data detection output signal SDC, and the additional word data group DWS and 8-bit word sequence data DYCD(8) each based on the composite 8-bit word sequence data DZC(8) are extracted separately from each other. Then, the 8-bit word sequence data DYCD(8) is supplied to the information data separating and transmission rate converting portion 329.

In the information data separating and transmission rate converting portion 329, the digital audio signal DA or the digital ancillary data DU which represents information data is separated from the 8-bit word sequence data DYCD(8) with use of the synchronous data detection output signal SDC, and the digital audio signal DA or the digital ancillary data DU and 8-bit word sequence data DYC(8) each based on the composite 8-bit word sequence data DYCD(8) are extracted separately from each other. Then, the word transmission rate of the 8-bit word sequence data DYC(8) is converted from 311.04 MBps to 116.02 MBps.

The 8-bit word sequence data DYC(8) having the word transmission rate of 116.02 MBps are supplied from the information data separating and transmission rate converting portion 329 to a 10-bit word sequence data producing portion 330.

In the skew absorbing control signal producing portion 331 to which the synchronous data detection output signal SDY obtained from the synchronous data detecting and S/P converting portion 323 and the synchronous data detection output signal SDC obtained from the synchronous data detecting and S/P converting portion 327 are supplied, a time difference between the optical signals SLY and SLC which results from a difference between the wavelength of the optical signal SLY and the wavelength of the optical signal SLC or a difference in length of the optical fibers through which the optical signals SLY and SLC are transmitted, respectively, is detected on the strength of a time difference between the synchronous data detection output signals SDY and SDC and skew absorbing control signals SKY and SKC are produced based on the detected time difference between the optical signals SLY and SLC.

The skew absorbing control signals SKY and SKC thus produced are supplied to both of the 10-bit word sequence data producing portion 326 and the 10-bit word sequence data producing portion 330.

In the 10-bit word sequence data producing portion 326, the 8-bit word sequence data DYY(8) are converted into word sequence data in which each word is composed of 10 bits with the timing control by the skew absorbing control signal SKY to produce 10-bit word sequence data DXY(10) having the word transmission rate of 116.025×8/10=92.8125 MBps. The 10-bit word sequence data DXY(10) obtained from the 10-bit word sequence data producing portion 326 are supplied to a 10B/8B converting portion 332.

In the 10B/8B converting portion 332, the 10-bit word sequence data DXY(10) are subjected to 10B/8B conversion by which every 10 bits constituting each word of the 10-bit word sequence data DXY(10) are converted into 8 bits to produce 8-bit word sequence data DXY(8) having the word transmission rate of 92.8125 MBps. The 8-bit word sequence data DXY(8) are supplied from the 10B/8B converting portion 332 to a 10-bit word sequence data producing portion 333.

In the 10-bit word sequence data producing portion 333, the 8-bit word sequence data DXY(8) are converted into word sequence in which each word is composed of 10 bits to produce a 10-bit word sequence data having the word transmission rate of 92.8125×8/10=74.25 MBps. This 10-bit word sequence data are derived from the 10-bit word sequence data producing portion 333 as a Y data sequence DYV.

In the 10-bit word sequence data producing portion 330, the 8-bit word sequence data DYC(8) are converted into word sequence data in which each word is composed of 10 bits with the timing control by the skew absorbing control signal SKC to produce 10-bit word sequence data DXC(10) having the word transmission rate of 116.025×8/10=92.8125 MBps. The 10-bit word sequence data DXC(10) obtained from the 10-bit word sequence data producing portion 330 are supplied to a 10B/8B converting portion 334.

In the 10B/8B converting portion 334, the 10-bit word sequence data DXC(10) are subjected to 10B/8B conversion by which every 10 bits constituting each word of the 10-bit word sequence data DXC(10) are converted into 8 bits to produce 8-bit word sequence data DXC(8) having the word transmission rate of 92.8125 MBps. The 8-bit word sequence data DXC(8) are supplied from the 10B/8B converting portion 334 to a 10-bit word sequence data producing portion 335.

In the 10-bit word sequence data producing portion 335, the 8-bit word sequence data DXC(8) are converted into word sequence in which each word is composed of 10 bits to produce a 10-bit word sequence data having the word transmission rate of 92.8125×8/10=74.25 MBps. This 10-bit word sequence data are derived from the 10-bit word sequence data producing portion 335 as a $P_B/P_R$ data sequence DCV.

Consequently, the Y data sequence DYV and the $P_B/P_R$ data sequence DCV which are reproduced without skew resulting from the time difference between the optical signals SLY and SLC are obtained from the 10-bit word sequence data producing portions 333 and 335, respectively.

What is claimed is:

1. A method of transmitting digital data, which comprises the steps of;

obtaining first and second 8-bit word sequence data based on first and second digital image information data, respectively, causing each of the first and second 8-bit word sequence data to be subjected to 8 bits to 10 bits conversion to produce first and second 10-bit word sequence data, obtaining third and fourth 8-bit word sequence data based on the first and second 10-bit word sequence data, respectively, inserting an additional word data group including 8-bit word synchronous data allotted a predetermined specific code into each of the third and fourth 8-bit word sequence data at predetermined word intervals to produce first and second composite 8-bit word sequence data, converting the first and second composite 8-bit word sequence data into first and second serial data, respectively, and transmitting the first and second serial data through first and second transmission lines.

2. A method according to claim 1 further comprising the step of inserting ancillary data into each of said third and fourth 8-bit word sequence data prior to the insertion of said additional word data group.

3. A method according to claim 1 further comprising the step of converting the word transmission rate of each of said third and fourth 8-bit word sequence data prior to the insertion of said additional word data group.

4. A method according to claim 1, wherein said additional word data group is selected to have a portion thereof including a plurality of the same 8-bit word synchronous data.

5. A method according to claim 4, wherein said additional word data group is selected to have a portion thereof including a plurality of first 8-bit word synchronous data and another portion thereof including a plurality of second 8-bit word synchronous data different from the first 8-bit word synchronous data.

6. A method according to claim 1, wherein the transmittal of each of the first and second serial data is carried out by obtaining first and second optical signals based on the first and second serial data and transmitting the first and second optical signals through optical transmission lines.

7. A method according to claim 6, wherein the first and second optical signals are different in wavelength from each other and synthesized with each other prior to the transmittal thereof.

8. A method according to claim 1, wherein said first and second digital image information data are respectively luminance signal information data and chrominance signal information data which constitute a digital video signal.

9. A method according to claim 1, wherein said first digital image information data are two of first, second and third primary color signal information data which constitute a digital video signal and the second digital image information data are the rest of the first, second and third primary color signal information data.

10. An apparatus for transmitting digital data, which comprises;

first 8-bit word sequence data producing means for obtaining first 8-bit word sequence data based on first digital image information data, second 8-bit word sequence data producing means for obtaining second 8-bit word sequence data based on second digital image information data, first 8B/10B converting means for causing the first 8-bit word sequence data to be subjected to 8B/10B conversion to produce first 10-bit word sequence data, second 8B/10B converting means for causing the second 8-bit word sequence data to be subjected to 8B/10B conversion to produce second 10-bit word sequence data, first composite data producing means for obtaining third 8-bit word sequence data based on the first 10-bit word sequence data and inserting an additional word data group including 8-bit word synchronous data allotted a predetermined specific code into the third 8-bit word sequence data at predetermined word intervals to produce first composite 8-bit word sequence data, second composite data producing means for obtaining fourth 8-bit word sequence data based on the second 10-bit word sequence data and inserting an additional word data group including 8-bit word synchronous data allotted a predetermined specific code into the fourth 8-bit word sequence data at predetermined word intervals to produce second composite 8-bit word sequence data, and data transmitting means for converting the first and second composite 8-bit word sequence data into first and second serial data, respectively, and transmitting the first and second serial data through first and second transmission lines.

* * * * *